United States Patent
Yu et al.

(10) Patent No.: US 12,317,253 B2
(45) Date of Patent: *May 27, 2025

(54) METHOD FOR INDICATING SPATIAL REUSE PARAMETER AND DETERMINING SPATIAL REUSE PARAMETER FIELD AND APPARATUS

(71) Applicant: HUAWEI TECHNOLOGIES CO., LTD., Shenzhen (CN)

(72) Inventors: Jian Yu, Shenzhen (CN); Ming Gan, Shenzhen (CN); Mengshi Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,902

(22) Filed: Mar. 13, 2024

(65) Prior Publication Data

US 2024/0224263 A1 Jul. 4, 2024

Related U.S. Application Data

(63) Continuation of application No. 18/335,042, filed on Jun. 14, 2023, now Pat. No. 11,997,670, which is a (Continued)

(30) Foreign Application Priority Data

Dec. 15, 2020 (CN) .......................... 202011483071.3

(51) Int. Cl.
*H04W 72/1263* (2023.01)
*H04W 16/28* (2009.01)
*H04W 28/26* (2009.01)

(52) U.S. Cl.
CPC ....... *H04W 72/1263* (2013.01); *H04W 16/28* (2013.01); *H04W 28/26* (2013.01)

(58) Field of Classification Search
CPC .. H04W 28/26; H04W 16/28; H04W 72/1263
See application file for complete search history.

(56) References Cited

U.S. PATENT DOCUMENTS

| 2018/0027514 A1* | 1/2018 | Chen ................. H04L 27/2601 370/338 |
|---|---|---|
| 2018/0062805 A1 | 3/2018 | Huang et al. |

(Continued)

FOREIGN PATENT DOCUMENTS

| CN | 110536469 A | 12/2019 |
|---|---|---|
| CN | 114499797 A | 5/2022 |

(Continued)

OTHER PUBLICATIONS

IEEE P802.11be™/DO.1 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT), Sep. 2020, total 299 pages.

(Continued)

*Primary Examiner* — Ajay Cattungal
(74) *Attorney, Agent, or Firm* — HAUPTMAN HAM, LLP

(57) ABSTRACT

This application relates to the wireless communication field, and is applied to a wireless local area network that supports the 802.11be standard. In particular, this application relates to a method including: An access point AP sends a trigger frame, where the trigger frame is used for triggering a station to send an extremely high throughput trigger based physical layer protocol data unit EHT TB PPDU. The station determines, based on one or two of a value indicated by an uplink (Continued)

EHT spatial reuse parameter UL EHT SRP and a value indicated by one or more uplink spatial reuse parameter UL SRP fields in a common information field of the trigger frame, a value indicated by a spatial reuse parameter SRP in a universal signal field U-SIG of the EHT TB PPDU. The STA sends the EHT TB PPDU to the AP.

20 Claims, 26 Drawing Sheets

Related U.S. Application Data continuation of application No. PCT/CN2021/125779, filed on Oct. 22, 2021.

(56) References Cited

U.S. PATENT DOCUMENTS

| | | | |
|---|---|---|---|
| 2018/0338325 A1* | 11/2018 | Ryu | H04W 72/23 |
| 2019/0013978 A1* | 1/2019 | Zhou | H04L 1/0006 |
| 2019/0045461 A1* | 2/2019 | Fang | H04W 52/245 |
| 2019/0116513 A1* | 4/2019 | Verma | H04W 74/002 |
| 2019/0124695 A1* | 4/2019 | Seok | H04W 8/005 |
| 2019/0141570 A1* | 5/2019 | Verma | H04L 5/0007 |
| 2019/0141717 A1* | 5/2019 | Yang | H03M 13/1102 |
| 2019/0215037 A1* | 7/2019 | Seok | H04L 1/0013 |
| 2019/0334590 A1* | 10/2019 | Son | H04L 5/0023 |
| 2019/0349232 A1* | 11/2019 | Cariou | H04B 7/0417 |
| 2019/0361108 A1* | 11/2019 | Jiang | H04W 24/10 |
| 2020/0045656 A1 | 2/2020 | Verma et al. | |
| 2020/0162963 A1* | 5/2020 | Alpert | H04L 1/06 |
| 2020/0274659 A1 | 8/2020 | Ouchi | |
| 2020/0344007 A1 | 10/2020 | Chen et al. | |
| 2020/0374062 A1 | 11/2020 | Verma et al. | |
| 2022/0132371 A1* | 4/2022 | Wu | H04W 28/065 |
| 2022/0376833 A1* | 11/2022 | Huang | H04L 1/1812 |

FOREIGN PATENT DOCUMENTS

| | | |
|---|---|---|
| EP | 4231773 A1 | 8/2023 |
| TW | 201737652 A | 10/2017 |
| WO | 2020231062 A1 | 11/2020 |
| WO | 2020242106 A1 | 12/2020 |

OTHER PUBLICATIONS

Extended European Search Report issued in corresponding European Application No. 21905306.3, dated Apr. 9, 2024, 13 pages.
IEEE Std 802.11-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.
IEEE 802.11-20/0840-00-00be, Ming Gan et al., Backward compatible EHT trigger frame, Jun. 2020, 10 pages.
IEEE Std 802.11ac-2013, IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Approved Dec. 11, 2013, total 425 pages.
IEEE 802.11-20/1429r3, Steve Shellhammer et al., Enhanced Trigger Frame for EHT Support, Dec. 2020, 46 pages.
IEEE P802.11ax/D8.0, Oct. 2020, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN, 820 pages.
IEEE 802.11-20/1808-00-00be, Ming Gan et al., Backward compatible EHT trigger frame follow up, Nov. 2020, 18 pages.
International Search Report issued in corresponding International Application No. PCT/2021/125779, dated Jan. 13, 2022, pp. 1-10.
Taiwan Office Action issued in corresponding Taiwan Application No. 11120949220, dated Sep. 27, 2022, pp. 1-15.
Chinese Office Action issued in corresponding Chinese Application No. 202310804544.2, dated Nov. 26, 2023, pp. 1-12.
Chinese Office Action issued in corresponding Chinese Application No. 202011483071.3, dated Aug. 29, 2024, pp. 1-16.

* cited by examiner

| Frame control (frame control) | Duration (Duration) | Receiver address (RA) | Transmitter address (TA) | Common information (Common Info) | User information (user info) | User information (user info) | ... | User information (user info) | Padding (padding) | Frame check sequence (FCS) |
|---|---|---|---|---|---|---|---|---|---|---|
| | | | | | User information list field (User Info List) | | | | | |

| 12 | 8 | 1 | 4 | 1 | 4 | 2 | 7 | 1 | Variable |
|---|---|---|---|---|---|---|---|---|---|
| AID12 Association identifier | RU Allocation Resource unit allocation | UL FEC Coding Type Uplink forward error correction coding type | UL EHT-MCS Modulation and coding scheme | Reserved Reserved | Start value of a spatial stream | Number of spatial streams | UL Target RSSI Uplink target received signal strength indicator | PS106 Primary/ secondary 160 MHz indication | Trigger dependent user information (Trigger Dependent User Info) |

CONT. FROM FIG. 6a-1

CONT. FROM FIG. 6a-1

FIG. 6a-2

| L-STF Legacy short training field | L-LTF Legacy long training field | L-SIG Legacy signal field | RL-SIG Repeated legacy-signal field | U-SIG Universal signal field | EHT-STF EHT short training field | EHT-LTF EHT long training field | Data Data | PE Packet extension field |

| 12 | 8 | 1 | 4 | 1 | 4 | 2 | 7 | 1 | Variable |
|---|---|---|---|---|---|---|---|---|---|
| AID12 Association identifier | RU Allocation Resource unit allocation | UL FEC Coding Type Uplink forward error correction coding type | UL EHT-MCS Modulation and coding scheme | Reserved Reserved | Start value of a spatial stream | Number of spatial streams | UL Target RSSI Uplink target received signal strength indicator | PS106 Primary/ secondary 160 MHz indication | Trigger dependent user information (Trigger Dependent User Info) |

CONT. FROM FIG. 10A

CONT. FROM FIG. 10A

FIG. 10B

METHOD FOR INDICATING SPATIAL REUSE PARAMETER AND DETERMINING SPATIAL REUSE PARAMETER FIELD AND APPARATUS

CROSS-REFERENCE TO RELATED APPLICATIONS

This application is a continuation of U.S. patent application Ser. No. 18/335,042, filed on Jun. 14, 2023, which is a continuation of International Application No. PCT/CN2021/125779, filed on Oct. 22, 2021. The International Application claims priority to Chinese Patent Application No. 202011483071.3, filed on Dec. 15, 2020. All of the aforementioned patent applications are hereby incorporated by reference in their entireties.

TECHNICAL FIELD

This application relates to the field of wireless communication technologies, and in particular, to a method for indicating a spatial reuse parameter, a corresponding method for determining a spatial reuse parameter field in a physical layer protocol data unit PPDU, a trigger frame transmission method, a PPDU transmission method, and a related apparatus.

BACKGROUND

A wireless local area network (wireless local area network, WLAN) has been developed for many generations, including 802.11a/b/g, 802.11n, 802.11ac, 802.11ax, and 802.11be under discussion. The 802.11ax standard may be referred to as the high efficiency (high efficiency, HE) standard, and the 802.11be standard may be referred to as the extremely high throughput (extremely high throughput, EHT) standard or the Wi-Fi 7 standard. Different from 802.11ax, 802.11be uses an ultra-large bandwidth, for example, 320 MHz, to achieve ultra-high transmission rates and support scenarios with ultra-high user density. In the following, a station that supports the 802.11ax standard but does not support the 802.11be standard is referred to as an HE station for short, and a station that supports the 802.11be standard is referred to as an EHT station for short.

802.11ax WLAN devices (such as an access point (access point, AP) and a station (station, STA)) support only half-duplex transmission. In other words, on a same spectrum bandwidth or channel, only one device can send information, and other devices can only receive a signal but cannot send a signal. This avoids interference to the current sending device. However, with increasing density of WLAN devices, it is more common that a basic service set (basic service set, BSS) overlaps with another BSS. In other words, an overlapping basic service set (Overlapping BSS, OBSS) becomes more common. Because a WLAN device located in the OBSS may receive physical layer protocol data units (physical protocol data unit, PPDU, also referred to as a packet or a data packet) from two BSSs, a conventional method causes low transmission efficiency. Therefore, 802.11ax proposes a spatial reuse (spatial reuse) method. By adaptively adjusting transmit power, WLAN devices in the overlapping basic service set can perform transmission simultaneously. This greatly improves transmission efficiency. Specifically, in 802.11ax, spatial reuse is introduced into a trigger frame-based uplink scheduling transmission method. When sending a high efficiency trigger based physical layer data protocol unit (high efficiency trigger based physical layer protocol data unit, HE TB PPDU), a station copies values of four uplink spatial reuse parameter (uplink spatial reuse parameter, UL SRP) fields (which may also be referred to as uplink parameterized spatial reuse (uplink parameterized spatial reuse, UL PSR) fields) in an uplink spatial reuse (UL spatial reuse) field in a common information field of a received trigger frame to four spatial reuse parameter (spatial reuse parameter, SRP) fields included in a high efficiency signal field A (high efficiency signal field A, HE-SIG-A) of the HE TB PPDU.

However, the 802.11be standard still uses the trigger frame-based uplink scheduling transmission method in the 802.11ax standard, and how to design a trigger frame to schedule an EHT station or schedule both an HE station and an EHT station becomes an urgent problem to be resolved.

SUMMARY

Embodiments of this application provide a method for indicating a spatial reuse parameter in a trigger frame and a related apparatus, and a method for determining a spatial reuse parameter field in a PPDU and a related apparatus. According to technical solutions provided in embodiment of this application, in a scenario in which a trigger frame is used for scheduling an EHT station or both an HE station and an EHT station, one or two of a spatial reuse parameter field and a U-SIG reserved field that are of an EHT TB PPDU may be set based on the trigger frame without changing a frame structure of the EHT TB PPDU.

The following describes this application from different aspects. It should be understood that mutual reference may be made to the following implementations and beneficial effects of the different aspects.

According to a first aspect, this application provides a method for indicating a spatial reuse parameter in a trigger frame, including:

An access point AP sends a trigger frame, where the trigger frame is used for triggering a station to send an extremely high throughput trigger based physical layer protocol data unit EHT TB PPDU.

The AP receives the EHT TB PPDU sent by the station, where a value indicated by a spatial reuse parameter SRP in a universal signal field U-SIG of the EHT TB PPDU is determined based on one or two of a value indicated by an uplink EHT spatial reuse parameter UL EHT SRP and a value indicated by one or more uplink spatial reuse parameter UL SRP fields in a common information field of the trigger frame.

Optionally, the trigger frame is further used for triggering a station to send an HE TB PPDU. Values of four SRP fields included in an HE-SIG-A of the HE TB PPDU are respectively copied from the foregoing four UL SRP fields. A length of each UL SRP field is 4 bits, and a length of each SRP field in the HE-SIG-A is also 4 bits.

According to the method provided in the first aspect of this application, on the one hand, content of the trigger frame is not changed (to be specific, a UL SRP value of the trigger frame is not changed), so that an HE station can set a spatial reuse parameter in an original manner, signaling overheads of the trigger frame are not increased, and the HE station has no loss in granularity. On the other hand, when a frame structure of the U-SIG of the EHT TB PPDU is not changed, a spatial reuse parameter in the U-SIG of the EHT TB PPDU is set based on values indicated by four UL SRP fields in the trigger frame and one or two fields in the UL EHT SRP field, so that the trigger frame can be used for scheduling an EHT station to send an uplink EHT TB PPDU, and an HE station and the EHT station can be scheduled by using a same trigger frame. In addition, a U-SIG reserved field in the U-SIG of the EHT TB PPDU may be set to a default value.

According to a second aspect, this application provides a method for determining a spatial reuse parameter field in a PPDU. The method includes: A station STA receives a trigger frame, where the trigger frame is used for triggering the station to send an extremely high throughput trigger based physical layer protocol data unit EHT TB PPDU.

The STA sends the EHT TB PPDU, where a value indicated by an SRP in a U-SIG of the EHT TB PPDU is determined based on one or two of a value indicated by an uplink EHT spatial reuse parameter UL EHT SRP and a value indicated by one or more UL SRP fields in a common information field of the trigger frame.

Optionally, the trigger frame is further used for triggering a station to send an HE TB PPDU. Values of four SRP fields included in an HE-SIG-A of the HE TB PPDU are respectively copied from the foregoing four UL SRP fields. A length of each UL SRP field is 4 bits, and a length of each SRP field in the HE-SIG-A is also 4 bits.

According to the method provided in the second aspect of this application, on the one hand, content of the trigger frame is not changed (to be specific, a UL SRP value of the trigger frame is not changed), so that an HE station can set a spatial reuse parameter in an original manner, signaling overheads of the trigger frame are not increased, and the HE station has no loss in granularity. On the other hand, when a frame structure of the U-SIG of the EHT TB PPDU is not changed, a spatial reuse parameter in the U-SIG of the EHT TB PPDU is set based on values indicated by four UL SRP fields in the trigger frame and one or two fields in the UL EHT SRP field, so that the trigger frame can be used for scheduling an EHT station to send an uplink EHT TB PPDU, and an HE station and the EHT station can be scheduled by using a same trigger frame. In addition, a U-SIG reserved field in the U-SIG of the EHT TB PPDU may be set to a default value.

According to a third aspect, this application provides a communication apparatus used in a wireless local area network WLAN. The communication apparatus may be an access point AP or a chip in the access point AP, and includes:

a processor, configured to generate a trigger frame; and
a transceiver, configured to send the trigger frame, where the trigger frame is used for triggering a station to send an extremely high throughput trigger based physical layer protocol data unit EHT TB PPDU.

The transceiver is configured to receive the EHT TB PPDU sent by the station, where a value indicated by a spatial reuse parameter SRP in a universal signal field U-SIG of the EHT TB PPDU is determined based on one or two of a value indicated by an uplink EHT spatial reuse parameter UL EHT SRP and a value indicated by one or more uplink spatial reuse parameter UL SRP fields in a common information field of the trigger frame.

The communication apparatus provided in the third aspect can implement the method provided in the first aspect and achieve corresponding technical effect. Details are not described herein.

According to a fourth aspect, this application provides a communication apparatus used in a wireless local area network WLAN, including:

a transceiver, configured to receive a trigger frame, where the trigger frame is used for triggering the communication apparatus to send an extremely high throughput trigger based physical layer protocol data unit EHT TB PPDU; and a processor, configured to generate the EHT TB PPDU, where a value indicated by an SRP in a U-SIG of the EHT TB PPDU is determined based on one or two of a value indicated by an uplink EHT spatial reuse parameter UL EHT SRP and a value indicated by one or more UL SRP fields in a common information field of the trigger frame.

The transceiver is configured to send the EHT TB PPDU.

The communication apparatus provided in the fourth aspect can implement the method provided in the second aspect and achieve a corresponding technical effect. Details are not described herein.

According to the method provided in the first aspect or the second aspect or the communication apparatus provided in the third aspect or the fourth aspect, in a first implementation, the common information field of the trigger frame includes four uplink spatial reuse parameter UL SRP fields. The four UL SRP fields are a UL SRP1 field, a UL SRP2 field, a UL SRP3 field, and a UL SRP4 field. The U-SIG of the EHT TB PPDU includes one SRP field, and a value of the SRP field is equal to a smallest value of values indicated by the UL SRP1 field, the UL SRP2 field, the UL SRP3 field, and the UL SRP4 field. Alternatively, a value of the SRP field is equal to any one of values indicated by the UL SRP1 field, the UL SRP2 field, the UL SRP3 field, and the UL SRP4 field.

According to the method provided in the first aspect or the second aspect and the communication apparatus provided in the third aspect or the fourth aspect, in a second implementation, the UL EHT SRP field is located in a reserved field of the common information field. The U-SIG of the EHT TB PPDU includes one SRP field, and a value of the SRP field is equal to a value indicated by the UL EHT SRP field.

According to the method provided in the first aspect or the second aspect or the communication apparatus provided in the third aspect or the fourth aspect, in a third implementation, the common information field of the trigger frame includes four uplink spatial reuse parameter UL SRP fields. The four UL SRP fields are a UL SRP1 field, a UL SRP2 field, a UL SRP3 field, and a UL SRP4 field. The UL EHT SRP field is located in a reserved field of the common information field. The EHT TB PPDU is a non-aggregated PPDU, and the U-SIG of the EHT TB PPDU includes two SRP fields: an SRP1 field and an SRP2 field. A value of the SRP1 field is equal to a smallest value or any one of values indicated by the UL SRP1 field and the UL SRP2 field. A value of the SRP2 field is equal to a smallest value or any one of values indicated by the UL SRP3 field and the UL SRP4 field.

According to the method provided in the first aspect or the second aspect or the communication apparatus provided in the third aspect or the fourth aspect, in a fourth implementation, the common information field of the trigger frame includes four uplink spatial reuse parameter UL SRP fields. The four UL SRP fields are a UL SRP1 field, a UL SRP2 field, a UL SRP3 field, and a UL SRP4 field. The UL EHT SRP field is located in a reserved field of the common information field. A bandwidth of the EHT TB PPDU is 320 MHz or the EHT TB PPDU is a part of an aggregated PPDU, and the U-SIG of the EHT TB PPDU includes two SRP fields: an SRP1 field and an SRP2 field. A value of the SRP1 field is equal to a value of the SRP2 field, and both values are equal to a smallest value or any one of values indicated by the UL SRP1 field, the UL SRP2 field, the UL SRP3 field, and the UL SRP4 field.

According to the method provided in the first aspect or the second aspect or the communication apparatus provided in the third aspect or the fourth aspect, in a fifth implementation, the common information field of the trigger frame includes four uplink spatial reuse parameter UL SRP fields. The four UL SRP fields are a UL SRP1 field, a UL SRP2 field, a UL SRP3 field, and a UL SRP4 field. The UL EHT SRP field is located in a reserved field of the common information field. A bandwidth of the EHT TB PPDU is 320 MHz or the EHT TB PPDU is a part of an aggregated PPDU, and the U-SIG of the EHT TB PPDU includes two SRP fields: an SRP1 field and an SRP2 field. A value of the SRP1 field is equal to a smallest value or any one of values indicated by the UL SRP1 field, the UL SRP2 field, the UL SRP3 field, and the UL SRP4 field. A value of the SRP2 field is equal to a value of the UL EHT SRP field.

According to the method provided in the first aspect or the second aspect and the communication apparatus provided in the third aspect or the fourth aspect, in a sixth implementation, the universal signal field U-SIG of the EHT TB PPDU further includes a U-SIG reserved field, and a value of the U-SIG reserved field is a default value.

According to a fifth aspect, this application provides a trigger frame transmission method. The method includes: An access point AP sends a trigger frame, where the trigger frame is used for triggering a station to send an extremely high throughput trigger based physical layer protocol data unit EHT TB PPDU, and the trigger frame further includes a U-SIG reserved indication field indicating a value of a U-SIG reserved field in the EHT TB PPDU.

The AP receives the EHT TB PPDU sent by the station, where the value of the U-SIG reserved field in a universal signal field U-SIG of the EHT TB PPDU is determined based on a value of the U-SIG reserved indication field in the trigger frame.

Optionally, the trigger frame is further used for triggering a station to send an HE TB PPDU. Values of four SRP fields included in an HE-SIG-A of the HE TB PPDU are respectively copied from the foregoing four UL SRP fields. A length of each UL SRP field is 4 bits, and a length of each SRP field in the HE-SIG-A is also 4 bits.

In this solution, the trigger frame indicates the value of the U-SIG reserved field in the EHT TB PPDU, so that the trigger frame can be used for scheduling an EHT station to send an uplink EHT TB PPDU and set a value of a U-SIG reserved field in the uplink EHT TB PPDU based on an indication of the trigger frame, and an HE station and the EHT station can be scheduled by using a same trigger frame.

According to a sixth aspect, this application provides a method for determining a spatial reuse parameter field in a physical layer protocol data unit PPDU. The method includes: A station STA receives a trigger frame, where the trigger frame is used for triggering a station to send an EHT TB PPDU, and the trigger frame further includes a U-SIG reserved indication field indicating a value of a U-SIG reserved field in the EHT TB PPDU.

The STA sends the EHT TB PPDU, where the value of the U-SIG reserved field in a universal signal field U-SIG of the EHT TB PPDU is determined based on a value of the U-SIG reserved indication field in the trigger frame.

Optionally, the trigger frame is further used for triggering a station to send an HE TB PPDU. Values of four SRP fields included in an HE-SIG-A of the HE TB PPDU are respectively copied from the foregoing four UL SRP fields. A length of each UL SRP field is 4 bits, and a length of each SRP field in the HE-SIG-A is also 4 bits.

According to a seventh aspect, this application provides a wireless local area network WLAN communication apparatus. The communication apparatus may be an AP or a chip in the AP, for example, a Wi-Fi chip. The communication apparatus includes:

a processor, configured to generate a trigger frame, where the trigger frame is used for triggering a station to send an extremely high throughput trigger based physical layer protocol data unit EHT TB PPDU, and the trigger frame further includes a U-SIG reserved indication field indicating a value of a U-SIG reserved field in the EHT TB PPDU; and a transceiver, configured to send the trigger frame.

The transceiver is further configured to receive the EHT TB PPDU sent by the station, where the value of the U-SIG reserved field in a universal signal field U-SIG of the EHT TB PPDU is determined based on a value of the U-SIG reserved indication field in the trigger frame.

Optionally, the trigger frame is further used for triggering a station to send an HE TB PPDU. Values of four SRP fields included in an HE-SIG-A of the HE TB PPDU are respectively copied from the foregoing four UL SRP fields. A length of each UL SRP field is 4 bits, and a length of each SRP field in the HE-SIG-A is also 4 bits.

According to an eighth aspect, this application provides a wireless local area network WLAN communication apparatus. The communication apparatus may be an STA or a chip in the STA, for example, a Wi-Fi chip. The communication apparatus includes: a transceiver, configured to receive a trigger frame, where the trigger frame is used for triggering the station to send an EHT TB PPDU, and the trigger frame further includes a U-SIG reserved indication field indicating a value of a U-SIG reserved field in the EHT TB PPDU; and a processor, configured to generate the EHT TB PPDU, where the value of the U-SIG reserved field in a universal signal field U-SIG of the EHT TB PPDU is determined based on a value of the U-SIG reserved indication field in the trigger frame.

The transceiver is further configured to send the EHT TB PPDU, where the value of the U-SIG reserved field in the universal signal field U-SIG of the EHT TB PPDU is determined based on the value of the U-SIG reserved indication field in the trigger frame.

Optionally, the trigger frame is further used for triggering a station to send an HE TB PPDU. Values of four SRP fields included in an HE-SIG-A of the HE TB PPDU are respectively copied from the foregoing four UL SRP fields. A length of each UL SRP field is 4 bits, and a length of each SRP field in the HE-SIG-A is also 4 bits.

According to the method provided in the fifth aspect or the sixth aspect or the communication apparatus provided in the seventh aspect or the eighth aspect, in a first implementation, the U-SIG reserved indication field is located in a special user information field of a user information list field of the trigger frame.

According to the method provided in the fifth aspect or the sixth aspect or the communication apparatus provided in the seventh aspect or the eighth aspect, in a second implementation, an association identifier AID12 of the special user information field is a preset value or an incomplete AID12 value.

According to the method provided in the fifth aspect or the sixth aspect or the communication apparatus provided in the seventh aspect or the eighth aspect, in a third implementation, the special user information field further includes one UL SRP field for the U-SIG or two UL SRP fields for the U-SIG.

According to the method provided in the fifth aspect or the sixth aspect or the communication apparatus provided in the seventh aspect or the eighth aspect, in a fourth implementation, the common information field of the trigger frame includes four uplink spatial reuse parameter UL SRP fields. Alternatively, the common information field of the trigger frame further includes an uplink EHT spatial reuse parameter UL EHT SRP field in a reserved field of the common information field.

According to a ninth aspect, this application provides a method for indicating a spatial reuse parameter by using a trigger frame. The method includes: An AP sends a trigger frame, where the trigger frame is used for triggering a station to send an EHT TB PPDU. The AP receives the EHT TB PPDU sent by the station. The trigger frame carries first indication information, and the first indication information indicates a value of an SRP1 field and/or an SRP2 field in a U-SIG of the EHT TB PPDU. The value of the SRP1 field and/or the SRP2 field in the U-SIG of the EHT TB PPDU are/is determined based on the first indication information.

According to a tenth aspect, this application provides a method for determining a spatial reuse parameter field in a PPDU. The method includes: A STA receives a trigger frame, where the trigger frame is used for triggering a station to send an EHT TB PPDU. The STA sends the EHT TB PPDU. The trigger frame carries first indication information, and the first indication information indicates a value of an SRP1 field and/or an SRP2 field in a U-SIG of the EHT TB PPDU. The value of the SRP1 field and/or the SRP2 field in the U-SIG of the EHT TB PPDU are/is determined based on the first indication information.

According to an eleventh aspect, this application provides a communication apparatus used in a WLAN. The communication apparatus is an access point AP or a chip in the AP, and includes:

a processor, configured to generate a trigger frame, where the trigger frame is used for triggering a station to send an EHT TB PPDU. The AP receives the EHT TB PPDU sent by the station. The trigger frame carries first indication information, and the first indication information indicates a value of an SRP1 field and/or an SRP2 field in a U-SIG of the EHT TB PPDU. The value of the SRP1 field and/or the SRP2 field in the U-SIG of the EHT TB PPDU are/is determined based on the first indication information.

The communication apparatus further includes a transceiver, configured to send the trigger frame.

According to a twelfth aspect, this application provides a communication apparatus used in a WLAN. The communication apparatus is a station STA or a chip in the STA, and includes:

a transceiver, configured to receive a trigger frame, where the trigger frame is used for triggering a station to send an EHT TB PPDU, the trigger frame carries first indication information, and the first indication information indicates a value of an SRP1 field and/or an SRP2 field in a U-SIG of the EHT TB PPDU; and a processor, configured to generate the EHT TB PPDU, where a value of the SRP1 field and/or the SRP2 field in the U-SIG of the EHT TB PPDU are/is determined based on the first indication information.

The transceiver is further configured to send the EHT TB PPDU.

According to the method provided in the ninth aspect or the tenth aspect or the communication apparatus provided in the eleventh aspect or the twelfth aspect, in a first implementation, the first indication information is located in a common information field of the trigger frame. The common information field includes four UL SRP fields, and the four UL SRP fields respectively indicate values of four SRP fields in an HE TB PPDU.

According to the method provided in the ninth aspect or the tenth aspect or the communication apparatus provided in the eleventh aspect or the twelfth aspect, in a second implementation, the first indication information is located in a common information field of the trigger frame. The common information field includes a UL EHT SRP field, and the UL EHT SRP field indicates the value of the SRP1 field and/or the SRP2 field in the U-SIG of the EHT TB PPDU independently or together with the four UL SRP fields.

According to the method provided in the ninth aspect or the tenth aspect or the communication apparatus provided in the eleventh aspect or the twelfth aspect, in a third implementation, the first indication information is located in a UL SRP field of a user information field of the trigger frame.

According to the method provided in the ninth aspect or the tenth aspect or the communication apparatus provided in the eleventh aspect or the twelfth aspect, in a fourth implementation, a part of the first indication information is located in four UL SRP fields of a common information field of the trigger frame, and another part is located in a UL SRP field of a special user information field of the trigger frame. The four UL SRP fields together with the UL SRP field located in the special user information field indicate the value of the SRP1 field and/or the SRP2 field in the U-SIG of the EHT TB PPDU.

According to the method according to the ninth aspect or the tenth aspect or the communication apparatus according to the eleventh aspect or the twelfth aspect, in a fifth implementation, a part of the first indication information is located in a common information field of the trigger frame, the common information field includes a UL EHT SRP field, and another part is located in a UL SRP field of a special user information field of the trigger frame. The UL EHT SRP field together with the UL SRP field located in the special user information field indicate the value of the SRP1 field and/or the SRP2 field in the U-SIG of the EHT TB PPDU.

According to the method provided in the ninth aspect or the tenth aspect or the communication apparatus provided in the eleventh aspect or the twelfth aspect, in a sixth implementation, the first indication information is located in a special user information field of the trigger frame.

According to the method provided in the ninth aspect or the tenth aspect or the communication apparatus provided in the eleventh aspect or the twelfth aspect, in a seventh implementation, a value of an AID12 field of the special user information field is a preset value or an incomplete AID12 value.

According to the method provided in the ninth aspect or the tenth aspect or the communication apparatus provided in the eleventh aspect or the twelfth aspect, in an eighth implementation, the trigger frame is further used for triggering the station to send an HE TB PPDU. Values of four SRP fields included in an HE-SIG-A of the HE TB PPDU are respectively copied from the foregoing four UL SRP fields. A length of each UL SRP field is 4 bits, and a length of each SRP field in the HE-SIG-A is also 4 bits.

In this solution, a special user information field in a trigger frame independently indicates a spatial reuse parameter for the EHT TB PPDU. A meaning of the special user information field is clear, and scheduling of an HE station is not affected. In this way, the HE station and an EHT station can be scheduled by using a same trigger frame.

In an implementation of any one of the foregoing aspects, a total bandwidth of the EHT TB PPDU is 320 MHz.

According to a thirteenth aspect, this application provides a spatial reuse method. The method includes: A communication device determines transmit power of an EHT TB PPDU based on one or more of values separately indicated by an SRP1 field and an SRP2 field included in a U-SIG of the EHT TB PPDU, values separately indicated by four UL SRP fields included in a common information field of a trigger frame, or values indicated by a UL EHT SRP in the common information field of the trigger frame. The communication device sends the PPDU based on the transmit power of the PPDU.

The communication device may be an AP or a STA. When the communication device is the AP, the PPDU is a parameterized spatial reuse reception (parameterized spatial reuse reception, PSRR) PPDU. When the communication device is the STA, the PPDU is a response frame in response to a PSRR PPDU.

According to a fourteenth aspect, this application provides a communication apparatus. The communication apparatus may be an AP or a STA. Further, the communication apparatus may be a chip in the AP or the STA, for example, a Wi-Fi chip. The communication apparatus includes: a determining unit, configured to determine, based on values separately indicated by an SRP1 field and an SRP2 field included in a U-SIG of the EHT TB PPDU and/or values separately indicated by four UL SRP fields included in a common information field of a trigger frame, transmit power of the PPDU; and a transceiver unit, configured to send the PPDU based on the transmit power of the PPDU.

The communication device may be an AP or a STA. When the communication device is the AP, the PPDU is a PSRR PPDU. When the communication device is the STA, the PPDU is a response frame in response to a PSRR PPDU.

According to the method in the thirteenth aspect or the communication device in the fourteenth aspect, in a first implementation, before the communication device determines the transmit power of the PPDU, the method further includes: The communication device receives the trigger frame, where the trigger frame includes four UL SRP fields. A value indicated by one UL SRP field is a sum of transmit power of a first AP on one subchannel and maximum interference power accepted by the first AP. The communication device and the first AP are located in a same overlapping basic service set OBSS. The "first AP" herein is an AP that sends the trigger frame, and is also an AP in the foregoing method for determining a spatial reuse parameter field in a PPDU. The communication device and the first AP are not a same device.

In this solution, a spatial reuse method is provided for an EHT TB PPDU, so that a case of one or two SRP fields in a U-SIG can be compatible, and spatial use is implemented in the EHT standard. In this way, devices in an overlapping basic service set can perform transmission simultaneously, to improve transmission efficiency.

According to a fifteenth aspect, this application provides an apparatus. The apparatus is implemented in a product form of a functional unit, and includes a processing unit and a transceiver unit. The processing unit is configured to implement a function of the processor in any one of the foregoing aspects, and the transceiver unit is configured to implement a function of the transceiver in any one of the foregoing aspects.

According to a sixteenth aspect, this application provides an apparatus. The apparatus is implemented in a product form of a chip, and includes an input/output interface and a processing circuit.

In a possible design, the apparatus is the chip in the communication apparatus according to the third aspect, the seventh aspect, the eleventh aspect, or the fourteenth aspect. The communication apparatus is an AP. The processing circuit in the chip is configured to implement a processing function performed by an AP side in the third aspect, the seventh aspect, the eleventh aspect, or the fourteenth aspect. In another implementation, the chip may further include a radio frequency circuit.

In a possible design, the apparatus is the chip in the communication apparatus according to the fourth aspect, the eighth aspect, the twelfth aspect, or the fourteenth aspect. The communication apparatus is a STA. A processing circuit in the chip is configured to implement a processing function performed by an AP side in the fourth aspect, the eighth aspect, the eleventh aspect, or the fourteenth aspect. In another implementation, the chip may further include a radio frequency circuit.

According to a seventeenth aspect, this application provides a computer-readable storage medium. The computer-readable storage medium stores instructions. When the instructions are run on a computer, the computer is enabled to perform the method according to the first aspect, the second aspect, the fifth aspect, the sixth aspect, the ninth aspect, the tenth aspect, or the thirteenth aspect.

According to an eighteenth aspect, this application provides a computer program product including instructions. When the computer program product runs on a computer, the computer is enabled to perform the method according to the first aspect, the second aspect, the fifth aspect, the sixth aspect, the ninth aspect, the tenth aspect, or the thirteenth aspect.

In embodiments of this application, a length of the U-SIG field of the EHT TB PPDU is not changed or increased (the U-SIG field occupies two OFDM symbols, 8 microseconds (μs) in total). A spatial reuse parameter field of the EHT TB PPDU is set based on one or more of indications of the four UL SRP fields in the trigger frame, an indication of the UL EHT SRP field in the trigger frame, and an indication of the special user information field in the trigger frame. In this way, the HE station and the EHT station can be scheduled by using a same trigger frame, and spatial reuse can be implemented in the EHT standard. Therefore, WLAN devices in an overlapping basic service set can perform transmission simultaneously, to improve transmission efficiency.

BRIEF DESCRIPTION OF DRAWINGS

To describe the technical solutions in embodiments of this application more clearly, the following briefly describes the accompanying drawings used for describing embodiments.

FIG. 5a is a schematic diagram of a frame format of a trigger frame;

FIG. 6a-1 and FIG. 6a-2 are a schematic diagram of frame formats of a common information field and a user information field in a trigger frame in 802.11be;

FIG. 7b is a schematic diagram of a relationship between a U-SIG SRP field and a UL SRP field in the method in FIG. 7a;

FIG. 8b is a schematic diagram of a relationship between a U-SIG SRP1 field, a U-SIG SRP2 field, and a UL SRP field in the method in FIG. 8a;

FIG. 10A and FIG. 10B are another schematic diagram of frame formats of a common information field and a user information field in a trigger frame in 802.11be;

DESCRIPTION OF EMBODIMENTS

Figure 1:
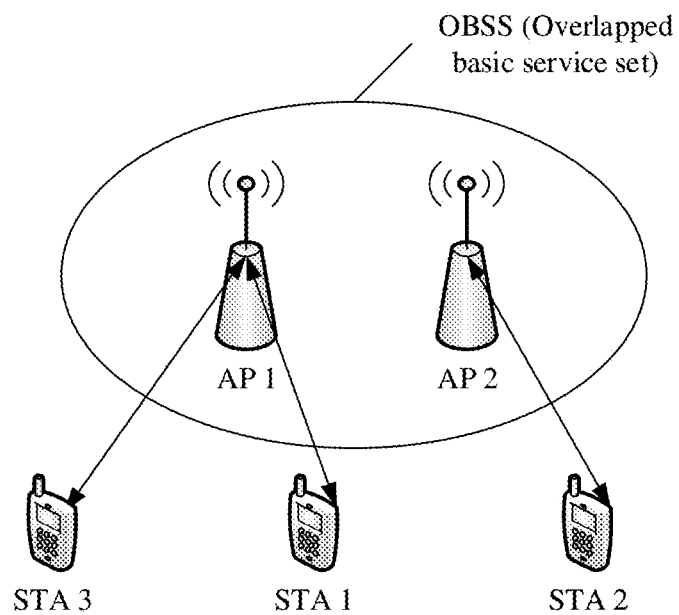
FIG. 1 is a schematic architectural diagram of a wireless communication system according to an embodiment of this application.

The following clearly and describes the technical solutions in embodiments of this application with reference to the accompanying drawings in embodiments of this application.

For ease of understanding the method provided in embodiments of this application, the following describes a system architecture and/or an application scenario of the method provided in embodiments of this application. It may be understood that the system architecture and/or the application scenario described in embodiments of this application are/is intended to describe the technical solutions in embodiments of this application more clearly, and do/does not constitute a limitation on the technical solutions provided in embodiments of this application.

This embodiment of this application provides a method for indicating a spatial reuse parameter in a trigger frame, to schedule an EHT station, or schedule both an HE station and an EHT station.

In an implementation of the trigger frame in this embodiment, a common information field of the trigger frame is not changed, and a special user information field in a user information list field part separately indicates a spatial reuse parameter in an EHT TB PPDU. In another implementation, a part of fields in a common information field of the trigger frame indicate a spatial reuse parameter in an EHT TB PPDU. Therefore, a special user information field does not need to be added to a user information list field part. In still another implementation, a special user information field is added to a user information list field part of the trigger frame, to indicate a spatial reuse parameter and U-SIG reservation information in an EHT TB PPDU.

For the two implementations, in embodiments of this application, a length of a U-SIG field of the EHT TB PPDU is not changed or increased (the U-SIG field occupies two OFDM symbols, 8 microseconds (μs) in total). The spatial reuse parameter field of the EHT TB PPDU is set based on one or more of four UL SRP fields in the trigger frame, a UL EHT SRP field in the trigger frame, or four UL SRP fields and a UL EHT SRP field. In this way, the HE station and the EHT station can be scheduled by using a same trigger frame, and spatial reuse can be implemented in the EHT standard. Therefore, WLAN devices in an overlapping basic service set can perform transmission simultaneously, to improve transmission efficiency.

The method for indicating a spatial reuse parameter in a trigger frame and the method for determining a spatial reuse parameter field in a PPDU that are provided in this embodiment may be applied to a wireless communication system, for example, a wireless local area network system. The method for determining a spatial reuse parameter field in a PPDU may be implemented by a communication device in the wireless communication system or a chip or a processor in the communication device. The communication device may be an access point device or a station device. Alternatively, the communication device may be a wireless communication device that supports concurrent transmission on multiple links. For example, the communication device may be referred to as a multi-link device (multi-link device, MLD) or a multi-band device. Compared with a communication device that supports only single-link transmission, the multi-link device has higher transmission efficiency and a higher throughput.

The method for indicating a spatial reuse parameter in a trigger frame and the method for determining a spatial reuse parameter field in a PPDU that are provided in embodiments of this application may be applied to a scenario in which an AP communicates with one or more STAs, may be further applied to a communication scenario in which an AP communicates with another AP, and may also be applied to a scenario in which a STA communicates with another STA. FIG. 1 is a schematic diagram of an architecture of a wireless communication system according to an embodiment of this application. As shown in FIG. 1, the wireless communication system may include one or more APs (for example, an AP 1 and an AP 2 in FIG. 2) and one or more STAs (for example, a STA 1, a STA 2, and a STA 3 in FIG. 2). The AP 1 and the AP 2 may be located in a same OBSS. Both the AP and the STA support a WLAN communication protocol. The communication protocol may include the 802.11be (or referred to as Wi-Fi 7, EHT protocol), and may further include protocols such as the 802.11ax and the 802.11ac. Certainly, the communication protocol may further include a next-generation protocol of 802.11be and the like with continuous evolution and development of communication technologies. A WLAN is used as an example. An apparatus for implementing the method in this application may be an AP or a STA in the WLAN, or a chip or a processing system disposed in the AP or the STA.

An access point (for example, the AP 1 or the AP 2 in FIG. 1) is an apparatus having a wireless communication function, supports communication by using a WLAN protocol, has a function of communicating with another device (for example, a station or another access point) in a WLAN network, and certainly, may further have a function of communicating with another device. In a WLAN system, an access point may be referred to as an access point station (AP STA). The apparatus having the wireless communication function may be an entire device, or may be a chip or a processing system installed in the entire device. The device in which the chip or the processing system is installed may implement the method and the function in embodiments of this application under control of the chip or the processing system. The AP in embodiments of this application is an apparatus providing a service for a STA, and may support 802.11 series protocols. For example, the AP may be a communication entity, for example, a communication server, a router, a switch, or a bridge. The AP may include a macro base station, a micro base station, a relay station, and the like in various forms. Certainly, the AP may alternatively be a chip or a processing system in these devices in various forms, to implement the method and function in embodiments of this application.

A station (for example, the STA 1, the STA 2, or the STA 3 in FIG. 1) is an apparatus having a wireless communication function, supports communication by using a WLAN protocol, and has a capability of communicating with another station or an access point in a WLAN network. In the WLAN system, a station may be referred to as a non-access point station (non-access point station, non-AP STA). For example, the STA is any user communication device that allows a user to communicate with an AP and further communicate with a WLAN. The apparatus having a wireless communication function may be an entire device, or may be a chip or a processing system installed in the entire device. The device in which the chip or the processing system is disposed may implement the method and the function in embodiments of this application under control of the chip or the processing system. For example, the STA may be user equipment that can connect to the internet, for example, a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), or a mobile phone. Alternatively, the STA may be an internet of things node in the internet of things, an in-vehicle communication apparatus in the internet of vehicles, an entertainment device, a game device or system, a global positioning system device, or the like. The STA may alternatively be a chip and a processing system in the foregoing terminals.

The WLAN system can provide high-speed and low-latency transmission. With continuous evolution of WLAN application scenarios, the WLAN system is to be applied to more scenarios or industries, for example, the internet of things industry, the internet of vehicles industry, the banking industry, enterprise offices, exhibition halls of stadiums, concert halls, hotel rooms, dormitories, wards, classrooms, supermarkets, squares, streets, production workshops and warehousing. Certainly, a device (such as an access point or a station) that supports WLAN communication may be a sensor node (for example, a smart water meter, a smart electricity meter, or a smart air detection node) in a smart city, a smart device (for example, a smart camera, a projector, a display, a television, a stereo, a refrigerator, or a washing machine) in a smart home, a node in the internet of things, an entertainment terminal (for example, an AR, a VR, or another wearable device), a smart device in smart office (for example, a printer, a projector, a loudspeaker, or a stereo), an internet of vehicle device in the internet of vehicle, an infrastructure (for example, a vending machine, a self-service navigation station of a supermarket, a self-service cash register device, or a self-service ordering machine) in daily life scenarios, a device in a large sports and music venue, and the like. Specific forms of the multi-link STA and the multi-link AP are not limited in embodiments of this application, and are merely examples for description herein.

Figure 2A:
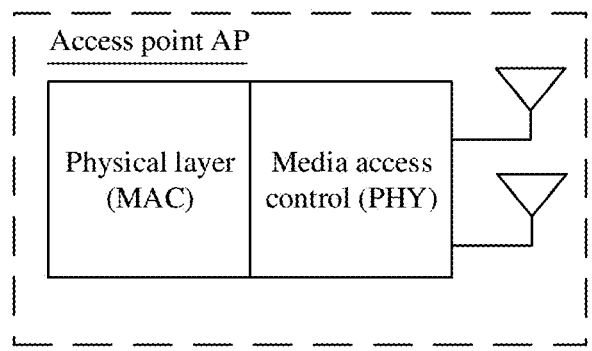
FIG. 2a is a schematic diagram of a structure of an access point according to an embodiment of this application.
Figure 2B:
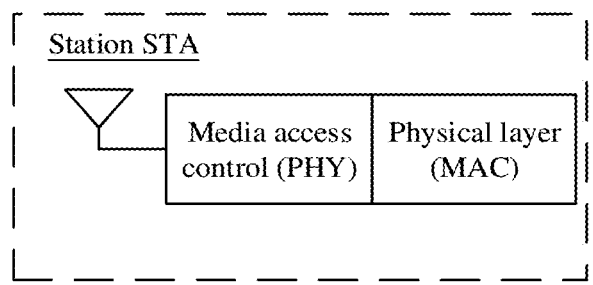
FIG. 2b is a schematic diagram of a structure of a station according to an embodiment of this application.

The 802.11 standard focuses on a physical layer (physical layer, PHY) and a media access control (media access control, MAC) layer part. In an example, refer to FIG. 2a. FIG. 2a is a schematic diagram depicting a structure of an access point according to an embodiment of this application. The AP may be multi-antenna/multi-radio frequency, or may be single-antenna/single-radio frequency. The antenna/radio frequency is used to send/receive a data packet. In an implementation, an antenna or a radio frequency part of the AP may be separated, in other words, separated from a main body of the AP. In FIG. 2a, the AP may include a physical layer processing circuit and a media access control layer processing circuit. The physical layer processing circuit may be configured to process a physical layer signal, and the MAC layer processing circuit may be configured to process a MAC layer signal. In another example, refer to FIG. 2b. FIG. 2b is a schematic diagram depicting a structure of a station according to an embodiment of this application. FIG. 2b is a schematic diagram depicting a structure of a single-antenna/single-radio frequency STA. In an actual scenario, the STA may also be multi-antenna/multi-radio frequency, and may be a device with more than two antennas. The antenna/radio frequency is used to send/receive a data packet. In an implementation, an antenna or a radio frequency part of the STA may be separated, in other words, separated from a main body of the STA. In FIG. 2b, the STA may include a PHY processing circuit and a MAC processing circuit. The physical layer processing circuit may be configured to process a physical layer signal, and the MAC layer processing circuit may be configured to process a MAC layer signal.

The foregoing content briefly describes the system architecture in embodiments of this application. To better understand the technical solutions in embodiments of this application, the following describes content related to embodiments of this application.

1. Overlapping Basic Service Set (Overlapping BSS, OBSS)

Overlapping basic service set: A basic service set and a basic service set of a station operate on a same channel, and the basic service set is (partly or completely) in a basic service area of the basic service set of the station. The overlapping basic service area is referred to as an overlapping basic service set (overlapping basic service set (OBSS): A basic service set (BSS) operating on the same channel as the station's (STA's) BSS and within (either partly or wholly) its basic service area (BSA)). The basic service area is an area containing members of a basic service set, and may contain members of other BSSs (basic service area (BSA): The area containing the members of a basic service set (BSS). It might contain members of other BSSs).

Figure 3A:
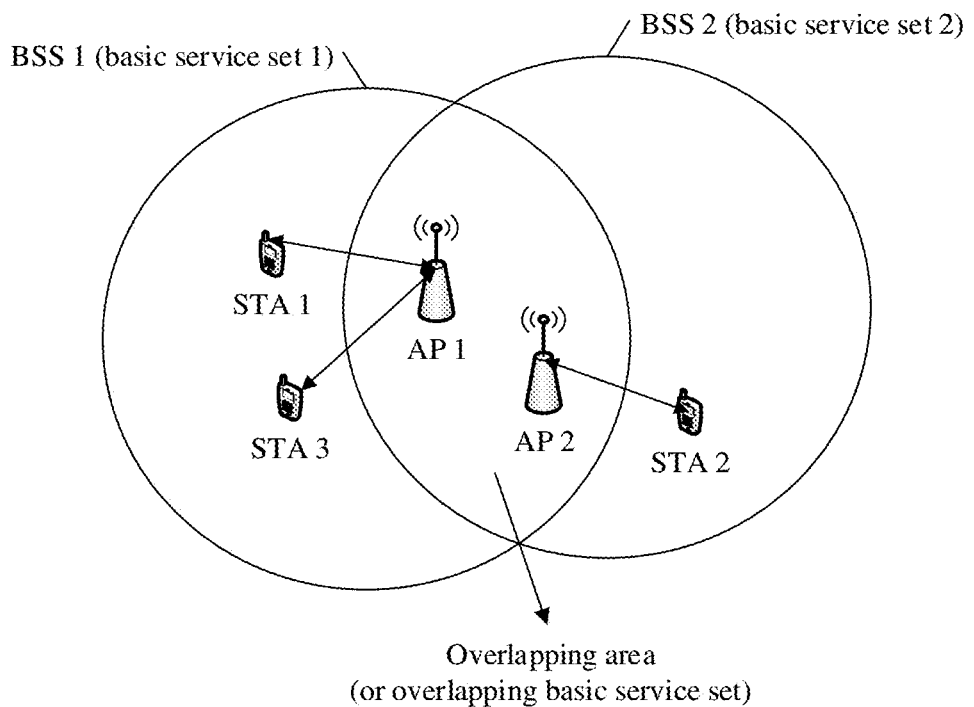
FIG. 3a is a schematic diagram of an OBSS formed by partially overlapping one BSS and another BSS.
Figure 3B:
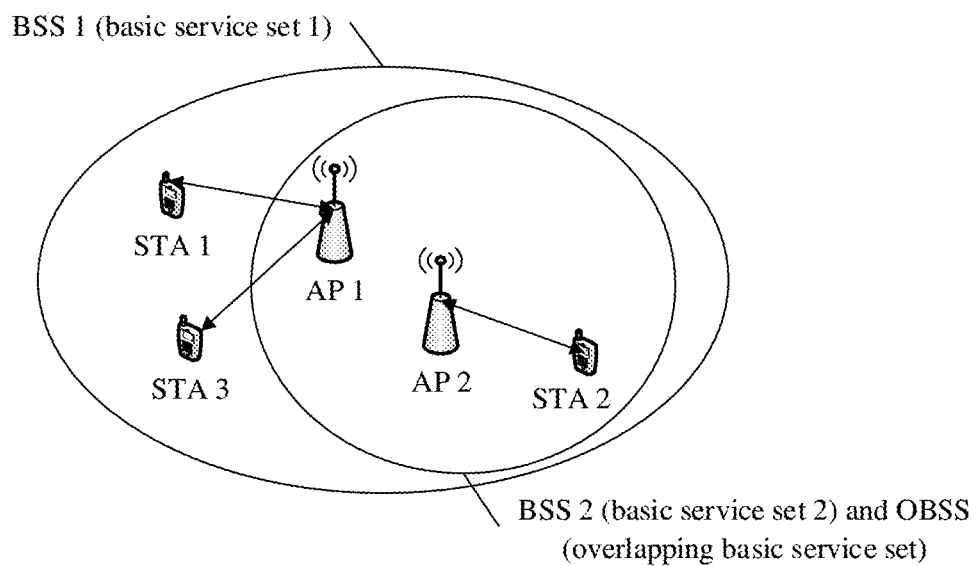
FIG. 3b is a schematic diagram of an OBSS formed by one BSS including another BSS.

In other words, an overlapping part between a basic service area of one BSS and a basic service area of another BSS is the OBSS. It may be understood that the overlapping herein may meaning that a basic service area of one BSS and a basic service area of another BSS partially overlap, or may be an inclusion relationship, to be specific, a basic service area of one BSS falls within a basic service area of another BSS. FIG. 3a is a schematic diagram of an OBSS formed by partially overlapping one BSS and another BSS. In FIG. 3a, an AP 1, a STA 1, and a STA 3 belong to a BSS 1, and an AP 2 and a STA 2 belong to a BSS 2. There is an overlapping area between the BSS 1 and the BSS 2, and the AP 1 and the AP 2 are located in the overlapping area between the BSS 1 and the BSS 2, in other words, located in an OBSS formed by the BSS 1 and the BSS 2. FIG. 3b is a schematic diagram of an OBSS formed by one BSS including another BSS. In FIG. 3b, an AP 1, a STA 1, and a STA 3 belong to a BSS 1, and an AP 2 and a STA 2 belong to a BSS 2. The BSS 1 includes the BSS 2, and the AP 1 and the AP 2 are located in an overlapping area (namely, a basic service area of the BSS 2 in FIG. 3b) between the BSS 1 and the BSS 2, in other words, located in an OBSS formed by the BSS 1 and the BSS 2.

Optionally, a WLAN device located in a same OBSS may receive information from two BSSs. For example, FIG. 3a is used as an example. When the AP 1 and the STA 1 located in a same BSS performs data transmission, the AP 2 located in another BSS may receive information sent by the AP 1 and the STA 1, or the AP 2 may further receive information sent by a STA 3. The AP 2 may adaptively adjust, based on a spatial reuse parameter transferred by the AP 1, power at which the AP 2 sends a PPDU to the STA 2, to implement simultaneous transmission in an OBSS. Similarly, when the AP 2 and the STA 2 in a same BSS perform data transmission, the AP 1 in another BSS may receive information sent by the AP 2. Alternatively, the AP 1 may adaptively adjust, based on a spatial reuse parameter transferred by the AP 2, power at which the AP 1 sends a PPDU to the STA 1 and/or a STA 3, to implement simultaneous transmission in an OBSS.

Figure 4:
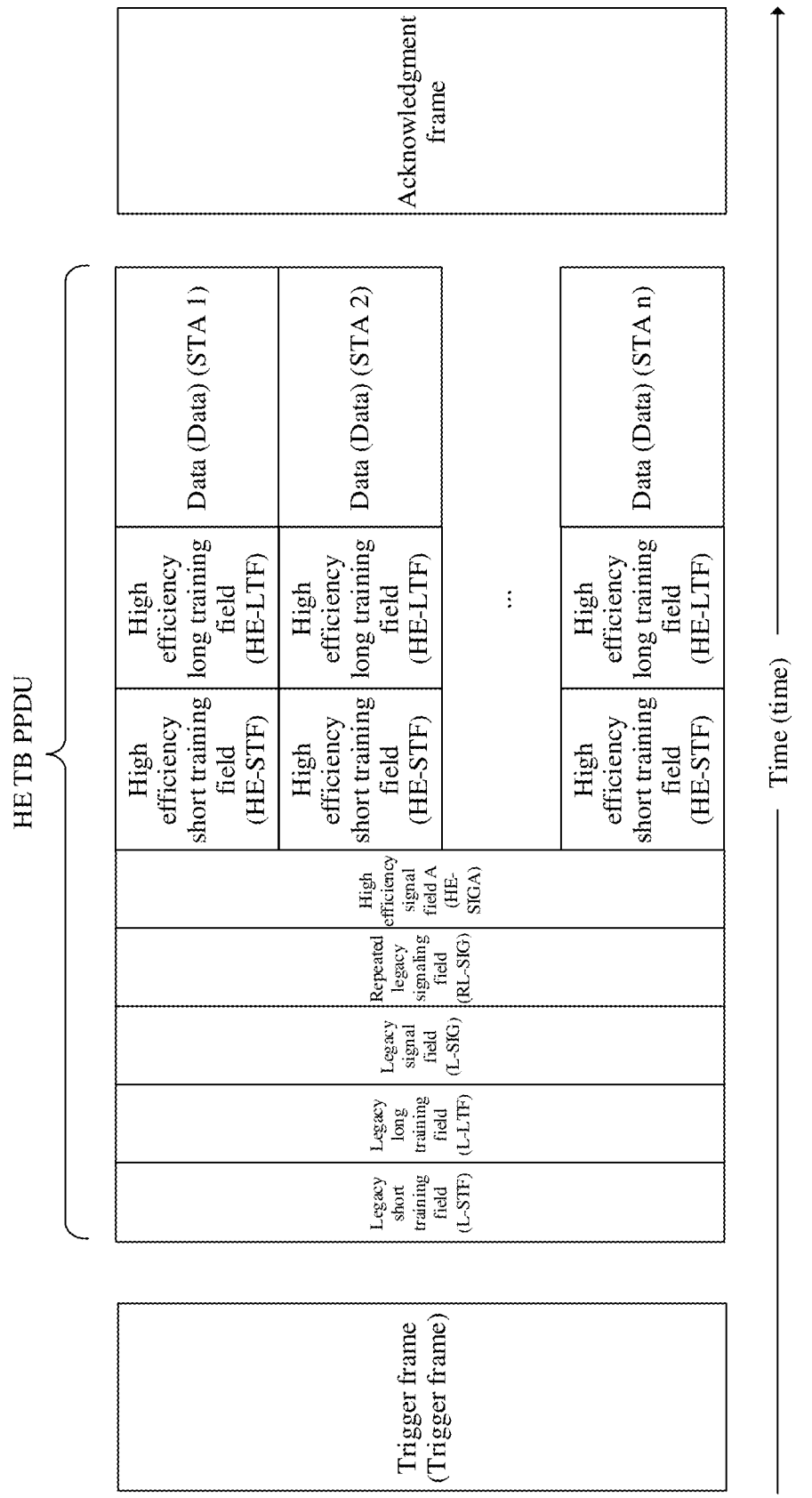
FIG. 4 is a schematic diagram of a trigger frame-based uplink scheduling transmission method in the 802.11ax standard.
Figure 5B:
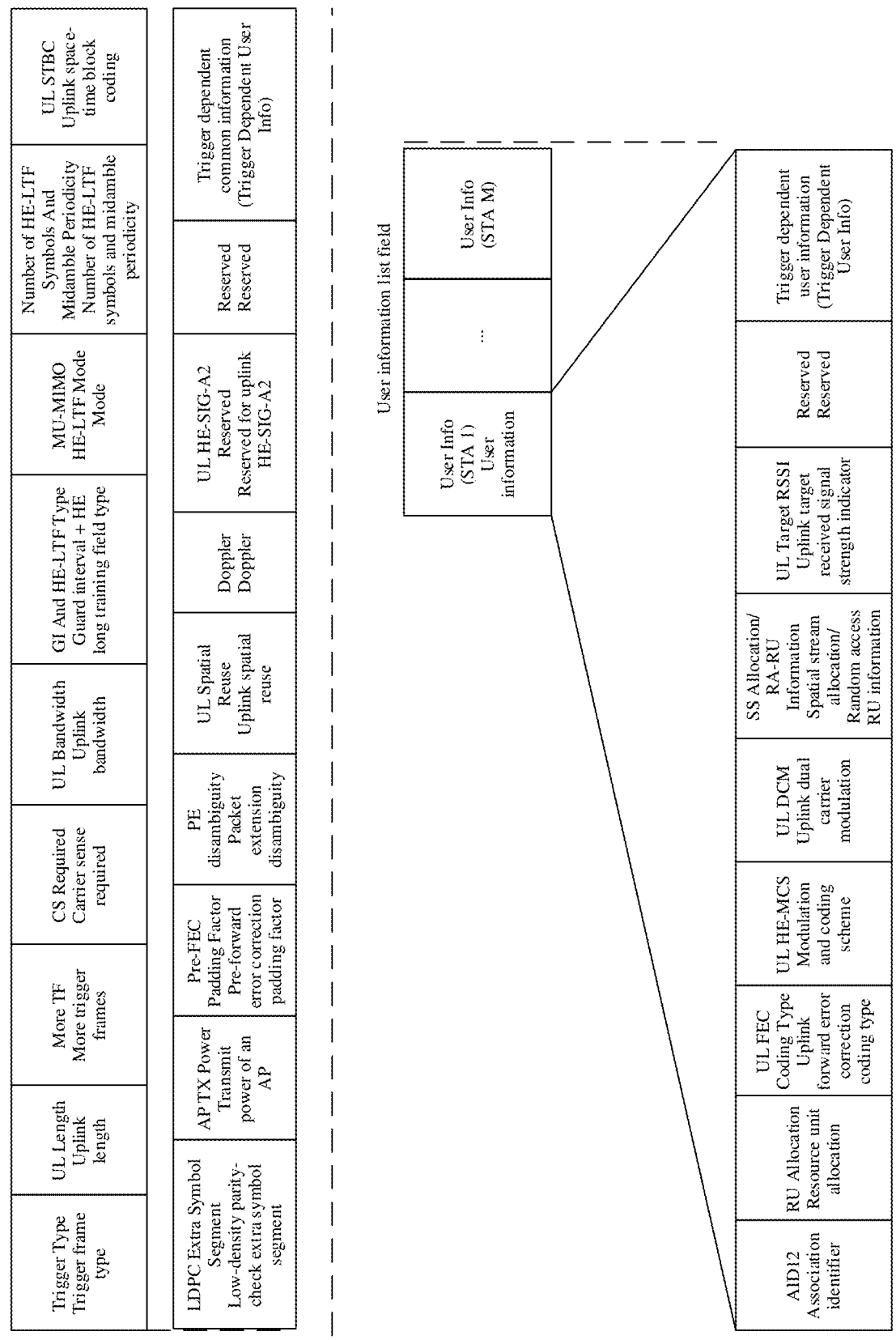
FIG. 5b is a schematic diagram of frame formats of a common information field and a user information field in a trigger frame in 802.11ax.

2. Trigger Frame-Based Uplink Scheduling Transmission Method in the 802.11ax Standard FIG. 4 is a schematic diagram of a trigger frame-based uplink scheduling transmission method in the 802.11ax standard. As shown in FIG. 4, the trigger frame-based uplink scheduling transmission method in the 802.11ax standard specifically includes: (1) An AP sends a trigger frame, where the trigger frame is used for scheduling one or more STAs to send an uplink trigger based HE PPDU. A trigger based HE PPDU may be abbreviated as an HE TB PPDU. FIG. 5a is a schematic diagram of a frame format of a trigger frame. As shown in FIG. 5a, the trigger frame includes a common information (common information) field and a user information list (user information list) field. The common information field includes common information that all STAs need to read, and includes AP transmit power (AP TX Power) field and an uplink spatial reuse (UL Spatial Reuse) field. The user information list field includes one or more user information fields, and one user information field includes information that one STA needs to read. FIG. 5b is a schematic diagram of frame formats of a common information field and a user information field in a trigger frame in 802.11ax. As shown in FIG. 5b, in the user information field, an association identifier 12 (association identification 12, AID12) indicates an association identifier of a STA, and a resource unit (resource unit, RU) allocation (RU allocation) subfield indicates a specific resource unit location allocated to the STA (the STA indicated by the AID12).

(2) After receiving the trigger frame, the one or more STAs parse the trigger frame to obtain a user information field that matches an AID of the STA, and then send the HE TB PPDU on an RU indicated by a resource unit allocation subfield in the user information field.

(3) After receiving the HE TB PPDU, the AP returns an acknowledgment frame to the one or more STAs, to acknowledge that the AP has received the HE TB PPDU.

In an example, for meanings and functions of fields that may be included in the HE TB

TABLE 1

| Acronyms and abbreviations | Full name | Description |
| --- | --- | --- |
| L-STF | Legacy Short Training Field | For PPDU discovery, coarse synchronization, and automatic gain control |
| L-LTF | Legacy Long Training Field | For fine synchronization and channel estimation |
| L-SIG | Legacy Signal Field A | Carrying signaling information related to a PPDU length, to ensure coexistence |
| HE-SIG-A | High Efficiency Signal Field A | Carrying signaling for demodulating subsequent data |
| HE-STF | High Efficiency Short Training Field | For automatic gain control of a subsequent field |
| HE-LTF | High Efficiency Long Training Field | For channel estimation |
| Data | | Carrying data information |

3. Trigger Frame-Based Uplink Scheduling Transmission Method and Corresponding EHT TB PPDU in the 802.11be Standard The trigger frame-based uplink scheduling transmission method in 802.11ax is still used in 802.11be, and a frame format and a method procedure of a trigger frame in 802.11be are similar to those in 802.11ax.

Figure 6A-1:
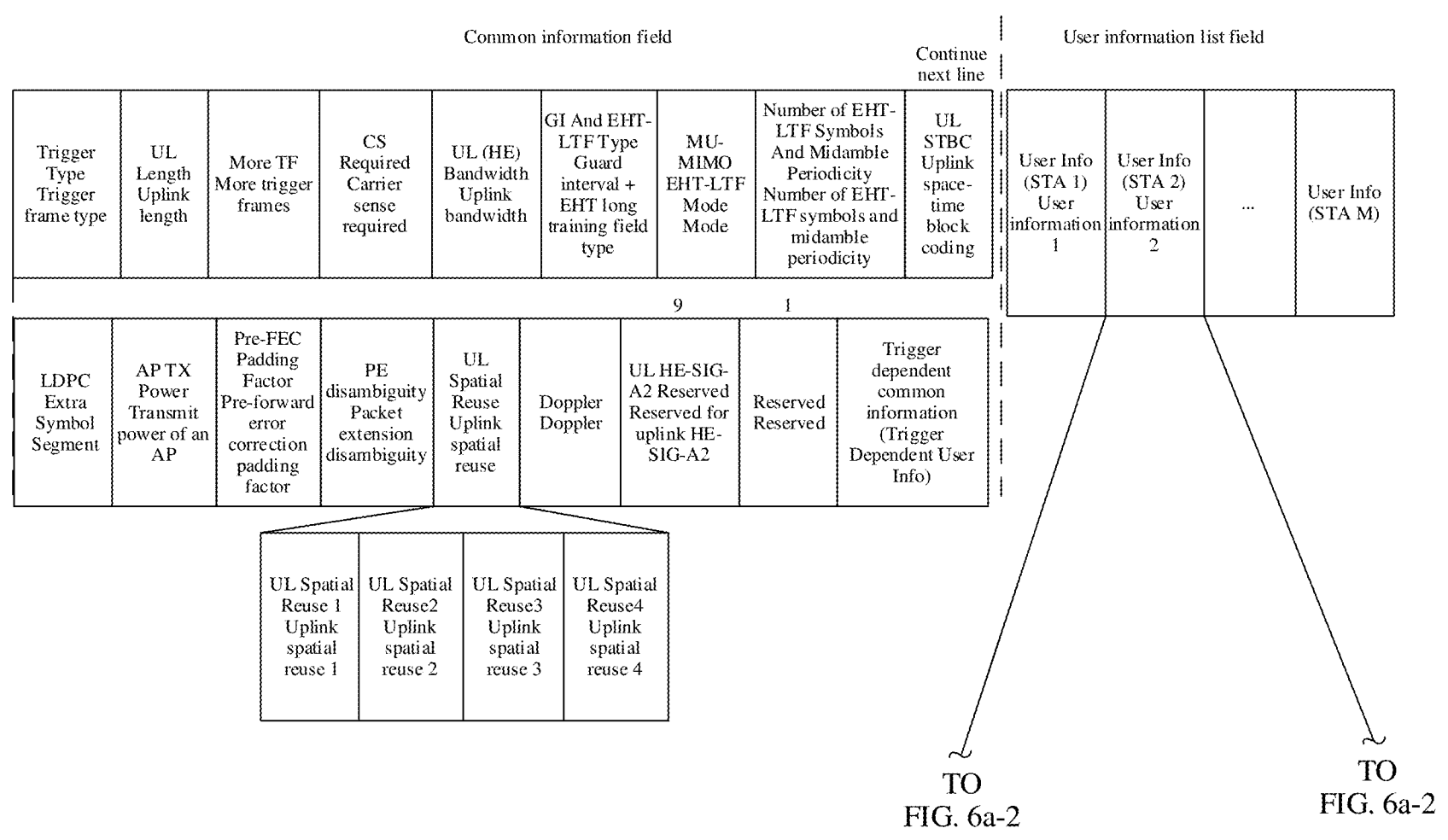
Figures 6B, 7A:
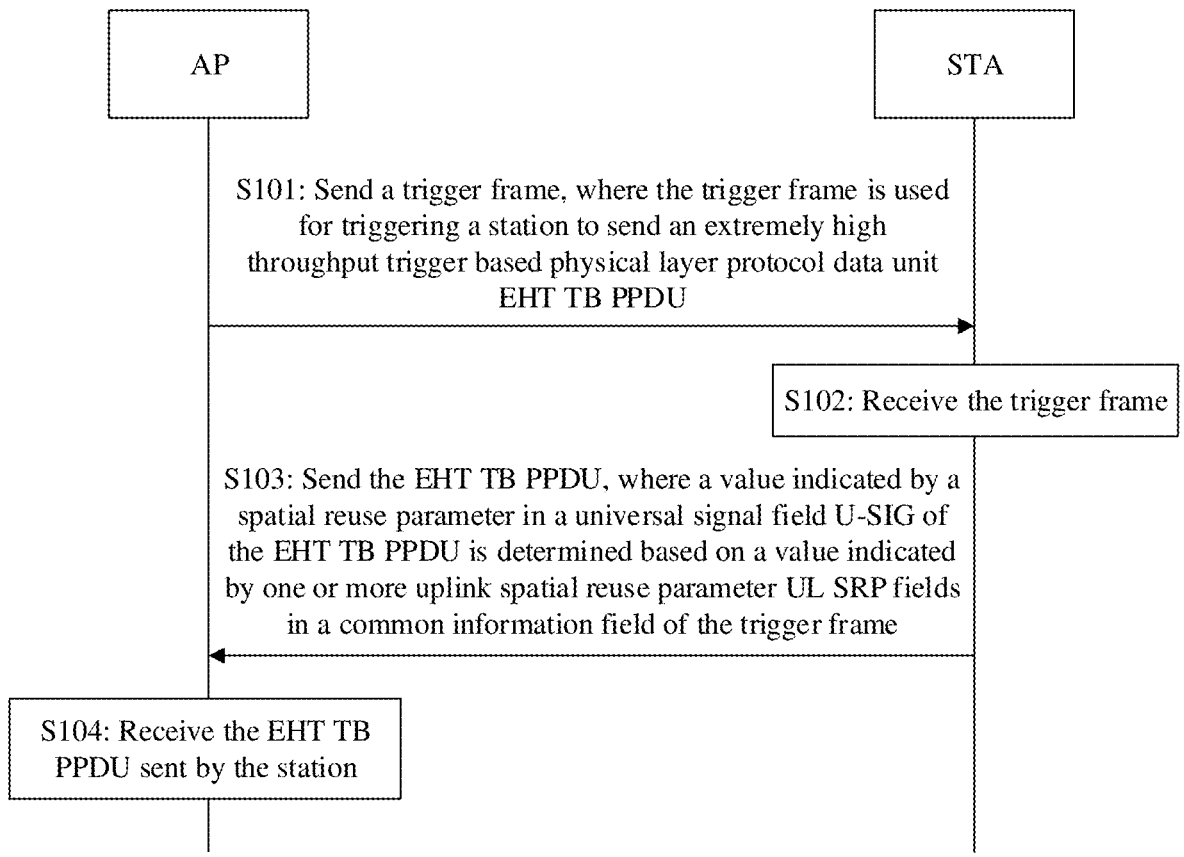
FIG. 6b is a schematic diagram of a frame structure of an EHT TB PPDU.
FIG. 7a is a first schematic flowchart of a method for indicating a spatial reuse parameter in a trigger frame and a corresponding method for determining a spatial reuse parameter field in a PPDU according to an embodiment of this application.

FIG. 6a-1 and FIG. 6a-2 are a schematic diagram of frame formats of a common information field and a user information field in a trigger frame in 802.11be. The trigger frame shown in FIG. 6a-1 and FIG. 6a-2 may be used for scheduling an EHT station to transmit uplink data, for example, schedule the EHT station to send an EHT TB PPDU. It should be understood that FIG. 6a-1 and FIG. 6a-2 are merely an example. In this embodiment of this application, a UL SRP field in an uplink spatial reuse field of the common information field is concerned. Another field in the trigger frame may be different from that in FIG. 6a-1 and FIG. 6a-2, in other words, may be represented in another form. This is not limited in this embodiment of this application. For example, an uplink HE-SIG A2 reserved (UL HE-SIG A2 reserved) field included in a common information field part may also be referred to as a UL U-SIG reserved field. FIG. 6b is a schematic diagram of a frame structure of an EHT TB PPDU. As shown in FIG. 6b, the EHT TB PPDU includes a legacy short training sequence, a legacy long training sequence, a legacy signal field, a repeated legacy signal field, a universal signal field, an extremely high throughput short training sequence, an extremely high throughput long training sequence, a data field, and a data packet extension field. For meanings of fields included in the EHT TB PPDU, refer to the following Table 2.

TABLE 2

| Acronyms and abbreviations | Full name | Description |
|---|---|---|
| L-STF | Legacy Short Training Field | For PPDU discovery, coarse synchronization, and automatic gain control |
| L-LTF | Legacy Long Training Field | For fine synchronization and channel estimation |
| L-SIG | Legacy Signal Field A | Carrying signaling information related to a PPDU length, to ensure coexistence |
| RL-SIG | Repeated Legacy Signal Field | Same as the L-SIG Used together with the L-SIG for automatic detection, to improve reliability |
| U-SIG | Universal SIG | Similar to an HE-SIG-A, a difference is that a unified signal field is used in an EHT PPDU and subsequent standards, and therefore, this field is referred to as the universal signal field |
| EHT-STF | Extremely High Throughput Short Training Field | For automatic gain control of a subsequent field |
| EHT-LTF | Extremely High Throughput Long Training Field | For channel estimation |
| Data | | Carrying data information |
| PE | Packet Extension | For increasing processing time of a receiver |

In an example, content of the U-SIG field in the EHT TB PPDU is shown in Table 3.

TABLE 3

| | | Meaning of a U-SIG field in an EHT TB PPDU | |
|---|---|---|---|
| Field | Category | Subfield | Number of bits |
| U-SIG | (Physical layer) Version independent | Version identifier | 3 |
| | | PPDU bandwidth | 3 |
| | | UL/DL (uplink/downlink) | 1 |
| | | BSS color (basic service set color) | 6 |
| | | TXOP (transmission opportunity) | 7 |
| | | Reserved reserved | 2 |
| | | TBD 1 to be determined 1 (reserved) | 4 |
| | (Physical layer) version dependent | PPDU format & EHT-SIG Compression PPDU format and EHT-SIG compression indication | 2 |
| | | Reserved reserved | 1 |
| | | Spatial Reuse 1 | 4 |
| | | Spatial Reuse 2 | 4 |
| | | TBD2 to be determined 2 (reserved) | 5 |
| | CRC & Tail (Cyclic redundancy check and tail bit) | CRC in U-SIG (cyclic redundancy check) | 4 |
| | | Tail in U-SIG (tail bit) | 6 |
| | | Total # of Bits in U-SIG (Total number of bits in the U-SIG) | 52 |

It can be learned from a structure and the content of the U-SIG of the EHT TB PPDU in FIG. 6b and Table 3 that, due to a length limitation, the U-SIG of the EHT TB PPDU includes a maximum of two SRP fields, for example, a spatial reuse 1 field and a spatial reuse 2 field, and a length of each SRP field is 4 bits. The common information field of the trigger frame carries four UL SRP fields, and an HE-SIG-A field of an HE TB PPDU also includes four SRP fields that are in a one-to-one correspondence with the four UL SRP fields in the trigger frame. Therefore, in a scenario in which the trigger frame is used for scheduling the EHT station to send an uplink EHT TB PPDU, an SRP field in the EHT TB PPDU cannot be set according to a method for setting an SRP field in an HE TB PPDU. Therefore, how to set the trigger frame to indicate to set the SRP field in the EHT TB PPDU, and how to set the SRP field in the EHT TB PPDU when a STA sends the EHT TB PPDU, so that the HE station and the EHT station can be scheduled by using a same trigger frame and feed back a spatial reuse parameter are problems to be urgently resolved.

Embodiments of this application provide a method for indicating a spatial reuse parameter in a trigger frame and a method for determining a spatial reuse parameter field in a PPDU. For different bandwidths, a trigger frame is designed and a spatial reuse parameter in an EHT TB PPDU is set without changing a frame structure of the EHT TB PPDU, so that an HE station and an EHT station can be scheduled by using a same trigger frame, and spatial reuse can be implemented in the EHT standard. In this way, WLAN devices in an overlapping basic service set can perform transmission simultaneously, to improve transmission efficiency.

The following describes in detail the technical solutions provided in this application with reference to more accompanying drawings.

Technical solutions provided in this application are described by using Embodiment 1 to Embodiment 5. Embodiment 1 describes how to set spatial reuse parameters in EHT TB PPDUs with different bandwidths (20/40/80/160/320 MHz) without changing 802.11ax. Embodiment 2 describes how to use a reserved field in a common information field of a trigger frame to implement a function of an uplink EHT spatial reuse field (an HE-SIG-A2 reserved field and a reserved field are collectively referred to as the reserved field), to indicate a spatial reuse parameter in an EHT TB PPDU. Embodiment 3 describes how to indicate a spatial reuse parameter in an EHT TB PPDU by using a reserved field in a common information field and a user information list field in a trigger frame. Embodiment 4 describes a spatial reuse method based on a spatial reuse parameter in 802.11be. It may be understood that any combination of technical solutions described in Embodiment 1 to Embodiment 4 of this application may form a new embodiment.

It may be understood that the AP and the STA in this application may be a single-link device, or may be a functional entity or a functional unit in a multi-link device. For example, the AP in this application is an AP in an AP multi-link device, and the STA is a STA in a station multi-link device. This is not limited in this application.

It may be understood that the following describes the methods provided in this application by using a communication system including one or more APs and one or more STAs as an example. The AP supports the 802.11be protocol (or referred to as the Wi-Fi 7, the EHT protocol), and may further support another WLAN communication protocol, for example, protocols such as the 802.11ax and the 802.11ac. At least one STA in the one or more STAs supports the 802.11be protocol, in other words, there is at least one EHT station. It should be understood that the AP and the STA in this application may further support a next-generation 802.11be protocol. In other words, the method provided in this application is not only applicable to the 802.11be protocol, but also applicable to the next-generation 802.11be protocol.

Embodiment 1

Embodiment 1 of this application mainly describes setting of a spatial reuse parameter in an EHT TB PPDU with a bandwidth of 20/40/80/160/320 MHz when a trigger frame is not changed (or content of the trigger frame is not changed).

In Embodiment 1, the trigger frame is shown in FIG. 5b.

FIG. 7a is a first schematic flowchart of a method for indicating a spatial reuse parameter in a trigger frame and a corresponding method for determining a spatial reuse parameter field in a PPDU according to an embodiment of this application. As shown in FIG. 7a, the method includes but is not limited to the following steps.

S101: An AP sends a trigger frame, where the trigger frame is used for triggering a station to send an extremely high throughput trigger based physical layer protocol data unit EHT TB PPDU.

S102: The STA receives the trigger frame.

S103: The STA sends the EHT TB PPDU, where there is only one spatial reuse parameter SRP field in a universal signal field U-SIG of the EHT TB PPDU, and the SRP field indicates a spatial reuse parameter of an entire bandwidth. A value indicated by the SRP field is determined based on a value indicated by one or more uplink spatial reuse parameter UL SRP fields in a common information field of the trigger frame.

Figure 7B:
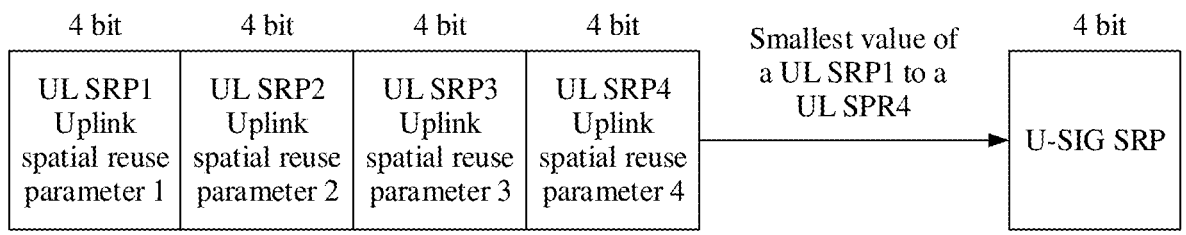

In an implementation, as shown in FIG. 7b, a value indicated by the SRP1 field is equal to a smallest value of four spatial reuse fields indicated by four uplink spatial reuse parameter UL SRP fields, and may be represented as SRP=min{UL SRP1, UL SRP2, UL SRP3, UL SRP4}.

In another implementation, a value indicated by the SRP1 field is equal to any value of four spatial reuse fields indicated by four uplink spatial reuse parameter UL SRP fields, and may be represented as that the SRP1 is equal to a UL SRP1, a UL SRP2, a UL SRP3, or a UL SRP4.

S104: The AP receives the EHT TB PPDU sent by the station.

Figure 8A:
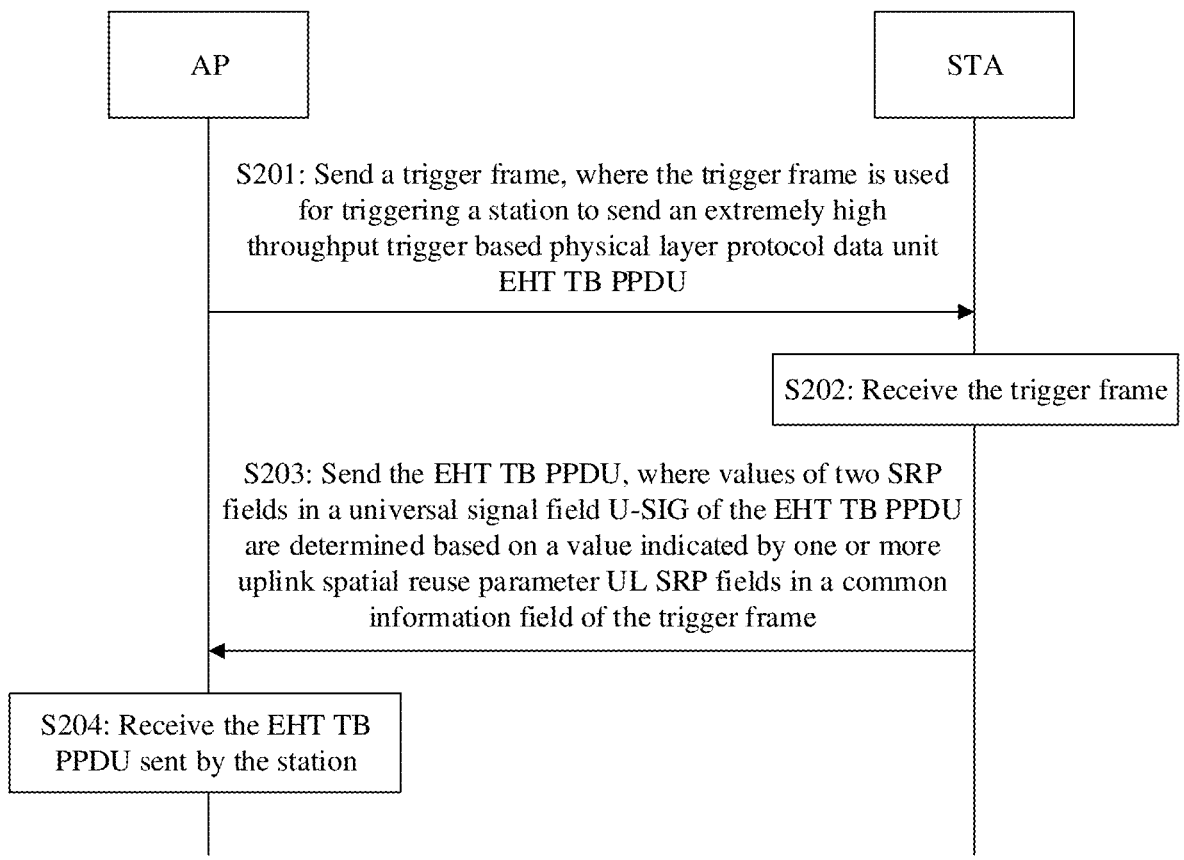
FIG. 8a is a second schematic flowchart of a method for indicating a spatial reuse parameter in a trigger frame and a corresponding method for determining a spatial reuse parameter field in a PPDU according to an embodiment of this application.

FIG. 8a is a second schematic flowchart of a method for indicating a spatial reuse parameter in a trigger frame and a corresponding method for determining a spatial reuse parameter field in a PPDU according to an embodiment of this application. As shown in FIG. 8a, the method includes but is not limited to the following steps.

S201: An AP sends a trigger frame, where the trigger frame is used for triggering a station to send an extremely high throughput trigger based physical layer protocol data unit EHT TB PPDU. For a structure and composition of the trigger frame, refer to FIG. 6a-1 and FIG. 6a-2.

S202: The STA receives the trigger frame.

S203: The STA sends the EHT TB PPDU, where a universal signal field U-SIG of the EHT TB PPDU includes two spatial reuse parameters, an SRP1 field and an SRP2 field, which respectively indicate a spatial reuse parameter corresponding to a low frequency half and a spatial reuse parameter corresponding to a high frequency half in an entire bandwidth. Values indicated by the spatial reuse parameter SRP1 field and the SRP2 field are each determined based on a value indicated by one or more uplink spatial reuse parameter UL SRP fields in a common information field of the trigger frame.

In an implementation, the SRP1 field and the SRP2 field each indicate an SRP value of a different subchannel, and the SRP value is equal to a sum of transmit power of the AP on the corresponding subchannel and maximum interference power that can be accepted by the AP. It should be understood that the SRP1 field and the SRP2 field in the U-SIG of the EHT TB PPDU may have other names, for example, a PSR1 field and a PSR2 field. This is not limited in this embodiment of this application.

Figure 8B:
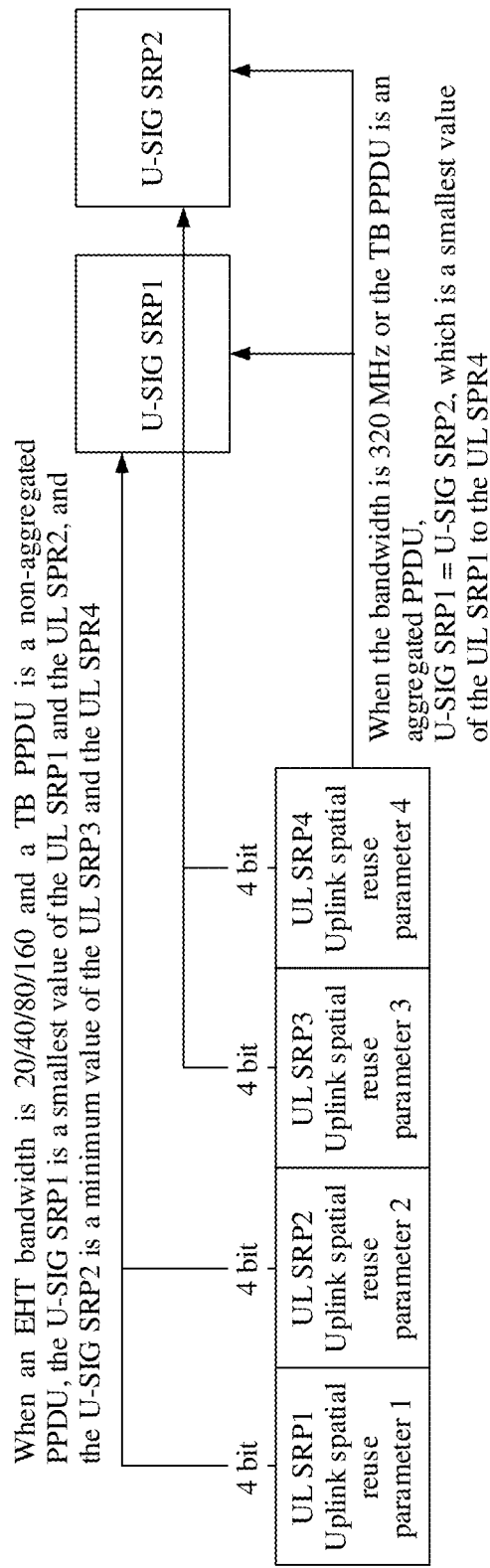

In an implementation, as shown in FIG. 8b, when the bandwidth of the EHT TB PPDU is 20/40/80/160 MHz and the EHT TB PPDU is a non-aggregated PPDU, the value of the SRP1 field in the U-SIG is equal to a smallest value of a UL SR1 field and a UL SR2 field in four spatial reuse fields indicated by an uplink spatial reuse field of the trigger frame; and may be represented as SRP1=min{UL SRP1, UL SRP2}.

The value of the SRP2 field in the U-SIG may be equal to a smallest value of a UL SR3 field and a UL SR4 field in the four spatial reuse fields indicated by the uplink spatial reuse field of the trigger frame, and may be represented as SRP2=min{SRP3, UL SRP4}.

In an implementation, as shown in FIG. 8b, when the EHT bandwidth is 320 MHz or the TB PPDU is an aggregated PPDU, the value of the SRP1 field in the U-SIG is equal to the value of the SRP2 field, both the SRP1 field and the SRP2 field are equal to a smallest value of four spatial reuse fields indicated by an uplink spatial reuse field in the trigger frame, and SRP1=SRP2=min{UL SRP1, UL SRP2, UL SRP3, UL SRP4}.

S204: The AP receives the EHT TB PPDU sent by the station.

Optionally, the trigger frame in procedures of the method for indicating a spatial reuse parameter in a trigger frame shown in 7a and 8a may be not only used for triggering an EHT station to send the EHT TB PPDU, but also used for triggering an HE station to send an HE TB PPDU. Alternatively, the trigger frame is only used for triggering an EHT station to send the EHT TB PPDU, or only used for triggering an HE station to send the HE TB PPDU. This embodiment of this application focuses on a case in which the trigger frame is used for triggering the EHT station to send the EHT TB PPDU, but is not limited to a case in which the trigger frame is only used for triggering the EHT station to send the EHT TB PPDU, and may also include a case in which the trigger frame is used for triggering the EHT station to send the EHT TB PPDU and triggering the HE station/EHT station send the HE TB PPDU at the same time. It may be understood that the HE station can send only the HE TB PPDU, but the EHT station may be compatible with the 802.11ax protocol. Therefore, the EHT station may send both the HE TB PPDU and the EHT TB PPDU.

Figure 9:
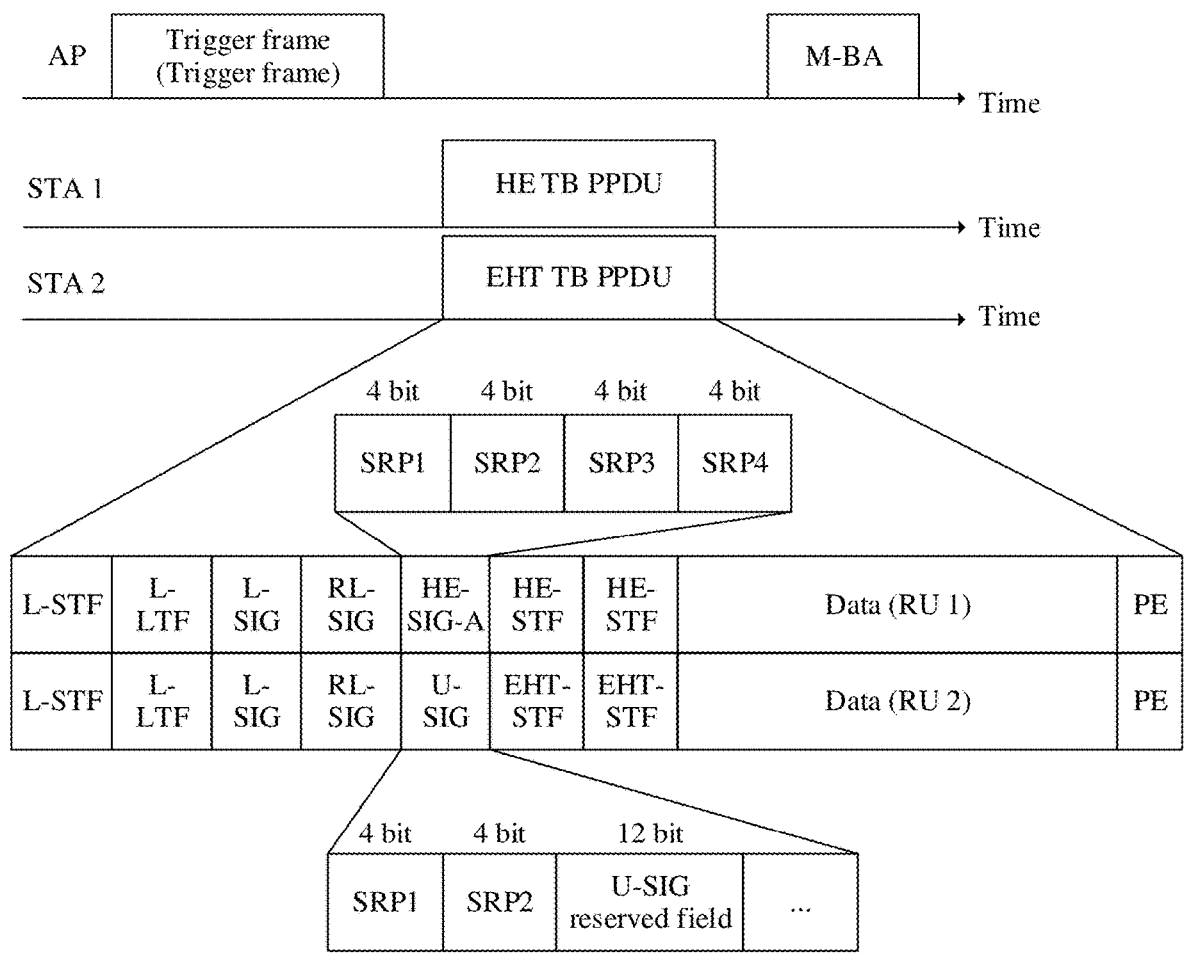
FIG. 9 is a schematic diagram of a time sequence in which a trigger frame is used for scheduling both an HE station and an EHT station for uplink data transmission according to an embodiment of this application.

FIG. 9 is a schematic diagram of a time sequence in which a trigger frame is used for scheduling both an HE station and an EHT station for uplink data transmission according to an embodiment of this application. As shown in FIG. 9, an AP sends a trigger frame, and the trigger frame is used for simultaneously scheduling an HE station (for example, a STA 1 in FIG. 9) and an EHT station (for example, a STA 2 in FIG. 9) to perform uplink data transmission. After the STA 1 and the STA 2 receive the trigger frame, the STA 1 sends an HE TB PPDU and the STA 2 sends an EHT TB PPDU after a period of time (for example, a short interframe space). After receiving an uplink multi-user PPDU, the AP return a multi-station block acknowledgment (Multiple STA Block Acknowledgment, M-BA) frame after a period of time (for example, a short interframe space), to acknowledge that the AP has received a PPDU sent by the one or more stations. It may be understood that the trigger frame shown in FIG. 9 may only be used for scheduling the EHT station, in other words, both the STA 1 and the STA 2 in FIG. 9 are EHT stations. It should be further understood that the trigger frame shown in FIG. 9 may also be used for scheduling only a station to send an EHT TB PPDU, in other words, both the STA 1 and the STA 2 in FIG. 9 send EHT TB PPDUs.

Specifically, the trigger frame may be sent through broadcast. After the AP sends the trigger frame, one or more stations may receive the trigger frame. If the trigger frame is used for simultaneously scheduling the EHT station to send the EHT TB PPDU and the HE station to send the HE TB PPDU, the EHT station may set, based on a value indicated by one or more UL SRP fields in a common information field of the received trigger frame, values indicated by an SRP1 field and an SRP2 field in a U-SIG of the EHT TB PPDU, and send the EHT TB PPDU. In other words, the EHT station may alternatively set, based on the value indicated by the one or more UL SRP fields in the common information field of the received trigger frame, the values indicated by the SRP1 field and the SRP2 field in a U-SIG of the EHT TB PPDU. The E station may copy values of four UL SRP fields in the received trigger frame to four SRP fields in the HE TB PPDU one by one, and send the HT TB PPDU.

Optionally, a correspondence between values and meanings of the UL SRP fields or the SRP fields in this application may be shown in the following Table 4. The uplink spatial reuse parameter (UL SRP) field may also be referred to as an uplink parameter spatial reuse (UL PSR) field. In this application, the UL SRP and the UL PSR may be used interchangeably, that is, an SRP and a PSR may be used interchangeably. It may be understood that the value of the uplink spatial reuse parameter is determined by the AP, and is equal to a sum of transmit power of the AP and maximum interference power that can be accepted by the AP.

TABLE 4

| Value of a UL SRP/SRP field | Description |
| --- | --- |
| 0 | SRP_Disallow (Parameter spatial reuse is disallowed) |
| 1 | SRP = −80 dBm |
| 2 | SRP = −74 dBm |
| 3 | SRP = −68 dBm |
| 4 | SRP = −62 dBm |
| 5 | SRP = −56 dBm |
| 6 | SRP = −50 dBm |
| 7 | SRP = −47 dBm |
| 8 | SRP = −44 dBm |
| 9 | SRP = −41 dBm |

TABLE 4-continued

| Value of a UL SRP/SRP field | Description |
| --- | --- |
| 10 | SRP = −38 dBm |
| 11 | SRP = −35 dBm |
| 12 | SRP = −32 dBm |
| 13 | SRP = −29 dBm |
| 14 | SRP ≥ −26 dBm |
| 15 | SRP_AND_NON_SRG_OBSS_PD_PROHIBITED (SRP and non-SR group (group) OBSS-packet detection (Packet Detection) is prohibited) |

It may be understood that, in this application, a value indicated by the UL SRP field may be any value in the second column in Table 4, and a value of the UL SRP field may be any value in the first column in Table 4.

Embodiment 2

Embodiment 2 of this application mainly describes how to set a trigger frame (in other words, change content of the trigger frame) to adapt to an SRP field of a U-SIG, and how to set a spatial reuse parameter in a trigger-based PPDU (HE TB PPDU and EHT TB PPDU) after content of the trigger frame changes.

It may be understood that, in actual application, Embodiment 2 of this application may be implemented with reference to some implementations in Embodiment 1, or may be separately implemented. This is not limited in this embodiment of this application.

In Embodiment 2, the HE-SIG-A2 reserved field of the trigger frame shown in FIG. 5b or FIG. 6a-1 and FIG. 6a-2 is used, or the reserved field is further used, for indicating a spatial reuse parameter in the EHT TB PPDU.

Figure 10A:
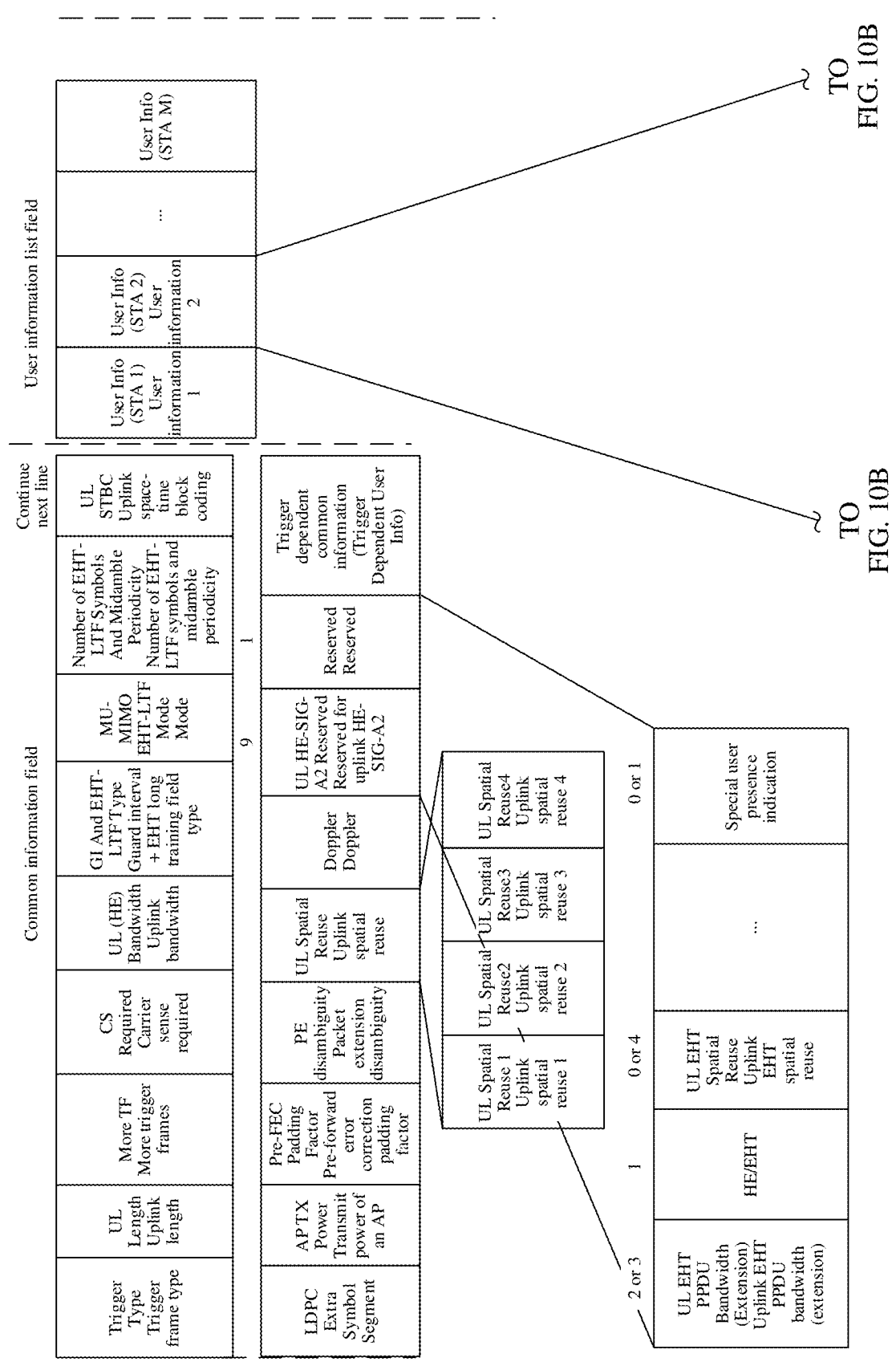

Specifically, as shown in FIG. 10A and FIG. 10B, a reserved field (the reserved field includes an HE-SIG-A2 reserved field and a reserved field) in a common information field of a trigger frame is used for setting an uplink EHT PPDU bandwidth subfield, an HE/EHT subfield indicating an EHT STA to send an EHT TB PPDU or an HE TB PPDU, and an uplink EHT spatial reuse field. Optionally, a special user presence indication subfield may further be included. The uplink EHT spatial reuse field separately indicates a spatial reuse parameter in the EHT TB PPDU, or is used together with an uplink spatial reuse field to indicate a spatial reuse parameter in the EHT TB PPDU. In other words, a value of an SRP field in a U-SIG of the EHT TB PPDU depends on at least one of the uplink EHT spatial reuse field and the uplink spatial reuse field.

Content of the HE-SIG-A2 reserved field and the reserved field of the trigger frame in FIG. 10A and FIG. 10B is shown in Table 5.

TABLE 5

| Uplink HE-SIG-A2 reserved field and/or reserved field | | |
| --- | --- | --- |
| Subfield | Bit | Description |
| Uplink EHT PPDU bandwidth (extension) field | 2 or 3 | Indicates, together with a UL (HE) BW field, an uplink HE bandwidth and an uplink EHT bandwidth (2 bits), or separately indicates an uplink EHT PPDU bandwidth (3 bits). |
| Uplink EHT spatial reuse (parameter), Spatial Reuse Parameters - SRP | 0 or 4 | Indicates a value of an SRP field of a U-SIG part of an EHT TB PPDU separately or together with an uplink spatial reuse field. |
| Special user presence indication | 0 or 1 | Explicitly indicates whether a special user information field is present, or may indirectly indicate based on whether a special AID is present. |

It should be understood that the uplink HE-SIG-A2 reserved field and/or reserved field may include a part of or all of the subfields. It should be further understood that the subfields in Table 5 may alternatively have other names. This is not limited in the example in this application. A number of bits occupied by each subfield is an example. This is not limited in this embodiment of this application.

The meaning of the uplink EHT PPDU bandwidth field in Table 5 when the uplink EHT PPDU bandwidth field separately indicates the uplink EHT PPDU bandwidth is shown in Table 6.

TABLE 6

An uplink EHT PPDU bandwidth field separately indicates an uplink EHT PPDU bandwidth

| Uplink EHT PPDU bandwidth field | Description |
| --- | --- |
| 000 | 20 MHz |
| 001 | 40 MHz |
| 010 | 80 MHz |
| 011 | 160 MHz |
| 100 | 320 MHz |
| 101 | Reserved |
| 110 | Reserved |
| 111 | Reserved |

It should be understood that a correspondence between the values of the uplink EHT PPDU bandwidth field and the meanings of the values is an example. In this embodiment of this application, there may be another correspondence. For example, 100 may indicate 320 MHz-1, 101 may indicate 320 MHz-2, and 320 MHz-1 and 320 MHz-2 respectively represent two types of 320 MHz channel division: 320 MHz-1 whose channel center frequency is 31/95/159 and 320 MHz-2 whose channel center frequency is 63/127/191.

It should be noted that two reservation indications are introduced in a current standard. One is a validate (validate) reserved bit/entry, and when a receive end does not understand an indication of the field, the frame is disregarded. The other is a disregard (disregard) reserved bit/entry, and when the receive end does not understand an indication of the field, the field is ignored, and another field is continued to be interpreted. For the uplink EHT PPDU bandwidth field, a reserved entry needs to be a validate reserved entry. In other words, when a non-EHT receive end does not understand an indication of the field, the frame is disregarded.

The following describes, with reference to the trigger frame shown in FIG. 10A and FIG. 10B, a method for indicating a spatial reuse parameter in a trigger frame and a corresponding method for determining a spatial reuse parameter field in a PPDU.

Figure 11:
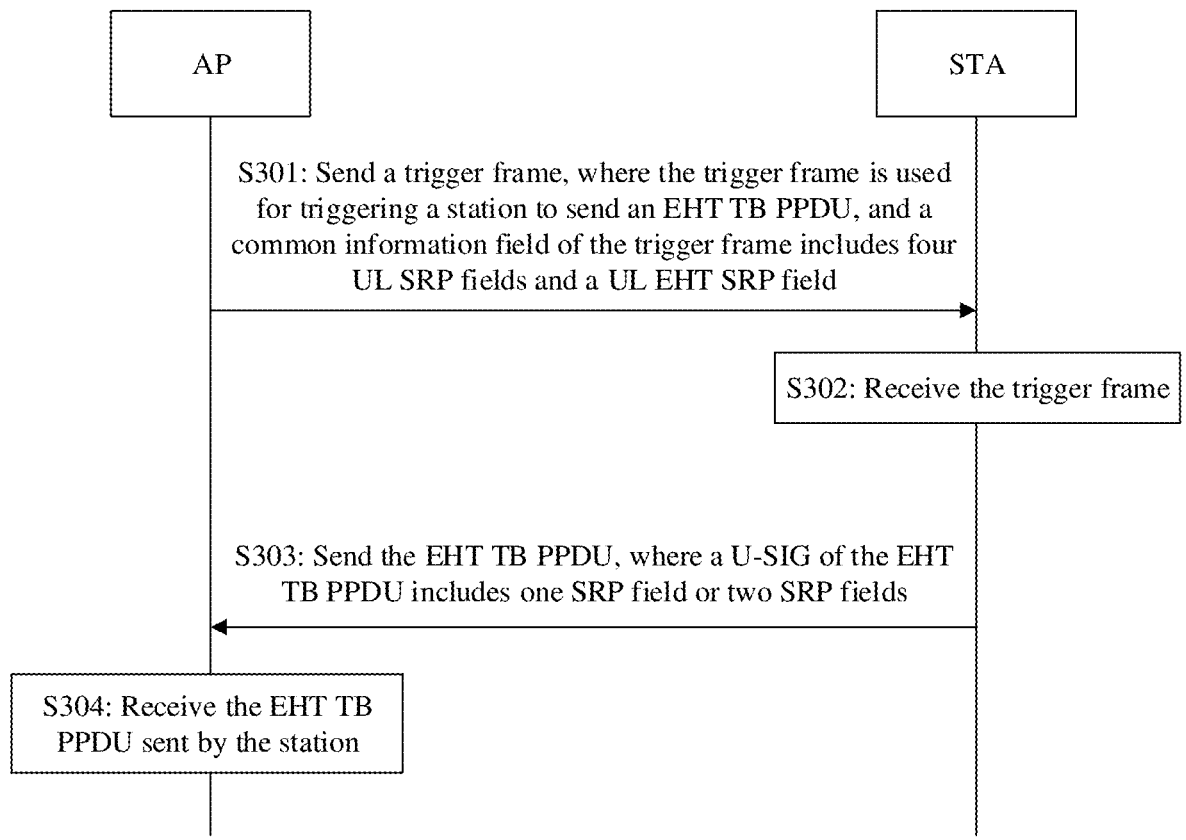
FIG. 11 is a third schematic flowchart of a method for indicating a spatial reuse parameter in a trigger frame and a method for determining a spatial reuse parameter field in a PPDU according to an embodiment of this application.

FIG. 11 is a third schematic flowchart of a method for indicating a spatial reuse parameter in a trigger frame and a corresponding method for determining a spatial reuse parameter field in a PPDU according to an embodiment of this application. As shown in FIG. 11, the method for indicating a spatial reuse parameter in a trigger frame and the corresponding method for determining a spatial reuse parameter field in a PPDU include but is not limited to the following steps.

S301: An AP sends a trigger frame, where the trigger frame is used for triggering a station to send an EHT TB PPDU, an uplink spatial reuse field of a common information field of the trigger frame includes four UL SRP fields, and a UL HE-SIG-A2 reserved field and/or a UL HE-SIG-A2 reserved field of the trigger frame are/is used as an EHT spatial reuse parameter. In an implementation, as shown in FIG. 10A and FIG. 10B, the UL HE-SIG-A2 reserved field and/or the UL HE-SIG-A2 reserved field include/includes: an uplink EHT PPDU bandwidth subfield, an HE/EHT subfield, an uplink EHT spatial reuse field, and a special user presence indication field.

S302: The STA receives the trigger frame.

S303: The STA sends the EHT TB PPDU, where a U-SIG of the EHT TB PPDU may include one SRP field or two SRP fields.

Figure 12A:
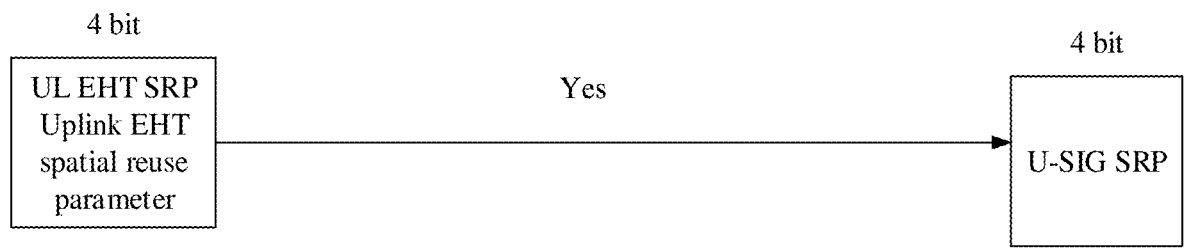
FIG. 12a is a schematic diagram of a relationship between a U-SIG SRP field and a UL EHT SRP field in the method in FIG. 11.

In an implementation, as shown in FIG. 12*a*, the U-SIG includes only one SRP field, indicating a spatial reuse parameter of an entire bandwidth. In this case, a value of the SRP field is equal to a value of the uplink EHT spatial reuse field.

Figure 12B:
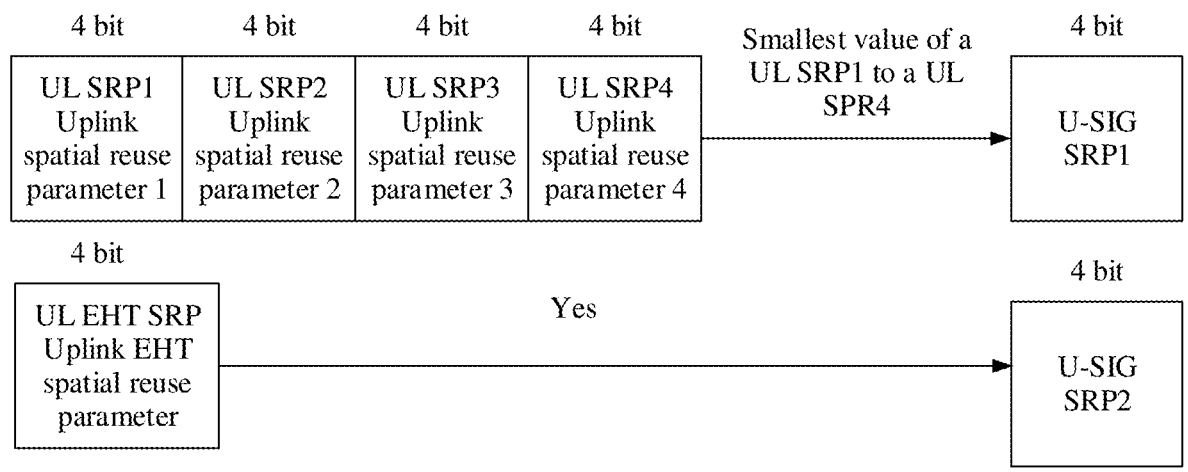
FIG. 12b is a schematic diagram of a relationship between a U-SIG SRP1 field, a U-SIG SRP2 field, and a UL SRP field in the method in FIG. 11.

In another implementation, as shown in FIG. 12*b*, the U-SIG includes two SRP fields, represented as a U-SIG SRP1 and a U-SIG SRP2, which respectively indicate a spatial reuse parameter of a low frequency half and a spatial reuse parameter of a high frequency half in an entire bandwidth. A value of the SRP1 field is indicated by the uplink spatial reuse field in the trigger frame. In an example, the U-SIG SRP1 field may be equal to a smallest value or any value of the four spatial reuse fields indicated by the spatial reuse field. A value of the U-SIG SRP2 field is indicated by the uplink EHT spatial reuse field in the trigger frame.

Figure 12C:
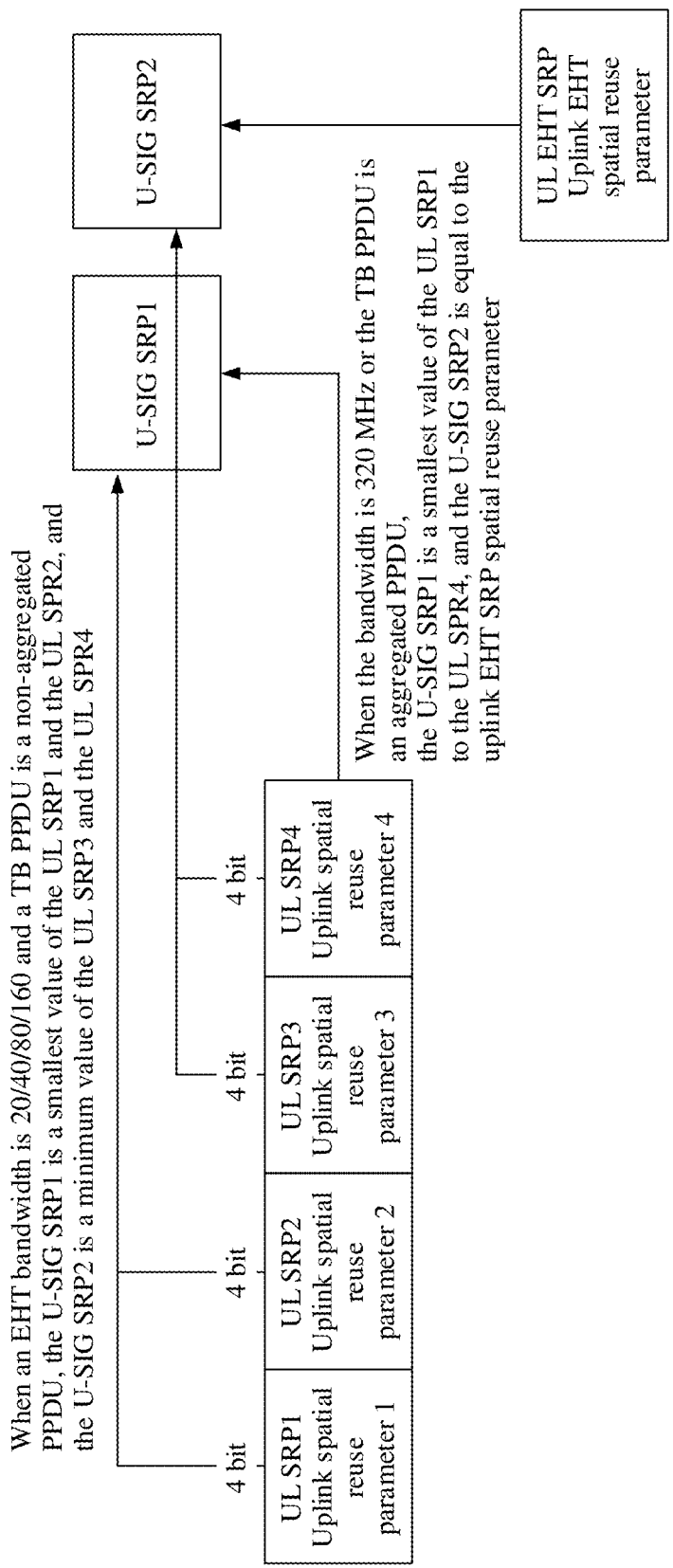
FIG. 12c is a schematic diagram of a relationship between a U-SIG SRP1 field, a U-SIG SRP2 field, and a UL SRP field in the method in FIG. 11.

In still another implementation, as shown in FIG. 12*c*, the U-SIG includes two SRP fields, represented as a U-SIG SRP1 and a U-SIG SRP2.

When a bandwidth is 20/40/80/160 MHz and the TB PPDU is a non-aggregated PPDU, the uplink spatial reuse field only indicates the two SRP fields. A value of the U-SIG SRP1 field may be equal to a smallest value or any one of a UL SRP1 field and a UL SR2 field in the four spatial reuse fields indicated by the spatial reuse field. A value of the U-SIG SRP2 field may be equal to a smallest value or any value of a UL SR3 field and a UL SR4 field in the four spatial reuse fields indicated by the spatial reuse field. In this case, the uplink EHT spatial reuse field is reserved or does not exist.

When a bandwidth is 320 MHz or the TB PPDU is an aggregated PPDU, the uplink spatial reuse field indicates the SRP1 field in the two SRPs. A value of the U-SIG SRP1 field may be equal to a smallest value of the four spatial reuse fields indicated by the spatial reuse field, and a value of the U-SIG SRP2 field is equal to a value indicated by the uplink EHT spatial reuse field.

S304: The AP receives the EHT TB PPDU sent by the station.

In an implementation, the trigger frame may be not only used for triggering an EHT station to send the EHT TB PPDU, but also used for triggering an HE station to send the HE TB PPDU. Alternatively, the trigger frame is only used for triggering an EHT station to send the EHT TB PPDU, or only used for triggering an HE station to send the HE TB PPDU. This embodiment of this application focuses on a case in which the trigger frame is used for triggering the EHT station to send the EHT TB PPDU, but is not limited to a case in which the trigger frame is only used for triggering the EHT station to send the EHT TB PPDU, and may also include a case in which the trigger frame is used for triggering the EHT station to send the EHT TB PPDU and triggering the HE station/EHT station send the HE TB PPDU at the same time.

In an implementation, the U-SIG of the EHT TB PPDU includes only one spatial reuse parameter (SRP) field, for example, an SRP1 field; or may include two spatial reuse parameter (SRP) fields, an SRP1 field and an SRP2 field. The SRP1 field and the SRP2 field each indicate an SRP value of a different subchannel, and the SRP value is equal to a sum of transmit power of the AP on the corresponding subchannel and maximum interference power that can be accepted by the AP. It should be understood that the SRP1 field and the SRP2 field in the U-SIG of the EHT TB PPDU may have other names, for example, a PSR1 field and a PSR2 field. This is not limited in this embodiment of this application.

The uplink spatial reuse field in the common information field of the trigger frame still includes the four UL SRP fields: the UL SRP1 field, the UL SRP2 field, the UL SRP3 field, and the UL SRP4 field. The uplink EHT spatial reuse field in the common information field of the trigger frame is represented as a UL EHT SRP. Spatial reuse fields in the U-SIG of the EHT TB PPDU are represented as the SRP1 and the SRP2.

It may be understood that, in actual application, if Embodiment 2 of this application is implemented with reference to Embodiment 1, in a bandwidth of 20/40/80/160/320 MHz, settings of the UL SRP1 field to the UL SRP4 field in the trigger frame, and settings of the SRP1 field and the SRP2 field in the U-SIG of the EHT TB PPDU may be summarized as Table 7. "/" in Table 7 represents an "or" relationship.

trigger frame is used or the HE-SIG-A2 reserved field and/or the reserved field in the trigger frame are/is further used as the UL EHT spatial reuse field, to indicate to set the SRP field of the U-SIG. The spatial reuse field in the U-SIG of the EHT TB PPDU is set, so that the trigger frame can be used for scheduling the EHT station to send an uplink EHT TB PPDU, and the HE station and the EHT station can be scheduled by using a same trigger frame.

Embodiment 3

Embodiment 3 of this application mainly describes a technical solution in which a trigger frame carries a special user information field, to separately indicate a spatial reuse parameter and a U-SIG reserved field for an EHT TB PPDU, and how to set the spatial reuse parameter and the U-SIG reserved field of the EHT TB PPDU when the trigger frame does not carry the special user information field.

It may be understood that, in actual application, Embodiment 3 of this application may be implemented with reference to the foregoing Embodiment 1 or Embodiment 2 in terms of manners of setting the SRP1 field and the SRP2 field in the U-SIG in bandwidths of 20 MHz, 40 MHz, 80 MHz, and 160 MHz. Embodiment 3 of this application may alternatively be separately implemented. This is not limited in this embodiment of this application.

TABLE 7

| Status | Trigger frame | U-SIG |
|---|---|---|
| 1 | UL SRP1, UL SRP2, UL SRP3, and UL SRP4 No UL EHT SRP | SRP1 = min{UL SRP1, UL SRP2, UL SRP3, UL SRP4} or SRP1 = UL SRP1/UL SRP2/UL SRP3/UL SRP4 |
| 2 | UL SRP1, UL SRP2, UL SRP3, and UL SRP4 No UL EHT SRP | An EHT bandwidth is 20/40/80/160 MHz, and the TB PPDU is a non-aggregated TB PPDU SRP1 = min{UL SRP1, UL SRP2}, or SRP1 = UL SRP1/UL SRP2; SRP2 = min{UL SRP3, UL SRP4}, or SRP2 = UL SRP3/UL SRP4 The EHT bandwidth is 320 MHz or the TB PPDU is an aggregated TB PPDU SRP1 = SRP2 = min{UL SRP1, UL SRP2, UL SRP3, UL SRP4} or SRP1 = SRP2 = UL SRP1/UL SRP2/UL SRP3/UL SRP4 |
| 3 | UL EHT SRP | SRP1 = UL EHT SRP |
| 4 | UL SRP1, UL SRP2, UL SRP3, and UL SRP4; UL EHT SRP | SRP1 = min{UL SRP1, UL SRP2, UL SRP3, UL SRP4} or SRP1 = UL SRP1/UL SRP2/UL SRP3/UL SRP4; SRP2 = UL EHT SRP |
| 5 | UL SRP1, UL SRP2, UL SRP3, and UL SRP4; UL EHT SRP | The EHT bandwidth is 20/40/80/160 MHz, the EHT TB PPDU is a non-aggregated EHT TB PPDU, and the UL EHT SRP is reserved or does not exist SRP1 = min{UL SRP1, UL SRP2}, or SRP1 = UL SRP1/UL SRP2; SRP2 = min{UL SRP3, UL SRP4}, or SRP2 = UL SRP3/UL SRP4. The EHT bandwidth is 320 MHz or the EHT TB PPDU is a non-aggregated EHT TB PPDU SRP1 = min{UL SRP1, UL SRP2, UL SRP3, UL SRP4} or SRP1 = UL SRP1/UL SRP2/UL SRP3/UL SRP4; SRP2 = UL EHT SRP |

It should be understood that, in an aggregated PPDU scenario, bandwidths of an HE TB PPDU and an EHT TB PPDU each are 160 MHz, or the bandwidth of the HE TB PPDU is 80 MHz, and the bandwidth of the EHT TB PPDU is 160 MHz, or is 320 MHz with 80 MHz punctured.

It should be further understood that, in the aggregated PPDU scenario, setting of a spatial reuse parameter in an HE-SIG-A of the HE TB PPDU complies with the conventional technology. Details are not described herein again.

Figure 13A:
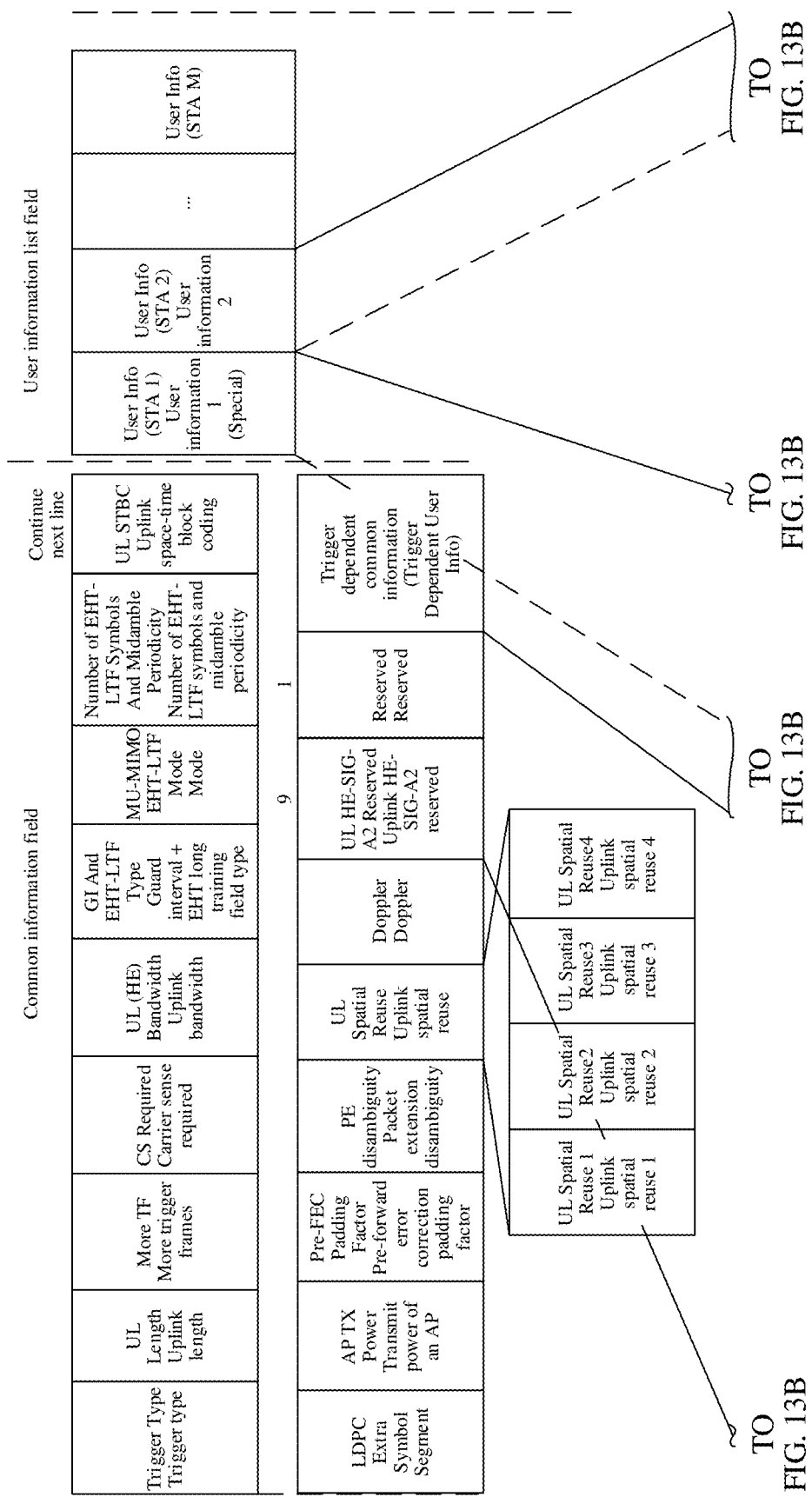
FIG. 13A and FIG. 13B are another schematic diagram of frame formats of a common information field and a user information field in a trigger frame in 802.11be.
Figure 13B:
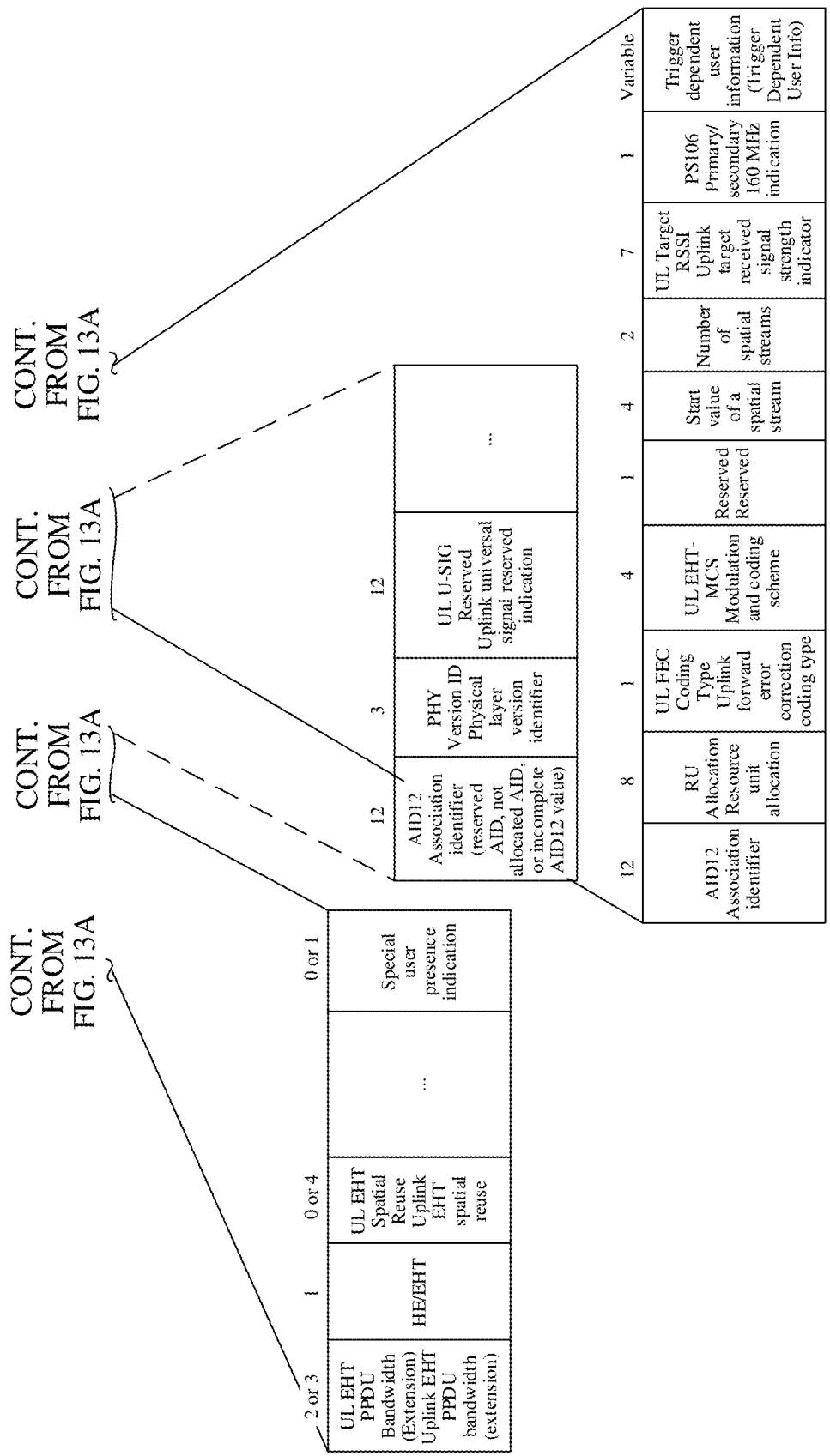

It can be learned that in this embodiment of this application, a value of the uplink spatial reuse field UL SRP in the Refer to FIG. 13A and FIG. 13B. In a trigger frame shown in FIG. 13A and FIG. 13B, a common information field of the trigger frame may include four UL SRP fields: a UL SRP1 field, a UL SRP2 field, a UL SRP3 field, and a UL SRP4 field. The four UL SRP fields may respectively indicate values of four SRP fields in an HE TB PPDU.

A user information list field of the trigger frame includes multiple user information fields, and one of the user information fields is a special user information field, and is represented as user info (STA 1).

In an implementation, the special user information field may include a UL SRP field and a U-SIG reserved indication field. The UL SRP field indicates values of an SRP1 field and an SRP2 field in a U-SIG of an EHT TB PPDU, or the UL SRP field of the special user information field indicates the value of the SRP2 field in the U-SIG of the EHT TB PPDU. The U-SIG reserved indication field indicates a value of a U-SIG reserved field in the U-SIG of the EHT TB PPDU.

In another implementation, the special user information field does not include a UL SRP field but may include a U-SIG reserved indication field. Values of an SRP1 field and/or an SRP2 field in a U-SIG of an EHT TB PPDU are/is indicated by the UL SRP1 field, the UL SRP2 field, the UL SRP3 field, and the UL SRP4 field in the common information field of the trigger frame, or is indicated by a UL EHT SRP field of an HE-SIG-A2 in the common information field. The U-SIG reserved indication field indicates a value of a U-SIG reserved field in the U-SIG of the EHT TB PPDU.

In an implementation, a value of an association identifier (association identifier, AID) 12 field of the special user information field is a preset value. The preset value may be any one of 2008 to 2044 or 2046 to 4095, for example, the preset value is 2044. Alternatively, the preset value may be an AID (for example, 2007) that is not allocated to any associated STA and that is in 1 to 2007.

In still another implementation, the special user information field does not need to carry a complete value of an AID12. Only a most significant bit needs to be set to 1, and any one of subsequent 11 bits is fixed at 0, so that the values can be distinguished from any existing value that is of the AID12 and that has been used. The other 10 bits can be used for transferring information.

In the 802.11ax standard, a trigger frame carries a 9-bit UL HE-SIG-A2 reserved field. However, until the 802.11ax standard is formulated, the HE-SIG-A2 reserved bit is not redefined, causing a waste of 9 bits. For the 802.11be standard, as shown in FIG. 9, in addition to the SRP1 and the SRP4, the U-SIG part of the EHT TB PPDU further includes the U-SIG reserved field, that is, 12 bits are reserved. Values of the 12 reserved bits need to be indicated by the trigger frame. This is a reason why the trigger frame needs an uplink U-SIG reservation indication field to be carried by the special user information field. If a bit corresponding to the U-SIG reserved field in the U-SIG of the EHT TB PPDU uses a default value, the value does not need to be indicated by the trigger frame. Instead, when necessary, the uplink U-SIG reserved indication field of the special user information field in the trigger frame indicates a specific value. In this way, bit overheads of the trigger frame are reduced. If an indication in a trigger frame is not needed in a release later than 802.11be, the trigger frame does not need to carry the special user information field in 802.11be.

It should be understood that the special user information field may not exist in the release 1 (release1, R1) released in 802.11be. However, a device supporting R1 needs to be able to read the special user information field. If the special user information field exists, a default value cannot be used, and a value indicated by the special user field needs to be used. This avoids a case in which an AP or a third-party station cannot correctly receive a U-SIG due to mutual interference caused by different content of the U-SIG when a device supporting R1 and a device supporting R2 jointly transmit the U-SIG.

In conclusion, whether the special user information field exists and meaning of the existence are shown in Table 8:

TABLE 8

Meanings of a special user information field

| Subfield | Bit | Description |
| --- | --- | --- |
| Physical layer version field | 3 | Indicates that a trigger frame is a trigger frame in the EHT standard or a standard of a specific later generation when the trigger frame includes a special user field. When the trigger frame does not include the special user field, when a STA sends an EHT TB PPDU, a U-SIG indicates a default value (for example, 000), indicating the EHT standard. |
| Uplink universal signal reserved indication field (UL U-SIG reserved) | 12 or 16 | Indicates, when the trigger frame includes the special user field, a value of a U-SIG reserved field in the U-SIG of the EHT TB PPDU sent by the STA. The value of the U-SIG reserved field is copied from a value of this field. When the trigger frame does not include the special user field, when the STA sends the EHT TB PPDU, a value of a reserved field in the U-SIG is a default value, for example, a value of all 1s, all 0s, or an alternate value of 1 and 0. This is not limited in the solution of this application. |

It should be noted that, if the U-SIG has only one SRP field, the reserved field is 16 bits. If the U-SIG has two SRP fields, the reserved field is 12 bits.

A part of values of the U-SIG reserved field of the EHT TB PPDU are indicated by the special user field in the trigger frame, and a part of values are indicated by the uplink HE-SIG-A2 reserved field and/or the reserved field. If meanings of some reserved fields need to be modified in a subsequent standard, a reserved value corresponding to the HE-SIG-A2 reserved field and/or the reserved field may be preferentially modified. In this way, the special user field does not need to be carried, to reduce bit overheads of the trigger frame.

It should be understood that either or both of the uplink universal signal reserved indication field and the physical layer version field included in the special user information field shown in Table 8 may exist. It should be further understood that the subfields in Table 8 may alternatively have other names. This is not limited in the example in this application. A number of bits occupied by each subfield and corresponding to each subfield is merely an example. In this embodiment of this application, another number of bits may further be set for the subfield.

Figure 14:
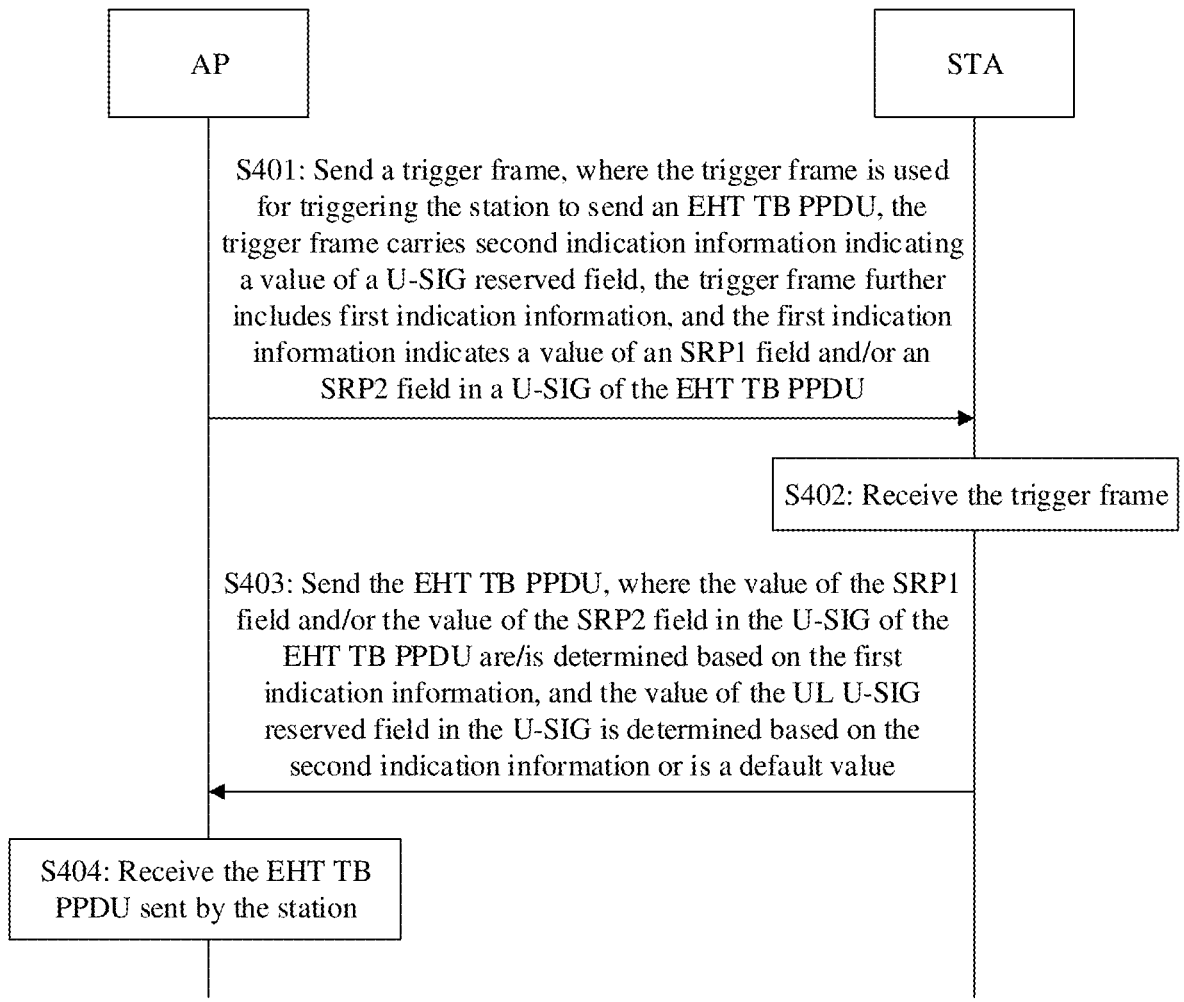
FIG. 14 is a schematic flowchart of a trigger frame transmission method and a PPDU transmission method according to an embodiment of this application.

FIG. 14 is a schematic flowchart of a trigger frame transmission method and a corresponding PPDU transmission method according to an embodiment of this application. As shown in FIG. 14, the trigger frame transmission method and the corresponding PPDU transmission method include but are not limited to the following steps.

S401: An AP sends a trigger frame, where the trigger frame is used for triggering a station to send an EHT TB PPDU, the trigger frame further carries second indication information, and the second indication information indicates a value of a U-SIG reserved field in a U-SIG of the EHT TB PPDU.

The trigger frame further carries first indication information, and the first indication information indicates a value of an SRP1 field and/or an SRP2 field in the U-SIG of the EHT TB PPDU.

S402: The STA receives the trigger frame.

S403: The STA sends the EHT TB PPDU, where a value of the U-SIG reserved field in the U-SIG of the EHT TB PPDU is a default value, or is determined based on the second indication information. The value of the SRP1 field and/or the SRP2 field in the U-SIG of the EHT TB PPDU are/is determined based on the first indication information.

S404: The AP receives the EHT TB PPDU sent by the station.

Optionally, the trigger frame may be not only used for triggering an EHT station to send the EHT TB PPDU, but also used for triggering an HE station to send the HE TB PPDU. Alternatively, the trigger frame is only used for triggering an EHT station to send the EHT TB PPDU, or only used for triggering an HE station to send the HE TB PPDU. This embodiment of this application focuses on a case in which the trigger frame is used for triggering the EHT station to send the EHT TB PPDU, but is not limited to a case in which the trigger frame is only used for triggering the EHT station to send the EHT TB PPDU, and may also include a case in which the trigger frame is used for triggering the EHT station to send the EHT TB PPDU and triggering the HE station/EHT station send the HE TB PPDU at the same time.

Optionally, the U-SIG of the EHT TB PPDU includes only two spatial reuse parameter (SRP) fields: the SRP1 field and the SRP2 field. The SRP1 field and the SRP2 field each indicate an SRP value of a different subchannel, and the SRP value is equal to a sum of transmit power of the AP on the corresponding subchannel and maximum interference power that can be accepted by the AP. It should be understood that the SRP1 field and the SRP2 field in the U-SIG of the EHT TB PPDU may have other names, for example, a PSR1 field and a PSR2 field. This is not limited in this embodiment of this application.

The trigger frame may carry the first indication information, and the first indication information may indicate the values of the SRP1 field and the SRP2 field in the U-SIG of the EHT TB PPDU, or the first indication information indicates the value of the SRP2 field in the U-SIG of the EHT TB PPDU.

In an implementation, the first indication information may be located in an uplink spatial reuse field of a common information field of the trigger frame. For a manner of setting a value of an SRP field in the U-SIG in a process of sending the EHT TB PPDU by the STA, refer to descriptions in Embodiment 1. Details are not described herein again. In this implementation, the trigger frame does not include the second indication information. Therefore, the U-SIG reserved field in the U-SIG part of the EHT TB PPDU is set to a default value. Alternatively, the trigger frame includes the second indication information, and the second indication information is located in a special user information field. Therefore, the U-SIG reserved field in the U-SIG part of the EHT TB PPDU is set to a value indicated by the second indication information.

In another implementation, a part of the first indication information is located in an uplink spatial reuse field of a common information field of the trigger frame, and a part is located in an uplink EHT spatial reuse field of the common information field of the trigger frame. Alternatively, the first indication information is completely located in an uplink EHT spatial reuse field in a common information field of the trigger frame. For a manner of setting a value of an SRP field in the U-SIG in a process of sending the EHT TB PPDU by the STA, refer to descriptions in Embodiment 2. Details are not described herein again. In this implementation, the trigger frame does not include the second indication information. Therefore, a U-SIG reserved field in the U-SIG part of the EHT TB PPDU is set to a default value. Alternatively, the trigger frame includes the second indication information, and the second indication information is located in a special user information field. Therefore, the U-SIG reserved field in the U-SIG part of the EHT TB PPDU is set to a value indicated by the second indication information.

In still another implementation, both the first indication information and the second indication information may be located in a user information field of the trigger frame, and the user information field is a special user information field.

In an implementation, the special user information field mentioned above does not need to carry a complete value of an AID12. Only a most significant bit needs to be set to 1, and any one of subsequent 11 bits is fixed at 0, so that the values can be distinguished from any existing value that is of the AID12 and that has been used. The other 10 bits can be used for transferring information. In another implementation, a value of an association identifier (association identifier, AID) 12 field of the special user information field is a preset value. The preset value may be any one of 2007, 2008 to 2044, or 2046 to 4095, for example, the preset value is 2044. In addition, the second indication information is also located in the special user information field.

For the EHT station, an AID12 field in a user information field in the trigger frame is set to a special value (for example, AID12=2044 or 2207), or an AID that is not allocated, or the AID12 field is set to an incomplete AID12 value, so that the EHT station can identify that the user information field is used for setting an SRP field in the U-SIG and a U-SIG reserved field. In other words, the special user information field carries the first indication information, which indicates the value of the SRP1 field and/or the SRP2 field in the U-SIG. The special user information field further carries the second indication information, which indicates a value of the U-SIG reserved field in the U-SIG. It should be understood that the HE station does not parse the user information field whose AID12 field is the special value in the trigger frame, or the HE station receives the user information field whose AID12 field is the special value, indicating that the field is irrelevant to the HE station. In other words, the first indication information added to the trigger frame does not affect behavior of the HE station.

When the first indication information indicates the values of the SRP1 field and the SRP2 field in the U-SIG, 8 bits after the AID12 field in the user information field are used for carrying the first indication information. First 4 bits of the 8 bits indicate the value of the SRP1 field in the U-SIG, and last 4 bits of the 8 bits indicate the value of the SRP2 field. It should be understood that the 8 bits may be represented by a first field and a second field. The first field is the first 4 bits of the 8 bits, and the second field is the last 4 bits of the 8 bits. In other words, the first field after the AID12 field indicates the value of the SRP1 field in the U-SIG, and the second field after the AID12 field indicates the value of the SRP2 field in the U-SIG. It should be further understood that the first field may be referred to as a UL SRP1 field for the U-SIG, and the second field may be referred to as a UL SRP2 field for the U-SIG. The first field and the second field may have other names. This is not limited in this embodiment of this application.

After receiving the trigger frame, the EHT station sets the value of the SRP1 field in the U-SIG of the to-be-sent EHT TB PPDU to a value of the first field in the user information field of the trigger frame, and sets the value of the SRP2 field in the U-SIG to a value of the second field in the user information field of the trigger frame. The first field and the second field in the user information field of the trigger frame each correspond to a 160 MHz bandwidth. For example, the first field corresponds to a first 160 MHz bandwidth in ascending order of frequencies, and the second field corresponds to a second 160 MHz bandwidth in ascending order of frequencies. In other words, the SRP1 field in the U-SIG corresponds to the first 160 MHz bandwidth in ascending order of frequencies, and the SRP2 field in the U-SIG corresponds to the second 160 MHz bandwidth in ascending order of frequencies.

Figure 15A:
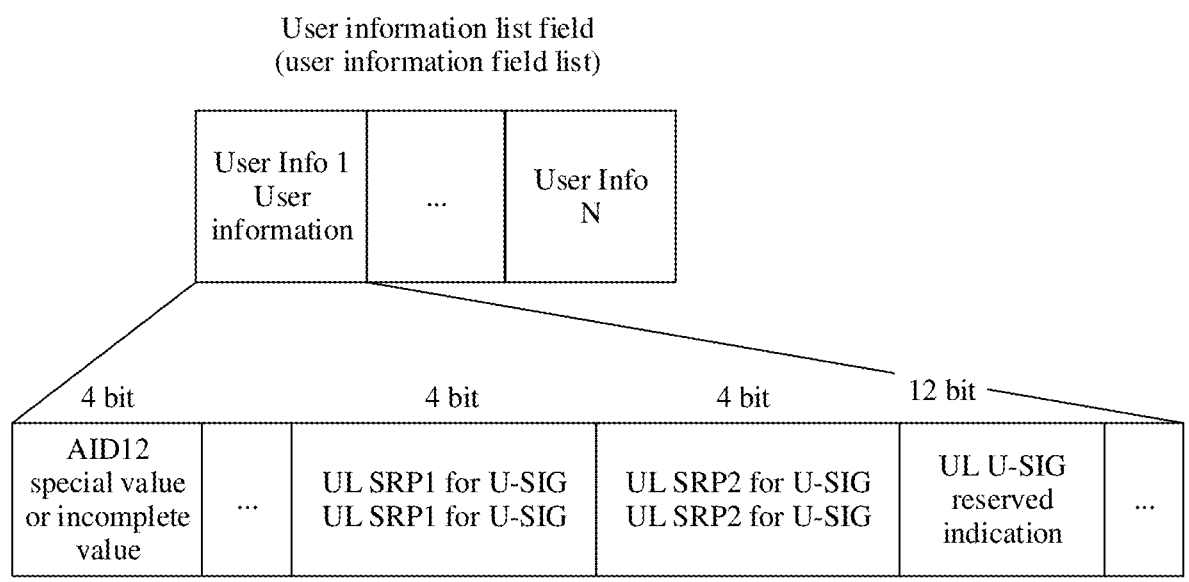
FIG. 15a is a schematic diagram of indicating an SRP in a U-SIG of a trigger frame according to an embodiment of this application.

FIG. 15a is a schematic diagram of indicating an SRP in a U-SIG of a trigger frame according to an embodiment of this application. As shown in FIG. 15a, a user information field of the trigger frame includes an AID12 field, a UL SRP1 field for a U-SIG, a UL SRP2 field for the U-SIG, a UL U-SIG reserved indication field, and the like. A value of the AID12 field is a special value. The UL SRP1 field for the U-SIG and the UL SRP2 field for the U-SIG are located after the AID12 field, and may be adjacent to the AID12 field, or may not be adjacent to the AID12 field. The UL SRP1 field for the U-SIG indicates a value of an SRP1 field in the U-SIG, and a UL SRP2 field for the U-SIG indicates a value of an SRP2 field in the U-SIG. A value indicated by the UL SRP1 field for the U-SIG is equal to a sum of transmit power of the AP on a primary 160 MHz channel and maximum interference power that can be accepted by the AP. A value indicated by the UL SRP2 field for the U-SIG is equal to a sum of transmit power of the AP on a secondary 160 MHz channel and maximum interference power that can be accepted by the AP. The UL U-SIG reserved indication field indicates a value of a U-SIG reserved field of the U-SIG when the STA sends the EHT TB PPDU.

When the first indication information only indicates the value of the SRP2 field in the U-SIG, 4 bits after the AID12 field in the user information field are used for carrying the first indication information. In other words, the 4 bits indicate the value of the SRP2 field in the U-SIG. The 4 bits may be referred to as the UL SRP2 field for the U-SIG, and the 4 bits may also have other names. This is not limited in this embodiment of this application. Optionally, when the first indication information only indicates the value of the SRP2 field in the U-SIG, 4 reserved bits in a common information field of the trigger frame, for example, 4 reserved bits in an HE-SIG-A2 reserved field or a reserved field, may be used for carrying the first indication information. In other words, the 4 reserved bits indicate the value of the SRP2 field in the U-SIG. The common information field of the trigger frame includes four UL SRP fields. After receiving the trigger frame, the EHT station sets the value of the SRP1 field in the U-SIG of the to-be-sent EHT TB PPDU to a smallest value of values of the four UL SRP fields included in the common information field of the trigger frame, that is, SRP1=min(UL SRP1, UL SRP2, UL SRP3, UL SRP4), and sets the value of the SRP2 field in the U-SIG to the value of the UL SRP2 field for the U-SIG in a special user information field of the trigger frame. The SRP1 field in the U-SIG corresponds to a first 160 MHz bandwidth in ascending order of frequencies, and the SRP2 field in the U-SIG corresponds to a second 160 MHz bandwidth in ascending order of frequencies. The EHT station further sets the value of the U-SIG reserved field in the U-SIG of the sent EHT TB PPDU to a value of the UL U-SIG reserved indication field in the special user information field in the trigger frame.

Figure 15B:
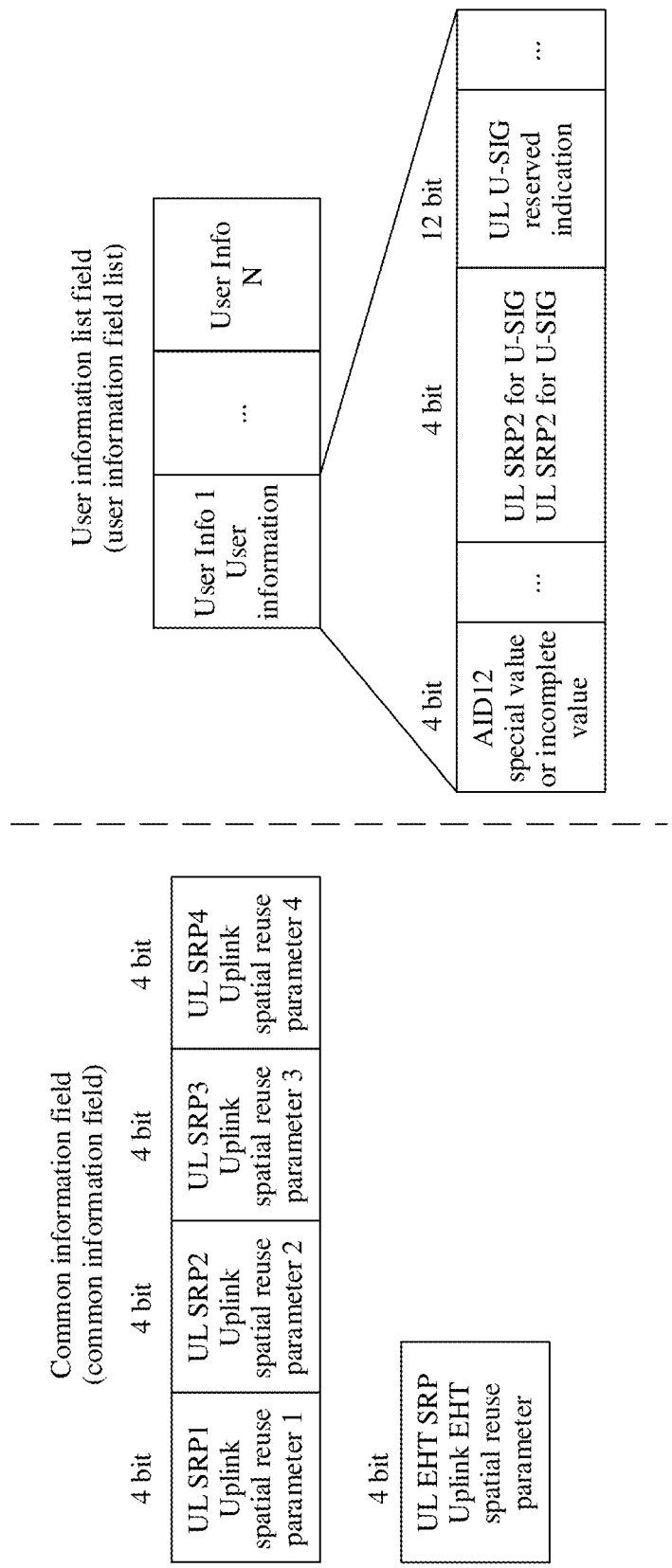
FIG. 15b is another schematic diagram of indicating an SRP in a U-SIG of a trigger frame according to an embodiment of this application.

FIG. 15b is another schematic diagram of indicating an SRP in a U-SIG of a trigger frame according to an embodiment of this application. As shown in FIG. 15b, in an implementation, a common information field of the trigger frame includes four UL SRP fields, and the four UL SRP fields respectively indicate SRP values of four 40 MHz subchannels in ascending order of frequencies on a primary 160 MHz channel. Alternatively, in another implementation, an HE-SIG-A2 reserved field and/or a reserved field of a common information field of the trigger frame are/is used as a UL EHT SRP field, to indicate an SRP value of a primary 160 MHz channel. A special user information field of the trigger frame includes an AID12 field, a UL SRP2 field for a U-SIG, and the like. A value of the AID12 field is a special value or an incomplete AID12 value. The UL SRP2 field for the U-SIG is located after the AID12 field, and may be adjacent to the AID12 field, or may not be adjacent to the AID12 field. The UL SRP2 field for the U-SIG indicates a value of an SRP2 field in the U-SIG. A value indicated by the UL SRP2 field for the U-SIG is equal to a sum of transmit power of the AP on a secondary 160 MHz channel and maximum interference power that can be accepted by the AP, or is equal to an SRP value on the secondary 160 MHz channel.

After receiving the trigger frame, the EHT station sets the value of the SRP1 field in the U-SIG of the to-be-sent EHT TB PPDU to a smallest value of values of the four UL SRP fields included in the common information field of the trigger frame, that is, SRP1=min(UL SRP1, UL SRP2, UL SRP3, UL SRP4), and sets the value of the SRP2 field in the U-SIG to the value of the UL SRP2 field for the U-SIG in a special user information field of the trigger frame. The SRP1 field in the U-SIG corresponds to a first 160 MHz bandwidth in ascending order of frequencies, and the SRP2 field in the U-SIG corresponds to a second 160 MHz bandwidth in ascending order of frequencies. The EHT station further sets the value of the U-SIG reserved field in the U-SIG of the sent EHT TB PPDU to a value of the UL U-SIG reserved indication field in the special user information field in the trigger frame.

It should be understood that this embodiment of this application mainly focuses on a manner of setting the SRP1 field and the SRP2 field in the U-SIG and a manner of setting the U-SIG reserved field in the U-SIG in the bandwidth of 320 MHz. For a manner of setting the SRP1 field and the SRP2 field in the U-SIG in the bandwidth of 160 MHz or lower, refer to related descriptions in Embodiment 1 or Embodiment 2. Details are not described herein again.

It can be learned that in this embodiment of this application, in a case of the 320 MHz bandwidth, a special user information field in the trigger frame independently indicates a spatial reuse parameter and a U-SIG reserved field for the EHT TB PPDU. A meaning of the special user information field is clear, and scheduling of the HE station is not affected. In this way, the HE station and the EHT station can be scheduled by using a same trigger frame. When the trigger frame does not include the foregoing special user information field, the spatial reuse parameter of the U-SIG of the EHT TB PPDU may be set based on an indication of an uplink spatial reuse field and/or an uplink EHT spatial reuse field in the trigger frame, and the U-SIG reserved field may be set to a default value.

In conclusion, in Embodiment 1 to Embodiment 3 of this application, a relationship between the U-SIG and the trigger frame in the EHT TB PPDU may be summarized as shown in Table 9.

TABLE 9

| Field | Category | Subfield | Number of bits | From a trigger frame/Relationship with the trigger frame | |
|---|---|---|---|---|---|
| | | | | A special user information field does not exist | The special user information field exists |
| U-SIG | (Physical layer) Version independent | Version identifier | 3 | Indicates a default value (for example, 000) | Value indicated by the version identifier field in the special user information field (3 bits) |
| | | PPDU bandwidth | 3 | Value indicated by an uplink (HE) bandwidth field (2 bits) in a common information field + value (2 + 2 bits) indicated by an uplink HE PPDU bandwidth field (2 bits) in Table 5; or value (3 bits) indicated by an uplink EHT PPDU bandwidth field in Table 6 | |
| | | UL/DL (uplink/downlink) | 1 | Same as 802.11ax | |
| | | BSS color (basic service set color) | 6 | Same as 802.11ax | |
| | | TXOP (transmission opportunity) | 7 | Same as 802.11ax | |
| | | Reserved reserved | 2 | Default value | Value indicated by the special user information field |
| | | TBD 1 to be determined 1 (reserved) | 4 | Default value | Value indicated by the special user information field |
| | (Physical layer) version dependent | PPDU format & EHT-SIG Compression PPDU format and EHT-SIG compression indication | 2 | Same as 802.11ax | |
| | | Reserved reserved | 1 | Default value (for example, 0) | Value indicated by the special user information field |
| | | Spatial reuse 1 | 4 | Value indicated by an uplink spatial reuse field in the common information field and/or value indicated by an uplink EHT spatial reuse field in the common information field (refer to Table 7) | |
| | | Spatial reuse 2 | 4 | Value indicated by the uplink spatial reuse field in the common information field and/or value indicated by the uplink EHT spatial reuse field in the common information field (refer to Table 7) | |

TABLE 9-continued

| Field | Category | Subfield | Number of bits | From a trigger frame/Relationship with the trigger frame | |
|---|---|---|---|---|---|
| | | | | A special user information field does not exist | The special user information field exists |
| | | Or reserved | | Default Value | Value indicated by an uplink U-SIG reserved indication field in the special user information field |
| | | TBD2 to be determined 2 (reserved) | 5 | Default Value | Value indicated by an uplink U-SIG reserved indication field in the special user information field |
| | CRC & Tail (Cyclic redundancy check and tail bit) | CRC in U-SIG (cyclic redundancy check) | 4 | Same as 802.11ax | |
| | | Tail in U-SIG (tail bit) | 6 | Same as 802.11ax | |
| | Total # of Bits in U-SIG (Total number of bits in the U-SIG) | | | 52 | |

It should be understood that the subfields included in the U-SIG in Table 9 are merely examples, and a part of the subfields may further be included. It should be further understood that the subfields in Table 9 may alternatively have other names. This is not limited in the example in this application. A number of bits occupied by each subfield may be adjusted based on an actual situation. This is not limited in this application.

Embodiment 4

The foregoing Embodiment 1 to Embodiment 3 describe methods for setting an SRP field and a U-SIG reserved field of a U-SIG when one or more stations send an EHT TB PPDU in different scenarios. Embodiment 4 of this application mainly describes a spatial reuse method based on a spatial reuse parameter in 802.11be.

It can be understood that, in actual application, Embodiment 4 of this application may be implemented with reference to any one of Embodiment 1 to Embodiment 3, or may be implemented separately. This is not limited in this embodiment of this application.

It may be understood that, in this embodiment of this application, a first AP and a first STA belong to a same BSS, which is denoted as a BSS 1. A second AP and a second STA belong to another BSS, which is denoted as a BSS 2. The first AP and the second AP are located in an OBSS formed by the BSS 1 and the BSS 2. Therefore, to reduce interference, caused by energy generated when the second AP sends a parameterized spatial reuse transmission (parameterized spatial reuse transmission, PSRT) PPDU, to receiving of an EHT TB PPDU by the first AP, transmit power used when the second AP sends the PSRT PPDU needs to be restricted.

Optionally, in this embodiment of this application, the second AP may receive information sent by the first AP and the first STA.

Figure 16:
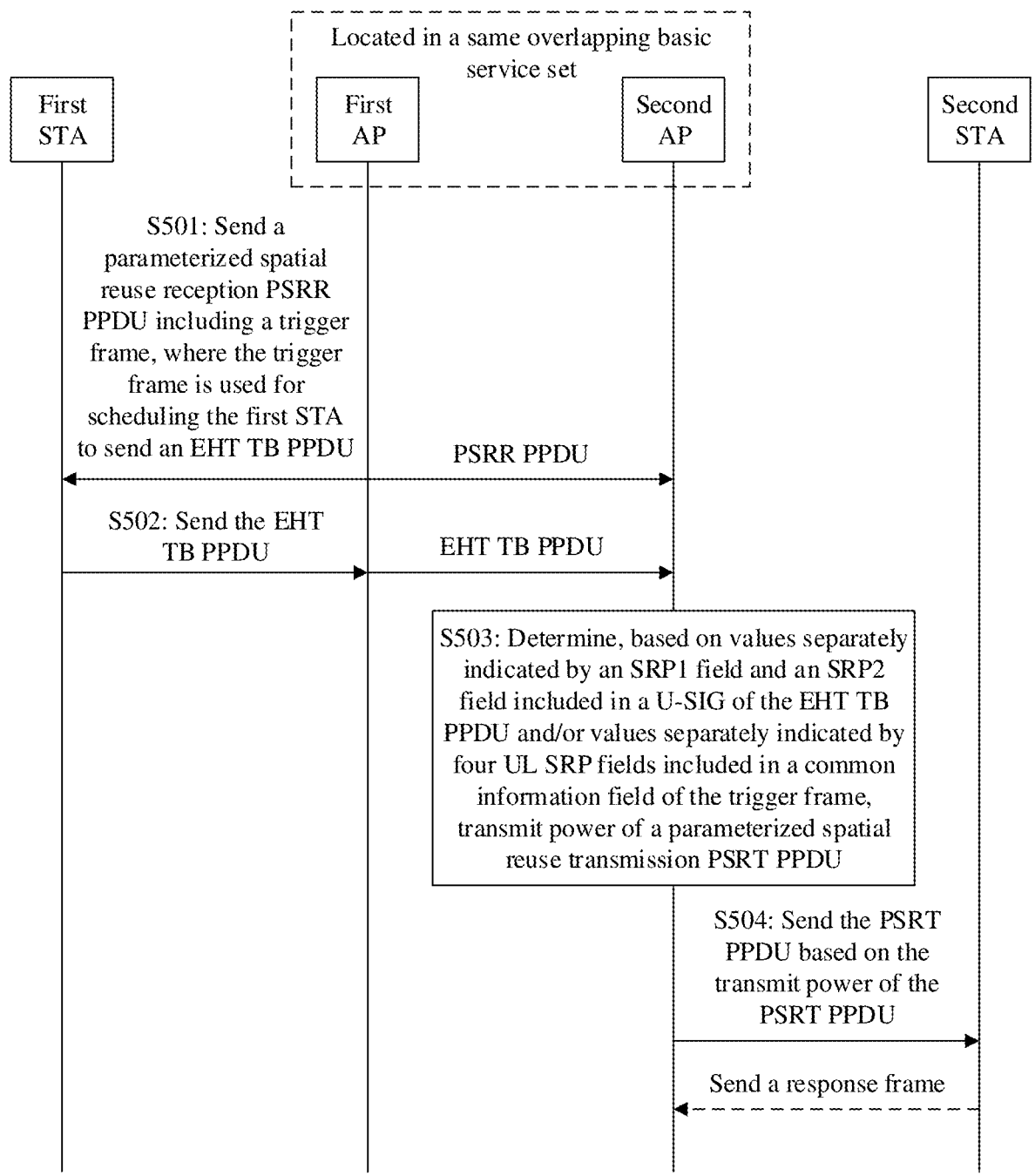
FIG. 16 is a schematic flowchart of a spatial reuse method according to an embodiment of this application.

FIG. 16 is a schematic flowchart of a spatial reuse method according to an embodiment of this application. As shown in FIG. 16, the spatial reuse method includes but is not limited to the following steps.

S501: The first AP sends a parameterized spatial reuse reception (parameterized spatial reuse reception, PSRR) PPDU including a trigger frame (trigger frame), where the trigger frame is used for scheduling the first STA to send an EHT TB PPDU. Correspondingly, the first STA receives the trigger frame.

It may be understood that, in addition to the trigger frame, the PSRR PPDU may further include other information. However, this embodiment of this application focuses on a trigger frame part in the PSRR PPDU. Therefore, the other information included in the PSRR PPDU is not described in this embodiment of this application.

Specifically, the PSRR PPDU including the trigger frame is used for scheduling a station to perform uplink data transmission, for example, send an uplink EHT TB PPDU. As shown in FIG. 6*a*-1, FIG. 6*a*-2 or FIG. 10A and FIG. 10B, a common information field of the trigger frame includes an uplink spatial reuse (UL Spatial Reuse) field. The uplink spatial reuse field may include four uplink spatial reuse parameter (UL SRP) fields whose lengths are 4 bits, indicating a sum of transmit power of an AP and maximum interference power that can be accepted by the AP. The four UL SRP fields included in the uplink spatial reuse field are a UL SRP1 field, a UL SRP2 field, a UL SRP3 field, and a UL SRP4 field. For an implementation of the four UL SRP fields in different bandwidths, refer to any one of Embodiment 1 to Embodiment 3. Details are not described herein again.

S502: The first STA sends the EHT TB PPDU. Correspondingly, the first AP receives the EHT TB PPDU sent by the station.

The "first AP" in this embodiment of this application is the "AP" described in Embodiment 1 to Embodiment 3, and the "first STA" in this embodiment of this application is the "STA" described in Embodiment 1 to Embodiment 3.

Specifically, for an implementation of step S502 in this embodiment of this application, refer to the implementation of step S103 in Embodiment 1. Details are not described herein again. Alternatively, for an implementation of step S502 in this embodiment of this application, refer to the implementation of step S203 in Embodiment 2. Details are not described herein again. Alternatively, for an implementation of step S502 in this embodiment of this application, refer to the implementation of step S303 in Embodiment 3. Details are not described herein again.

S503: The second AP determines, based on values separately indicated by an SRP1 field and an SRP2 field included in a U-SIG of the EHT TB PPDU and/or values separately indicated by four UL SRP fields included in a common information field of a trigger frame, transmit power of a parameterized spatial reuse transmission PSRT PPDU.

S504: The second AP sends the PSRT PPDU based on the transmit power of the PSRT PPDU. Correspondingly, the second STA receives the PSRT PPDU.

Specifically, the first AP and the second AP are located in the OBSS formed by the BSS 1 and the BSS 2. Therefore, the second AP may also receive the trigger frame sent by the first AP. Therefore, after the first AP sends the PSRR PPDU including the trigger frame, the second AP receives the PSRR PPDU including the trigger frame. The trigger frame includes four UL SRP fields, and a value indicated by one UL SRP field is equal to a sum of transmit power of the first AP and maximum interference power that can be accepted by the first AP. The second AP may also receive the EHT TB PPDU sent by the first STA, and the U-SIG of the EHT TB PPDU includes the SRP1 field and the SRP2 field. The value indicated by the SRP1 field is equal to a sum of transmit power of the first AP on a first subchannel and the maximum interference power that can be accepted by the first AP. The value indicated by the SRP2 field is a sum of transmit power of the first AP on a second subchannel and the maximum interference power that can be accepted by the first AP. A bandwidth value of the first subchannel and a bandwidth value of the second subchannel are equal to a half of a bandwidth of the EHT TB PPDU, and a frequency of the first subchannel is less than a frequency of the second subchannel.

After the second AP receives the PSRR PPDU and the EHT TB PPDU (that is, it is determined that the first STA has sent the EHT TB PPDU), the second AP calculates, based on power (namely, a received power level, received power level, RPL) at which the PSRR PPDU is received, the values separately indicated by the SRP1 field and the SRP2 field included in the U-SIG, and/or values separately indicated by the four UL SRP fields, transmit power used for sending the PSRT PPDU. The second AP sends the PSRT PPDU based on the calculated transmit power. Correspondingly, the second STA receives the PSRT PPDU, and replies a response frame in response to the PSRT PPDU to the second AP.

Figure 17:
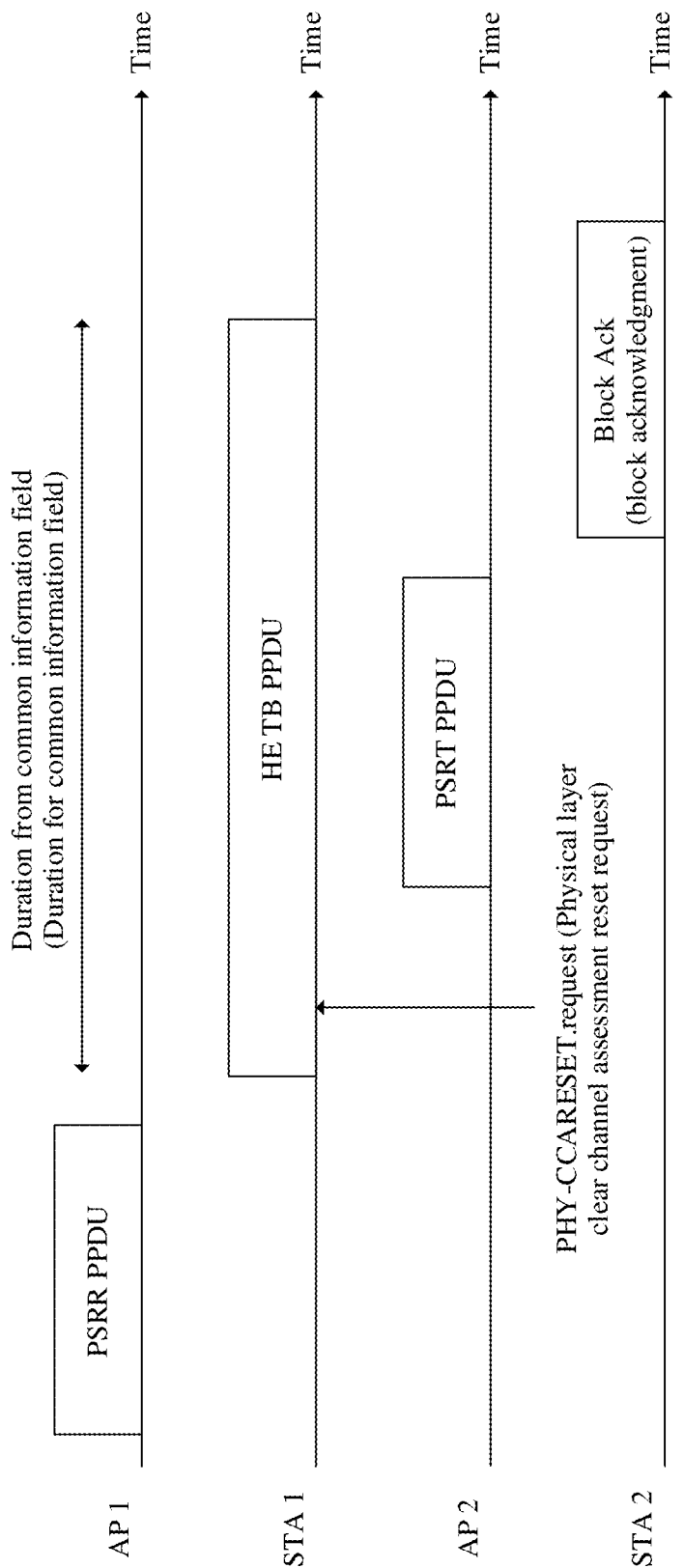
FIG. 17 is a schematic diagram of a time sequence of a spatial reuse method according to an embodiment of this application.

FIG. 17 is a schematic diagram of a time sequence of a spatial reuse method according to an embodiment of this application. It is assumed that an AP 1 and an AP 2 are located in a same OBSS, the AP 1 and a STA 1 belong to a BSS 1, and the AP 2 and a STA 2 belong to a BSS 2. As shown in FIG. 14, the AP 1 (namely, the foregoing first AP) sends a PSRR PPDU including a trigger frame. After receiving the PSRR PPDU, the STA 1 (namely, the foregoing first STA) sends an uplink EHT TB PPDU based on an indication of the trigger frame after a period of time (for example, a short interframe space). Because the AP 1 and the AP 2 are located in a same OBSS, the AP 2 may receive the PSRR PPDU sent by the AP 1 and the EHT TB PPDU sent by the STA. After the AP 2 (namely, the second AP) receives the PSRR PPDU and the EHT TB PPDU, the AP 2 calculates, based on power (namely, an RPL) at which the PSRR PPDU is received, and the two SRP values and/or four UL SRP values in the EHT TB PPDU, power used by the AP 2 for sending a PSRT PPDU. After detecting that the EHT TB PPDU is sent, the AP 2 sends the PSRT PPDU based on the calculated power. After receiving the PSRT PPDU, the STA 2 (namely, the second STA) sends a block acknowledgment (block acknowledgment) frame at a time interval (for example, a short interframe space), to acknowledge that the STA 2 has received the PSRT PPDU.

Optionally, the transmit power of the PSRT PPDU obtained by the second AP through calculation satisfies the following formula:

$$\text{PPDU transmit power (used by the second AP for sending the PSRT PPDU)} - \log_{10}(\text{PSRT PPDU bandwidth}/20\text{ MHz}) \leq \text{SRP-RPL} \quad (1\text{-}1)$$

$\log_{10}$ (PSRT PPDU bandwidth/20 MHz) in the formula (1-1) indicates a bandwidth normalization factor. In the formula (1-1), SRP is an SRP value on a subchannel. In the formula (1-1), RPL is combined transmit power at all receive antenna connectors, over the PSRR PPDU bandwidth, in a non-HE part of or a non-HE PPDU part of a triggering PPDU (a PPDU including the trigger frame) (RPL is the combined transmit power at the receive antenna connector, over the PSRR PPDU bandwidth, during the non-HE portion of the HE PPDU preamble of the triggering PPDU, averaged over all antennas used to receive the PPDU). Bandwidth normalization has been performed on values of SRP and PRL in the formula (1-1). It should be understood that, because a value indicated by a UL SRP field is equal to the sum of the transmit power of the AP (herein, the first AP) and the maximum interference power that can be accepted by the AP (herein, the first AP), the maximum interference power that can be accepted by the AP (herein, the first AP) is determined by a value of a spatial reuse parameter (SRP).

Optionally, the second AP may obtain the RPL by using the PSRR PPDU, and does not obtain the UL SRP in the PSRR PPDU, but obtains the SRP by using the U-SIG of the EHT TB PPDU. To be specific, the second AP calculates, based on the power (namely, the RPL) at which the PSRR PPDU is received and the values separately indicated by the SRP1 field and the SRP2 field included in the U-SIG, the transmit power used for sending the PSRT PPDU. Alternatively, the second AP may obtain both the RPL and the UL SRP by using the PSRR PPDU, and after determining that the EHT TB PPDU is received, the second AP does not obtain the SRP in the U-SIG. To be specific, the second AP calculates, based on the power (namely, the RPL) at which the PSRR PPDU is received and the values separately indicated by the four UL SRP fields, the transmit power used for sending the PSRT PPDU.

Optionally, the foregoing formula (1-1) may be equivalent to the following formula (1-2):

$$\text{Normalized transmit power of the second AP} \leq \text{transmit power of the first AP} + \text{maximum interference power accepted by the first AP} - \text{power at which the second AP receives the PSRR PPDU sent by the first AP} \quad (1\text{-}2)$$

The right side of the formula (1-2), namely, the transmit power of the first AP minus the power at which the second AP receives the PSRR PPDU sent by the first AP, is equal to a pathloss (pathloss) between the first AP and the second AP.

Therefore, the formula (1-2) may alternatively be equivalent to the following formula (1-3):

$$\text{Normalized transmit power of the second AP} \leq \text{maximum interference power accepted by to the first AP} + \text{pathloss between the first AP and the second AP} \quad (1\text{-}3)$$

The formula (1-3) may alternatively be equivalent to the following formula (1-4):

Normalized transmit power of the second AP−path loss between the first AP and the second AP≤maximum interference power accepted by the first AP    (1-4)

Because the left side of the formula (1-4), namely, the normalized transmit power of the second AP minus the path loss between the first AP and the second AP, represents interference caused by the second AP to the first AP, the formula (1-4) may be equivalent to the following formula (1-5):

Interference caused by the second AP to the first AP≤maximum interference power accepted by the first AP    (1-5)

It can be learned that this embodiment of this application provides a spatial reuse method for an EHT TB PPDU, so that a case of two SRP fields in a U-SIG can be compatible, and spatial use is implemented in the EHT standard. In this way, devices in an overlapping basic service set can perform transmission simultaneously, to improve transmission efficiency.

Figure 18:
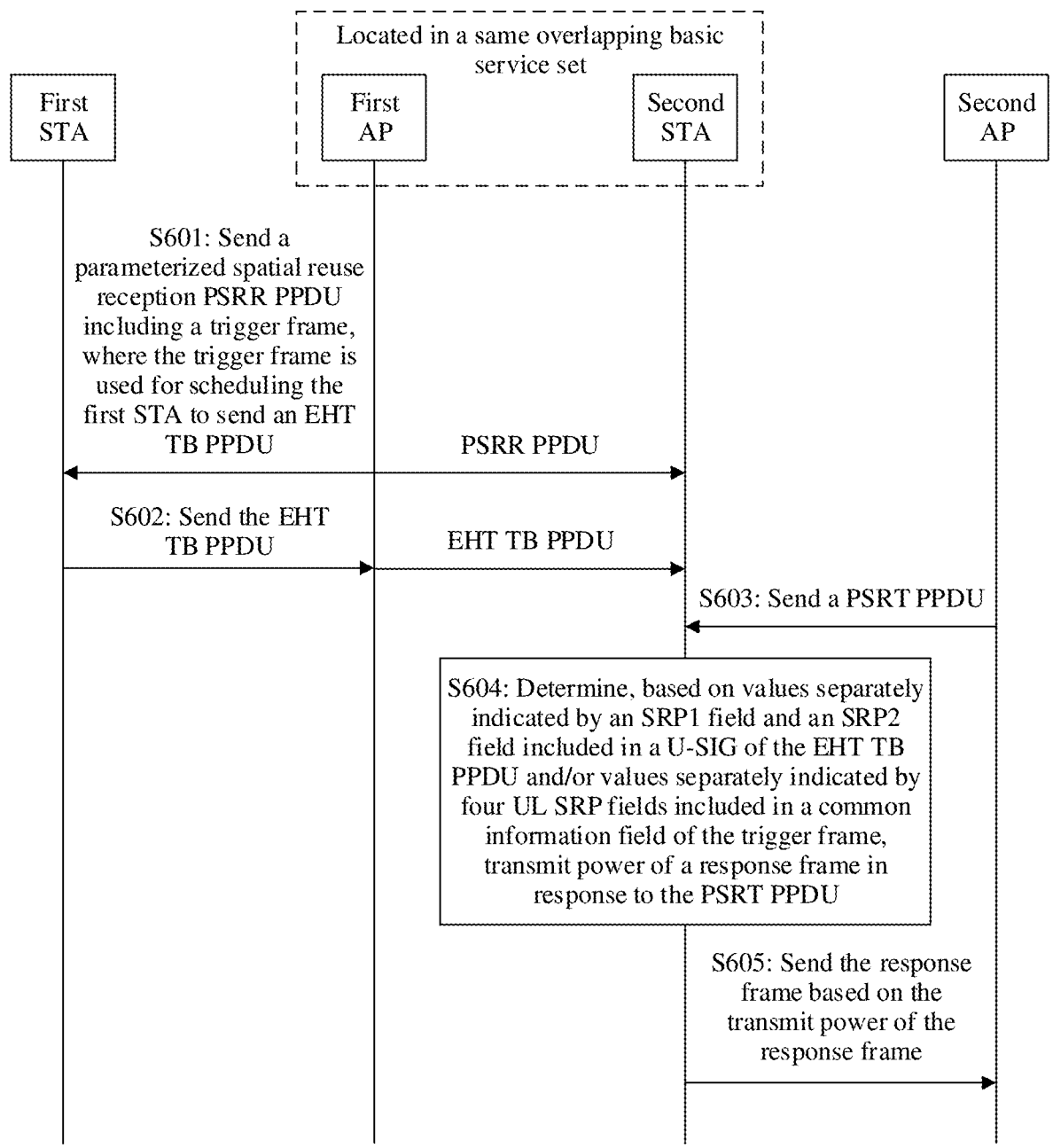
FIG. 18 is another schematic flowchart of a spatial reuse method according to an embodiment of this application.

In an optional embodiment, the spatial reuse method provided in this application may also be applied to the second STA. FIG. 18 is another schematic flowchart of a spatial reuse method according to an embodiment of this application. It may be understood that, in this embodiment of this application, a first AP and a first STA belong to a same BSS, which is denoted as a BSS 1. A second AP and a second STA belong to another BSS, which is denoted as a BSS 2. The first AP and the second STA are located in an OBSS formed by the BSS 1 and the BSS 2. Therefore, to reduce interference, caused by energy generated when the second STA sends a response frame of a PSRT PPDU, to receiving of an EHT TB PPDU by the first AP, transmit power used when the second STA sends the response frame needs to be restricted.

Optionally, in this embodiment of this application, the second STA may receive information sent by the first AP and the first STA.

As shown in FIG. 18, the spatial reuse method includes but is not limited to the following steps.

S601: The first AP sends a parameterized spatial reuse reception PSRR PPDU including a trigger frame, where the trigger frame is used for scheduling the first STA to send an EHT TB PPDU. Correspondingly, the first STA receives the trigger frame.

S602: The first STA sends the EHT TB PPDU. Correspondingly, the first AP receives the EHT TB PPDU sent by the station.

Specifically, for implementations of step S601 and step S602 in this embodiment of this application, refer to the implementations of step S501 and step S502 in the embodiment shown in FIG. 16. Details are not described herein again.

S603: The second AP sends a PSRT PPDU. Correspondingly, the second STA receives the PSRT PPDU.

S604: The second STA determines, based on one or more of values separately indicated by an SRP1 field and an SRP2 field included in a U-SIG of the EHT TB PPDU, values separately indicated by four UL SRP fields included in a common information field of a trigger frame, and values indicated by a UL EHT SRP field, transmit power of a response frame in response to the PSRT PPDU.

S605: The second STA sends the response frame based on the transmit power of the response frame.

Specifically, for implementations of step S604 and step S605 in this embodiment of this application, refer to the implementations of step S503 and step S504 in the embodiment shown in FIG. 16. Details are not described herein again. It should be understood that the transmit power of the response frame in response to the PSRT PPDU in step S604 corresponds to the transmit power of the PSRT PPDU in step S503. For a manner of determining the transmit power of the response frame in step S604, refer to a manner of determining the transmit power of the PSRT PPDU in step S503. Details are not described herein again.

Optionally, the second AP may also be located in an OBSS formed by the BSS 1 and the BSS 2. Therefore, to reduce interference, caused by energy generated when the second STA sends the response frame of the PSRT PPDU and energy generated when the second AP sends the PSRT PPDU, to receiving of the EHT TB PPDU by the first AP, transmit power used when the second STA sends the response frame and transmit power used when the second AP sends the PSRT PPDU both need to be restricted. Therefore, when the first AP, the second STA, and the second AP are all located in the OBSS formed by the BSS 1 and the BSS 2, before the second AP sends the PSRT PPDU (that is, before step S603), the second AP may determine, based on one or more of values separately indicated by an SRP1 field and an SRP2 field included in a U-SIG of the EHT TB PPDU, values separately indicated by four UL SRP fields included in a common information field of a trigger frame, and values indicated by a UL EHT SRP field, transmit power of the PSRT PPDU. In this case, step S603 is specifically: Send the PSRT PPDU based on the transmit power of the PSRT PPDU.

It can be learned that this embodiment of this application provides a spatial reuse method for an EHT TB PPDU, so that a case of one SRP field or two SRP fields in a U-SIG can be compatible, and spatial use is implemented in the EHT standard. In this way, devices in an overlapping basic service set can perform transmission simultaneously, to improve transmission efficiency.

The foregoing content describes in detail the method provided in this application. To facilitate implementation of the foregoing solutions in embodiments of this application, embodiments of this application further provide corresponding apparatuses or devices.

In this embodiment of this application, the AP and the STA may be divided into functional modules based on the foregoing method examples. For example, functional modules may be obtained through division based on corresponding functions, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used. The following describes in detail communication apparatuses in embodiments of this application with reference to FIG. 19 to FIG. 22. The communication apparatus is an access point or a station. Further, the communication apparatus may be an apparatus in an AP, or the communication apparatus may be an apparatus in a STA.

Figure 19:
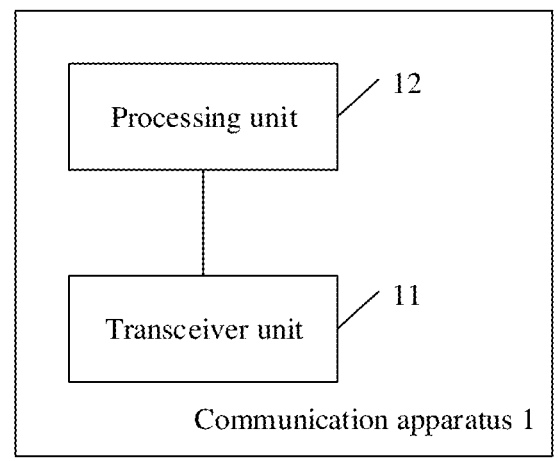
FIG. 19 is a schematic diagram of a structure of a communication apparatus 1 according to an embodiment of this application.

When an integrated unit is used, FIG. 19 is a schematic diagram of a structure of a communication apparatus 1 according to an embodiment of this application. The communication apparatus 1 may be an AP or a chip in the AP, for example, a Wi-Fi chip. As shown in FIG. 19, the communication apparatus 1 includes a transceiver unit 11 and a processing unit 12.

In a first design, the processing unit 12 is configured to generate a trigger frame, where the trigger frame is used for triggering a station to send an EHT TB PPDU. The transceiver unit 11 is further configured to receive the EHT TB PPDU sent by the station. Values indicated by a spatial reuse parameter SRP1 field and an SRP2 field in a universal signal field U-SIG of the EHT TB PPDU are each determined based on a value indicated by one or more uplink spatial reuse parameter UL SRP fields in a common information field of the trigger frame. Specifically, refer to the description of the EHT TB PPDU in step S103 in the foregoing Embodiment 1. Details are not described herein again.

In a second design, the processing unit 12 is configured to generate a trigger frame, and the transceiver unit 11 is configured to send the trigger frame. The trigger frame is used for triggering a station to send an EHT TB PPDU. A common information field of the trigger frame includes four UL SRP fields, and an HE-SIG A2 reserved field and a reserved field of the common information field are used as indications of a UL EHT spatial reuse parameter, and include a UL EHT SRP field.

The transceiver unit 11 is further configured to receive the EHT TB PPDU sent by the station, where a U-SIG of the EHT TB PPDU includes two SRP fields: an SRP1 field and an SRP2 field.

When the bandwidth of the EHT TB PPDU is 20/40/80/160 MHz and the EHT TB PPDU is a non-aggregated PPDU, the value of the SRP1 field in the U-SIG is equal to a smallest value of a UL SR1 field and a UL SR2 field in four spatial reuse fields indicated by an uplink spatial reuse field of the trigger frame; and may be represented as SRP1=min{UL SRP1, UL SRP2}.

The value of the SRP2 field in the U-SIG may be equal to a smallest value of a UL SR3 field and a UL SR4 field in the four spatial reuse fields indicated by the uplink spatial reuse field of the trigger frame, and may be represented as SRP2=min{SRP3, UL SRP4}.

In an implementation, as shown in FIG. 8b, when the EHT bandwidth is 320 MHz or the TB PPDU is an aggregated PPDU, the value of the SRP1 field in the U-SIG is equal to the value of the SRP2 field, both the SRP1 field and the SRP2 field are equal to a smallest value of four spatial reuse fields indicated by an uplink spatial reuse field in the trigger frame, and SRP1=SRP2=min{UL SRP1, UL SRP2, UL SRP3, UL SRP4}.

Specifically, refer to the description of the EHT TB PPDU or the aggregated PPDU in step S203 in the foregoing Embodiment 1. Details are not described herein again.

It should be understood that the communication apparatus 1 in the first design and the communication apparatus 1 in the second design may correspondingly perform Embodiment 1, and the foregoing operations or functions of the units in the communication apparatus 1 are separately configured to implement corresponding operations of the AP in Embodiment 1. For brevity, details are not described herein again.

In a third design, the processing unit 12 generates a trigger frame, and the transceiver unit 11 is configured to send the trigger frame. An HE-SIG-A2 reserved field and a reserved field in a common information field of the trigger frame are set as an uplink EHT PPDU bandwidth subfield, an HE/EHT subfield, and an uplink EHT spatial reuse field. The uplink EHT spatial reuse field separately indicates a spatial reuse parameter in the EHT TB PPDU, or is used together with an uplink spatial reuse field to indicate a spatial reuse parameter in the EHT TB PPDU. Specifically, refer to the description of the trigger frame in step S301 in the foregoing Embodiment 2. Details are not described herein again.

The transceiver unit 11 is further configured to receive the EHT TB PPDU or an aggregated PPDU sent by the station, where a U-SIG of the EHT TB PPDU may include one SRP field or two SRP fields. Specifically, refer to the description of the EHT TB PPDU or the aggregated PPDU in step S303 in Embodiment 2. Details are not described herein again.

It should be understood that the communication apparatus 1 in the third design may correspondingly perform Embodiment 2, and the foregoing operations or functions of the units in the communication apparatus 1 are separately configured to implement corresponding operations of the AP in Embodiment 2. For brevity, details are not described herein again.

In a fourth design, the processing unit 12 is configured to generate a trigger frame. The transceiver unit 11 is configured to send the trigger frame, where the trigger frame is used for triggering a station to send an EHT TB PPDU, the trigger frame carries first indication information, and the first indication information indicates a value of an SRP1 field and/or an SRP2 field in a U-SIG of the EHT TB PPDU. Optionally, the trigger frame further carries second indication information, and the second indication information indicates a value of a U-SIG reserved field in the U-SIG of the EHT TB PPDU. Specifically, refer to step S401 in Embodiment 3 and the description of the trigger frame in this embodiment. Details are not described herein again.

The transceiver unit 11 is further configured to receive the EHT TB PPDU sent by the station. For settings of an SRP field and the U-SIG reserved field in the U-SIG of the EHT TB PPDU, refer to the description in Embodiment 3. Details are not described herein again.

It should be understood that the communication apparatus 1 in the fourth design may correspondingly perform Embodiment 4, and the foregoing operations or functions of the units in the communication apparatus 1 are separately configured to implement corresponding operations of the AP in Embodiment 4. For brevity, details are not described herein again.

Figure 20:
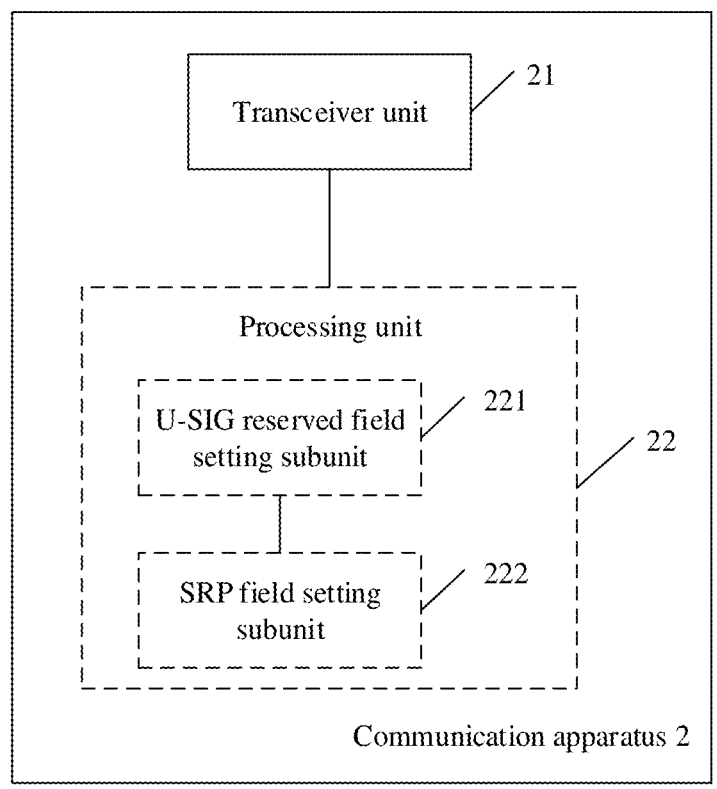
FIG. 20 is a schematic diagram of a structure of a communication apparatus 2 according to an embodiment of this application.

FIG. 20 is a schematic diagram of a structure of a communication apparatus 2 according to an embodiment of this application. The communication apparatus 2 may be a STA or a chip in the STA, for example, a Wi-Fi chip. As shown in FIG. 17, the communication apparatus 2 includes a transceiver unit 21 and a processing unit 22.

In a first design, the transceiver unit 21 is configured to receive a trigger frame, where the trigger frame is used for triggering the communication apparatus 2 to send an EHT TB PPDU. The transceiver unit 21 is further configured to send the EHT TB PPDU, and a U-SIG of the EHT TB PPDU includes a U-SIG reserved field and an SRP1 field, or includes an SRP1 field and an SRP2 field.

Optionally, the processing unit 22 includes a U-SIG reserved field setting subunit 221 and an SRP field setting subunit 222.

The U-SIG reserved field setting subunit 221 is configured to set a value of the U-SIG reserved field, where the value of the U-SIG reserved field is determined based on whether the trigger frame carries a special user information field. When the trigger frame does not carry the special user information field, the value of the U-SIG reserved field is set to a default value. When the trigger frame carries the special user information field, the value of the U-SIG reserved field is determined based on a value of a U-SIG reserved indication field in the special user information field.

The SRP field setting subunit 222 is configured to set values of the SRP1 field and the SRP2 field in the U-SIG of the EHT TB PPDU.

The values of the SRP1 field and the SRP2 field are each determined based on one or more of a value indicated by one or more UL SRP fields in a common information field of the trigger frame, a value indicated by an UL EHT SRP field, and a value indicated by a UL SRP field in the special user information field of the trigger frame.

It should be understood that the communication apparatus 2 in the first design may correspondingly perform Embodiment 1 to Embodiment 3, and the foregoing operations or functions of the units in the communication apparatus 2 are separately configured to implement corresponding operations of the STA in Embodiment 1 to Embodiment 3. For brevity, details are not described herein again.

Figure 21:
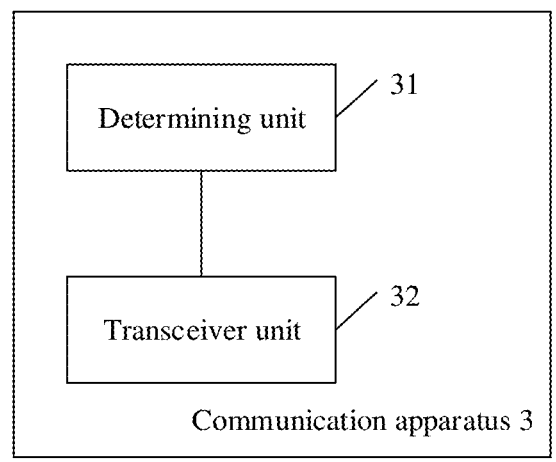
FIG. 21 is a schematic diagram of a structure of a communication apparatus 3 according to an embodiment of this application.

FIG. 21 is a schematic diagram of a structure of a communication apparatus 3 according to an embodiment of this application. The communication apparatus 3 may be an AP or a STA. Further, the communication apparatus 3 may be a chip in the AP or the STA, for example, a Wi-Fi chip. As shown in FIG. 21, the communication apparatus 3 may include a determining unit 31 and a transceiver unit 32.

In a design, the communication apparatus 3 is an AP or a chip in the AP. The determining unit 31 is configured to determine transmit power of a PSRT PPDU based on one or more of values separately indicated by an SRP1 field and an SRP2 field included in a U-SIG of an EHT TB PPDU, values separately indicated by four UL SRP fields included in a common information field of a trigger frame, and values indicated by a UL EHT SRP field in an HE-SIG-A2 of the common information field of the trigger frame. The transceiver unit 32 is configured to send the PSRT PPDU based on the transmit power of the PSRT PPDU.

Optionally, the transceiver unit 32 is further configured to receive the trigger frame, where the trigger frame includes four UL SRP fields. A value indicated by one UL SRP field is a sum of transmit power of a first AP on one subchannel and maximum interference power accepted by the first AP. The communication apparatus 3 and the first AP are located in a same OBSS. The first AP refers to an AP that sends the trigger frame.

Optionally, the transceiver unit 32 is further configured to receive the EHT TB PPDU, where the U-SIG of the EHT TB PPDU includes the SRP1 field and the SRP2 field. The value indicated by the SRP1 field is a sum of transmit power of the first AP on a first subchannel and the maximum interference power that can be accepted by the first AP. The value indicated by the SRP2 field is a sum of transmit power of the first AP on a second subchannel and the maximum interference power that can be accepted by the first AP. A bandwidth of the first subchannel and a bandwidth of the second subchannel are equal to a half of a bandwidth of the EHT TB PPDU, and a frequency of the first subchannel is less than a frequency of the second subchannel. The communication apparatus 3 and the first AP are located in a same OBSS.

It should be understood that the communication apparatus 3 in this design may correspondingly perform the method in FIG. 13A and FIG. 13B, and the foregoing operations or functions of the units in the communication apparatus 3 are separately configured to implement corresponding operations of the second AP in FIG. 13A and FIG. 13B. For brevity, details are not described herein again.

In another design, the communication apparatus 3 is a STA or a chip in the STA. The determining unit 31 is configured to determine transmit power of a response frame in response to a PSRT PPDU based on one or more of values separately indicated by an SRP1 field and an SRP2 field included in a U-SIG of an EHT TB PPDU, values separately indicated by four UL SRP fields included in a common information field of a trigger frame, and values indicated by a UL EHT SRP field in an HE-SIG-A2 of the common information field of the trigger frame. The transceiver unit 32 is configured to send the response frame based on the transmit power of the response frame.

Optionally, the transceiver unit 32 is further configured to receive the trigger frame, where the trigger frame includes four UL SRP fields. A value indicated by one UL SRP field is a sum of transmit power of a first AP on one subchannel and maximum interference power accepted by the first AP. The communication apparatus 3 and the first AP are located in a same OBSS. The first AP refers to an AP that sends the trigger frame.

Optionally, the transceiver unit 32 is further configured to receive the EHT TB PPDU, where the U-SIG of the EHT TB PPDU includes the SRP1 field and the SRP2 field. The value indicated by the SRP1 field is a sum of transmit power of the first AP on a first subchannel and the maximum interference power that can be accepted by the first AP. The value indicated by the SRP2 field is a sum of transmit power of the first AP on a second subchannel and the maximum interference power that can be accepted by the first AP. A bandwidth of the first subchannel and a bandwidth of the second subchannel are equal to a half of a bandwidth of the EHT TB PPDU, and a frequency of the first subchannel is less than a frequency of the second subchannel. The communication apparatus 3 and the first AP are located in a same OBSS.

Optionally, the transceiver unit 32 is further configured to receive the PSRT PPDU sent by a second AP.

In any one of the foregoing designs, the determining unit 31 may be a processing unit.

It should be understood that the communication apparatus 3 in this design may correspondingly perform the method in FIG. 18, and the foregoing operations or functions of the units in the communication apparatus 3 are separately configured to implement corresponding operations of the second STA in FIG. 18. For brevity, details are not described herein again.

The foregoing describes the AP and the STA in embodiments of this application. The following describes possible product forms of the AP and the STA. It should be understood that, any product having a function of the AP described in FIG. 19, any product having a function of the STA described in FIG. 20, or any product having a function of the AP or the STA described in FIG. 21 shall fall within the protection scope of embodiments of this application. It should be further understood that the following description is merely an example, and product forms of the AP and the STA in embodiments of this application are not limited thereto.

In a possible product form, the AP and the STA in embodiments of this application may be implemented by using general bus architectures.

Figure 22:
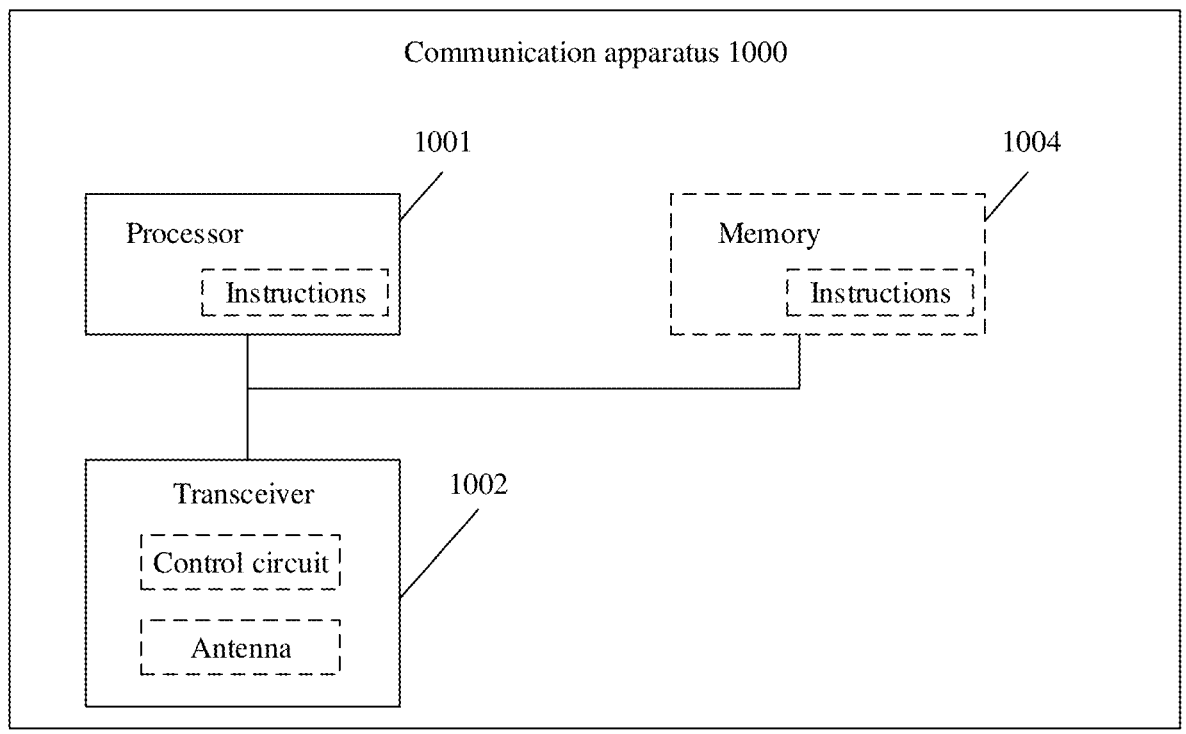
FIG. 22 is a schematic diagram of a structure of a communication apparatus 1000 according to an embodiment of this application.

For ease of description, FIG. 22 shows a schematic diagram of a structure of a communication apparatus 1000 according to an embodiment of this application. The communication apparatus 1000 may be an AP or a STA, or a chip in the AP or the STA. FIG. 22 shows only main components of the communication apparatus 1000. In addition to the processor 1001 and the transceiver 1002, the communication apparatus may further include a memory 1003 and an input/output apparatus (not shown in the figure).

The processor 1001 is mainly configured to process a communication protocol and communication data, control the communication apparatus, execute a software program, and process data of the software program. The memory 1003 is mainly configured to store the software program and the data. The transceiver 1002 may include a control circuit and an antenna. The control circuit is mainly configured to perform conversion between a baseband signal and a radio frequency signal and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user.

After the communication apparatus is powered on, the processor 1001 may read the software program in the memory 1003, interpret and execute instructions of the software program, and process the data of the software program. When data needs to be sent wirelessly, after performing baseband processing on the to-be-sent data, the processor 1001 outputs a baseband signal to a radio frequency circuit. After performing radio frequency processing on the baseband signal, the radio frequency circuit sends a radio frequency signal in a form of an electromagnetic wave through the antenna. When data is sent to the communication apparatus, the radio frequency circuit receives a radio frequency signal through the antenna, converts the radio frequency signal into a baseband signal, and outputs the baseband signal to the processor 1001. The processor 1001 converts the baseband signal into data and processes the data.

In another implementation, the radio frequency circuit and the antenna may be disposed independent of the processor that performs baseband processing. For example, in a distributed scenario, the radio frequency circuit and the antenna may be separately disposed independent of the communication apparatus.

The processor 1001, the transceiver 1002, and the memory 1004 may be connected through a communication bus.

In a design, the communication apparatus 1000 may be configured to perform a function of the AP in Embodiment 1. The processor 1001 may be configured to generate the trigger frame sent in step S101 in FIG. 7a, and/or configured to perform another process of the technology described in this specification. The transceiver 1002 may be configured to perform step S101 and step S104 in FIG. 7a, and/or configured to perform another process of the technology described in this specification.

In another design, the communication apparatus 1000 may be configured to perform a function of the STA in Embodiment 1: The processor 1001 may be configured to generate the EHT TB PPDU sent in step S103 in FIG. 7a, and/or configured to perform another process of the technology described in this specification. The transceiver 1002 may be configured to perform step S102 and step S103 in FIG. 7a, and/or configured to perform another process of the technology described in this specification.

In a design, the communication apparatus 1000 may be configured to perform a function of the AP in Embodiment 1. The processor 1001 may be configured to generate the trigger frame sent in step S201 in FIG. 8a, and/or configured to perform another process of the technology described in this specification. The transceiver 1002 may be configured to perform step S201 and step S204 in FIG. 8a, and/or configured to perform another process of the technology described in this specification.

In another design, the communication apparatus 1000 may be configured to perform a function of the STA in Embodiment 1: The processor 1001 may be configured to generate the EHT TB PPDU sent in step S203 in FIG. 8a, and/or configured to perform another process of the technology described in this specification. The transceiver 1002 may be configured to perform step S202 and step S203 in FIG. 8a, and/or configured to perform another process of the technology described in this specification.

In a design, the communication apparatus 1000 may be configured to perform a function of the AP in Embodiment 2. The processor 1001 may be configured to generate the trigger frame sent in step S301 in FIG. 11, and/or configured to perform another process of the technology described in this specification. The transceiver 1002 may be configured to perform step S301 and step S304 in FIG. 11, and/or configured to perform another process of the technology described in this specification.

In another design, the communication apparatus 1000 may be configured to perform a function of the STA in Embodiment 2: The processor 1001 may be configured to generate the EHT TB PPDU sent in step S303 in FIG. 11, and/or configured to perform another process of the technology described in this specification. The transceiver 1002 may be configured to perform step S302 and step S303 in FIG. 11, and/or configured to perform another process of the technology described in this specification.

In a design, the communication apparatus 1000 may be configured to perform a function of the AP in Embodiment 3. The processor 1001 may be configured to generate the trigger frame sent in step S401 in FIG. 14, and/or configured to perform another process of the technology described in this specification. The transceiver 1002 may be configured to perform step S401 and step S404 in FIG. 14, and/or configured to perform another process of the technology described in this specification.

In another design, the communication apparatus 1000 may be configured to perform a function of the STA in Embodiment 3. The processor 1001 may be configured to generate the EHT TB PPDU sent in step S403 in FIG. 14, and/or configured to perform another process of the technology described in this specification. The transceiver 1002 may be configured to perform step S402 and step S403 in FIG. 14, and/or configured to perform another process of the technology described in this specification.

In a design, the communication apparatus 1000 may be configured to perform a function of the second AP in Embodiment 4. The processor 1001 may be configured to perform step S503 in FIG. 16, and/or configured to perform another process of the technology described in this specification. The transceiver 1002 may be configured to perform step S504 in FIG. 16, and/or configured to perform another process of the technology described in this specification.

In a design, the communication apparatus 1000 may be configured to perform a function of the second STA in Embodiment 4. The processor 1001 may be configured to perform step S604 in FIG. 18, and/or configured to perform another process of the technology described in this specification. The transceiver 1002 may be configured to perform step S605 in FIG. 18, and/or configured to perform another process of the technology described in this specification.

In any one of the foregoing designs, the processor 1001 may include a transceiver configured to implement receiving and sending functions. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In any one of the foregoing designs, the processor 1001 may store instructions. The instructions may be a computer program. The computer program is run on the processor 1001, so that the communication apparatus 1000 can perform the method described in any one of the foregoing method embodiments. The computer program may be fixed in the processor 1001. In this case, the processor 1001 may be implemented by hardware.

In an implementation, the communication apparatus 1000 may include a circuit, and the circuit may implement a sending, receiving, or communication function in the foregoing method embodiments. The processor and the transceiver described in this application may be implemented in an integrated circuit (integrated circuit, IC), an analog IC, a radio frequency integrated circuit RFIC, a mixed-signal IC, an application-specific integrated circuit (application-specific integrated circuit, ASIC), or a printed circuit board (printed circuit board, PCB), an electronic device, and the like. The processor and the transceiver may alternatively be manufactured by using various IC technologies, for example, a complementary metal oxide semiconductor (complementary metal oxide semiconductor, CMOS), an N-type metal oxide semiconductor (nMetal-oxide-semiconductor, NMOS), a P-type metal oxide semiconductor (positive channel metal oxide semiconductor, PMOS), a bipolar junction transistor (Bipolar Junction Transistor, BJT), a bipolar CMOS (BiCMOS), silicon germanium (SiGe), and gallium arsenide (GaAs).

A scope of the communication apparatus described in this application is not limited thereto, and a structure of the communication apparatus may not be limited by FIG. 19. The communication apparatus may be an independent device or may be a part of a large device. For example, the communication apparatus may be:

(1) an independent integrated circuit IC, a chip, or a chip system or subsystem;
(2) a set including one or more ICs, where optionally, the IC set may further include a storage component configured to store data and a computer program;
(3) an ASIC, for example, a modem (Modem);
(4) a module that can be embedded in another device;
(5) a receiver, a terminal, an intelligent terminal, a cellular phone, a wireless device, a handheld device, a mobile unit, a vehicle-mounted device, a network device, a cloud device, an artificial intelligence device, or the like; or
(6) another device or the like.

In a possible product form, the AP and STA in embodiments of this application may be implemented by general-purpose processors.

A general-purpose processor for implementing the AP includes a processing circuit and an input/output interface that is internally connected to and communicates with the processing circuit.

In a design, the general-purpose processor may be configured to perform a function of the AP in Embodiment 1. Specifically, the processing circuit is configured to generate the trigger frame sent in step S101 in FIG. 7*a*, and/or configured to perform another process of the technology described in this specification. The input/output interface is configured to perform step S101 and step S104 in FIG. 7*a*, and/or configured to perform another process of the technology described in this specification.

In a design, the general-purpose processor may be configured to perform a function of the AP in Embodiment 1. Specifically, the processing circuit is configured to generate the trigger frame sent in step S201 in FIG. 8*a*, and/or is configured to perform another process of the technology described in this specification. The input/output interface is configured to perform step S201 and step S204 in FIG. 8*a*, and/or is configured to perform another process of the technology described in this specification.

In a design, the general purpose processor may be configured to perform a function of the AP in Embodiment 2. Specifically, the processing circuit is configured to generate the trigger frame sent in step S301 in FIG. 11, and/or configured to perform another process of the technology described in this specification. The input/output interface is configured to perform step S301 and step S304 in FIG. 11, and/or configured to perform another process of the technology described in this specification.

In a design, the general purpose processor may be configured to perform a function of the AP in Embodiment 3. Specifically, the processing circuit is configured to generate the trigger frame sent in step S401 in FIG. 14, and/or configured to perform another process of the technology described in this specification. The input/output interface is configured to perform step S401 and step S404 in FIG. 14, and/or configured to perform another process of the technology described in this specification.

In a design, the general purpose processor may be configured to perform a function of the second AP in Embodiment 4. Specifically, the processing circuit is configured to perform step S503 in FIG. 16, and/or another process of the technology described in this specification. The input/output interface is configured to perform step S504 in FIG. 16, and/or another process of the technology described in this specification.

A general-purpose processor for implementing the STA includes a processing circuit and an input/output interface that is internally connected to and communicates with the processing circuit.

In a design, the general-purpose processor may be configured to perform a function of the STA in Embodiment 1. Specifically, the processing circuit is configured to generate the EHT TB PPDU sent in step S103 in FIG. 7*a*, and/or is configured to perform another process of the technology described in this specification. The input/output interface is configured to perform step S102 and step S103 in FIG. 7*a*, and/or is configured to perform another process of the technology described in this specification.

In a design, the general-purpose processor may be configured to perform a function of the STA in Embodiment 1. Specifically, the processing circuit is configured to generate the EHT TB PPDU sent in step S203 in FIG. 8*a*, and/or is configured to perform another process of the technology described in this specification. The input/output interface is configured to perform step S202 and step S203 in FIG. 8*a*, and/or is configured to perform another process of the technology described in this specification.

In a design, the general purpose processor may be configured to perform a function of the STA in Embodiment 2. Specifically, the processing circuit is configured to generate the EHT TB PPDU sent in step S303 in FIG. 11, and/or is configured to perform another process of the technology described in this specification. The input/output interface is configured to perform step S302 and step S303 in FIG. 11, and/or is configured to perform another process of the technology described in this specification.

In a design, the general purpose processor may be configured to perform a function of the STA in Embodiment 3. Specifically, the processing circuit is configured to generate the EHT TB PPDU sent in step S403 in FIG. 14, and/or is configured to perform another process of the technology described in this specification. The input/output interface is configured to perform step S402 and step S403 in FIG. 14, and/or is configured to perform another process of the technology described in this specification.

In a design, the general purpose processor may be configured to perform a function of the second STA in Embodiment 4. Specifically, the processing circuit is configured to perform step S604 in FIG. 18, and/or another process of the technology described in this specification. The input/output interface is configured to perform step S605 in FIG. 18, and/or another process of the technology described in this specification.

It should be understood that the communication apparatuses in the foregoing various product forms have any function of the AP or STA in the method embodiments. Details are not described herein again.

An embodiment of this application further provides a computer-readable storage medium. The computer-readable storage medium stores computer program code. When the processor executes the computer program code, an electronic device performs the method in any one of the foregoing embodiments.

An embodiment of this application further provides a computer program product. When the computer program product runs on a computer, the computer is enabled to perform the method in any one of the foregoing embodiments.

An embodiment of this application further provides a communication apparatus. The apparatus may exist in a product form of a chip. A structure of the apparatus includes a processor and an interface circuit. The processor is configured to communicate with another apparatus through the interface circuit, to enable the apparatus to perform the method in any one of the foregoing embodiments.

An embodiment of this application further provides a wireless communication system including an AP and a STA. The AP and the STA may perform the method in any one of the foregoing embodiments.

Method or algorithm steps described in combination with the content disclosed in this application may be implemented by hardware, or may be implemented by a processor by executing software instructions. The software instructions may include a corresponding software module. The software module may be stored in a random access memory (Random Access Memory, RAM), a flash memory, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be disposed in an ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer-readable storage medium and a communication medium. The communication medium includes any medium that facilitates transmission of a computer program from one place to another. The storage medium may be any available medium accessible to a general-purpose or a dedicated computer.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A trigger frame transmission method, comprising:
   sending, by an access point (AP), a trigger frame for triggering a station to send an extremely high throughput trigger based physical layer protocol data unit (EHT TB PPDU); and
   receiving, by the AP, the EHT TB PPDU sent by the station in response to the trigger frame, wherein
   the EHT TB PPDU comprises a universal signal field (U-SIG),
   the U-SIG comprises spatial reuse parameter (SRP) fields including an SRP1 field and an SRP2 field,
   an uplink (UL) spatial reuse (SR) field of the trigger frame indicates four spatial reuse fields,
   a value of the SRP1 field in the U-SIG is equal to any value of a UL SR1 field and a UL SR2 field in the four spatial reuse fields indicated by the uplink spatial reuse field of the trigger frame, and
   a value of an SRP2 field in the U-SIG is equal to any value of a UL SR3 field and a UL SR4 field in the four spatial reuse fields indicated by the uplink spatial reuse field of the trigger frame.

2. The method according to claim 1, wherein
   the trigger frame comprises a U-SIG reserved indication field indicating a value of a U-SIG reserved field in the U-SIG in the EHT TB PPDU, and
   the U-SIG reserved indication field is located in a special user information field in a user information list field of the trigger frame.

3. The method according to claim 2, wherein an association identifier AID12 of the special user information field is a preset value or an incomplete AID12 value.

4. The method according to claim 2, wherein
   the special user information field further comprises two uplink EHT spatial reuse parameter (UL EHT SRP) fields, and
   a value indicated by a spatial reuse parameter in the U-SIG of the EHT TB PPDU is determined based on the two UL EHT SRP fields.

5. The method according to claim 1, wherein a common information field of the trigger frame comprises four uplink spatial reuse parameter fields.

6. The method according to claim 1, wherein a high efficiency/extremely high throughput (HE/EHT) subfield indicating an EHT station to send a high efficiency trigger based physical layer protocol data unit (HE TB PPDU) or an EHT TB PPDU is set in a reserved field in a common information field of the trigger frame.

7. The method according to claim 1, wherein the trigger frame further comprises:
a UL EHT PPDU bandwidth (BW) extension field, configured together with a UL (HE) BW field to jointly indicate an uplink high efficiency (HE) bandwidth and an uplink EHT bandwidth; or
a special user presence indicator subfield, indicating whether a special user information field exists.

8. A communication apparatus in a wireless local area network (WLAN), comprising:
a processor, configured to generate a trigger frame for triggering a station to send an extremely high throughput trigger based physical layer protocol data unit (EHT TB PPDU); and
a transceiver, configured to
send the trigger frame, and
receive the EHT TB PPDU sent by the station in response to the trigger frame, wherein
the EHT TB PPDU comprises a universal signal field (U-SIG),
the U-SIG comprises spatial reuse parameter (SRP) fields including an SRP1 field and an SRP2 field,
an uplink (UL) spatial reuse (SR) field of the trigger frame indicates four spatial reuse fields,
a value of the SRP1 field in the U-SIG is equal to any value of a UL SR1 field and a UL SR2 field in the four spatial reuse fields indicated by the uplink spatial reuse field of the trigger frame, and
a value of an SRP2 field in the U-SIG is equal to any value of a UL SR3 field and a UL SR4 field in the four spatial reuse fields indicated by the uplink spatial reuse field of the trigger frame.

9. The communication apparatus according to claim 8, wherein
the trigger frame comprises a U-SIG reserved indication field indicating a value of a U-SIG reserved field in the U-SIG in the EHT TB PPDU, and
the U-SIG reserved indication field is located in a special user information field in a user information list field of the trigger frame.

10. The communication apparatus according to claim 9, wherein an association identifier AID12 of the special user information field is a preset value or an incomplete AID12 value.

11. The communication apparatus according to claim 9, wherein
the special user information field further comprises two uplink EHT spatial reuse parameter (UL EHT SRP) fields, and
a value indicated by a spatial reuse parameter in the U-SIG of the EHT TB PPDU is determined based on the two UL EHT SRP fields.

12. The communication apparatus according to claim 8, wherein a common information field of the trigger frame comprises four uplink spatial reuse parameter fields.

13. The communication apparatus according to claim 8, wherein a high efficiency/extremely high throughput (HE/EHT) subfield indicating an EHT station to send a high efficiency trigger based physical layer protocol data unit (HE TB PPDU) or an EHT TB PPDU is set in a reserved field in a common information field of the trigger frame.

14. The communication apparatus according to claim 8, wherein the trigger frame further comprises:
a UL EHT PPDU bandwidth (BW) extension field, configured together with a UL (HE) BW field to jointly indicate an uplink high efficiency (HE) bandwidth and an uplink EHT bandwidth; or
a special user presence indicator subfield, indicating whether a special user information field exists.

15. A chip, wherein the chip comprises a processor and a data interface, and the processor is configured to read, through the data interface, instructions stored in a memory, to perform:
sending a trigger frame for triggering a station to send an extremely high throughput trigger based physical layer protocol data unit (EHT TB PPDU); and
receiving the EHT TB PPDU sent by the station in response to the trigger frame, wherein
the EHT TB PPDU comprises a universal signal field (U-SIG),
the U-SIG comprises spatial reuse parameter (SRP) fields including an SRP1 field and an SRP2 field,
an uplink (UL) spatial reuse (SR) field of the trigger frame indicates four spatial reuse fields,
a value of the SRP1 field in the U-SIG is equal to any value of a UL SR1 field and a UL SR2 field in the four spatial reuse fields indicated by the uplink spatial reuse field of the trigger frame, and
a value of an SRP2 field in the U-SIG is equal to any value of a UL SR3 field and a UL SR4 field in the four spatial reuse fields indicated by the uplink spatial reuse field of the trigger frame.

16. The chip according to claim 15, wherein
the trigger frame comprises a U-SIG reserved indication field indicating a value of a U-SIG reserved field in the U-SIG in the EHT TB PPDU, and
the U-SIG reserved indication field is located in a special user information field in a user information list field of the trigger frame.

17. The chip according to claim 16, wherein an association identifier AID12 of the special user information field is a preset value or an incomplete AID12 value.

18. The chip according to claim 16, wherein
the special user information field further comprises two uplink EHT spatial reuse parameter (UL EHT SRP) fields, and
a value indicated by a spatial reuse parameter in the U-SIG of the EHT TB PPDU is determined based on the two UL EHT SRP fields.

19. The chip according to claim 15, wherein a common information field of the trigger frame comprises four uplink spatial reuse parameter fields.

20. The chip according to claim 15, wherein a high efficiency/extremely high throughput (HE/EHT) subfield indicating an EHT station to send a high efficiency trigger based physical layer protocol data unit (HE TB PPDU) or an EHT TB PPDU is set in a reserved field in a common information field of the trigger frame.

* * * * *